(12) United States Patent
Kim et al.

(10) Patent No.: US 9,664,957 B2
(45) Date of Patent: May 30, 2017

(54) LIQUID CRYSTAL DISPLAY DEVICE AND METHOD OF DRIVING THE SAME

(71) Applicant: INDUSTRY-UNIVERSITY COOPERATION FOUNDATION HANYANG UNIVERSITY, Seoul (KR)

(72) Inventors: Jae-Hoon Kim, Seoul (KR); You-Jin Lee, Seoul (KR)

(73) Assignee: INDUSTRY-UNIVERSITY COOPERATION FOUNDATION HANYANG UNIVERSITY, Seoul (KR)

(*) Notice: Subject to any disclaimer, the term of this patent is extended or adjusted under 35 U.S.C. 154(b) by 2 days.

(21) Appl. No.: 14/411,455

(22) PCT Filed: Jun. 25, 2013

(86) PCT No.: PCT/KR2013/005604
§ 371 (c)(1),
(2) Date: Dec. 26, 2014

(87) PCT Pub. No.: WO2014/003413
PCT Pub. Date: Jan. 3, 2014

(65) Prior Publication Data
US 2015/0198855 A1   Jul. 16, 2015

(30) Foreign Application Priority Data

Jun. 25, 2012  (KR) .................. 10-2012-0067984
Oct. 12, 2012  (KR) .................. 10-2012-0113530
(Continued)

(51) Int. Cl.
*G02F 1/1337*  (2006.01)
*G02F 1/1343*  (2006.01)
(Continued)

(52) U.S. Cl.
CPC ...... *G02F 1/134309* (2013.01); *C09K 19/586* (2013.01); *G02F 1/137* (2013.01);
(Continued)

(58) Field of Classification Search
CPC ... G02F 2001/134372; G02F 1/134363; G02F 2001/133742
See application file for complete search history.

(56) References Cited

U.S. PATENT DOCUMENTS 4,871,472 A   10/1989   Krause et al.
5,332,521 A    7/1994   Yuasa et al.
(Continued)

FOREIGN PATENT DOCUMENTS

CN    1290920 A    4/2001
CN    1690825 A   11/2005
(Continued)

OTHER PUBLICATIONS

International Search Report for PCT/KR2013/005604 filed on Jun. 25, 2013.
(Continued)

*Primary Examiner* — Kendrick Hsu

(57) ABSTRACT

Provided are a liquid crystal display device and a method for driving same. The liquid crystal display device comprises the liquid crystal display device in a PVA mode, an LVA mode, an FFS mode, and in an IPS mode. The liquid crystal display device comprises a liquid crystal layer, which comprises a negative nematic liquid crystal, a positive nematic liquid crystal, and a ferroelectric liquid crystal. The liquid crystal display device comprises a non-ferroelectric liquid crystal and the ferroelectric liquid crystal.

59 Claims, 56 Drawing Sheets

(30) Foreign Application Priority Data

| | | | |
|---|---|---|---|
| Oct. 12, 2012 | (KR) | ......................... | 10-2012-0113534 |
| Oct. 12, 2012 | (KR) | ......................... | 10-2012-0113539 |
| Oct. 31, 2012 | (KR) | ......................... | 10-2012-0122466 |
| Dec. 6, 2012 | (KR) | ......................... | 10-2012-0141029 |
| Mar. 6, 2013 | (KR) | ......................... | 10-2013-0023975 |
| Mar. 6, 2013 | (KR) | ......................... | 10-2013-0023976 |

(51) Int. Cl.
  *G02F 1/141* (2006.01)
  *C09K 19/58* (2006.01)
  *G02F 1/137* (2006.01)

(52) U.S. Cl.
  CPC ........ *G02F 1/1337* (2013.01); *G02F 1/13781* (2013.01); *G02F 1/133707* (2013.01); *G02F 1/134363* (2013.01); *G02F 1/141* (2013.01); *G02F 2001/13712* (2013.01); *G02F 2001/133726* (2013.01); *G02F 2001/133742* (2013.01); *G02F 2001/134318* (2013.01); *G02F 2001/134372* (2013.01)

(56) References Cited

U.S. PATENT DOCUMENTS

| | | | |
|---|---|---|---|
| 6,056,893 A | | 5/2000 | Reiffenrath et al. |
| 6,738,120 B1 | | 5/2004 | Song et al. |
| 7,872,722 B2 * | | 1/2011 | Kimura ............... H01L 27/1218 |
| | | | 349/114 |
| 2005/0140867 A1 * | | 6/2005 | Choi ................. G02F 1/133555 |
| | | | 349/114 |
| 2005/0213019 A1 | | 9/2005 | Choi et al. |
| 2006/0110550 A1 | | 5/2006 | Moriya |
| 2006/0238696 A1 | | 10/2006 | Wen et al. |
| 2007/0200093 A1 | | 8/2007 | West et al. |
| 2007/0268436 A1 | | 11/2007 | Kim et al. |
| 2009/0103011 A1 | | 4/2009 | Bernatz et al. |
| 2010/0231845 A1 * | | 9/2010 | Seong .................... C09K 19/12 |
| | | | 349/183 |
| 2011/0063558 A1 * | | 3/2011 | Ishihara ............ G02F 1/134363 |
| | | | 349/141 |
| 2011/0095229 A1 * | | 4/2011 | Lee ........................ C09K 19/12 |
| | | | 252/299.61 |
| 2011/0140039 A1 | | 6/2011 | Wu et al. |
| 2011/0141417 A1 | | 6/2011 | Kim |
| 2011/0233463 A1 | | 9/2011 | Haase et al. |
| 2012/0032994 A1 | | 2/2012 | Coles et al. |
| 2012/0326083 A1 | | 12/2012 | Wand |
| 2015/0137036 A1 | | 5/2015 | Kim et al. |
| 2015/0198855 A1 | | 7/2015 | Kim et al. |

FOREIGN PATENT DOCUMENTS

| | | |
|---|---|---|
| CN | 102096244 A | 6/2011 |
| CN | 102257100 A | 11/2011 |
| JP | 2510314 B1 | 4/1996 |
| JP | 09-033957 A | 2/1997 |
| JP | 2001-296520 A | 10/2001 |
| JP | 2006-171715 A | 6/2006 |
| JP | 2008-518899 A | 6/2008 |
| KR | 10-1997-0076049 A | 12/1997 |
| KR | 10-1998-0702063 A | 7/1998 |
| KR | 10-1999-0027489 A | 4/1999 |
| KR | 10-2000-0004396 A | 1/2000 |
| KR | 10-2004-0093173 A | 11/2004 |
| KR | 10-2006-0056873 A | 5/2006 |
| KR | 10-2007-0107319 A | 11/2007 |
| KR | 10-2005-0073340 A | 7/2008 |
| KR | 10-2012-0010127 A | 2/2012 |
| WO | WO 96/24880 | 8/1996 |
| WO | WO 03/081326 A1 | 10/2003 |
| WO | WO 2006/048620 A2 | 5/2006 |

OTHER PUBLICATIONS

Office Action for U.S. Appl. No. 14/411,367, dated Nov. 6, 2015.
International Search Report for PCT/KR2013/005573 filed Jun. 25, 2013.
Office Action for U.S. Appl. No. 14/411,369, dated Dec. 18, 2015.
International Search Report for PCT/KR2013/005607 filed Jun. 25, 2013.
International Search Report for PCT/KR2013/005609 filed on Jun. 25, 2013.
Office Action for U.S. Appl. No. 14/411,367, dated Jul. 29, 2016.

* cited by examiner

FIG. 3E
FIG. 3F
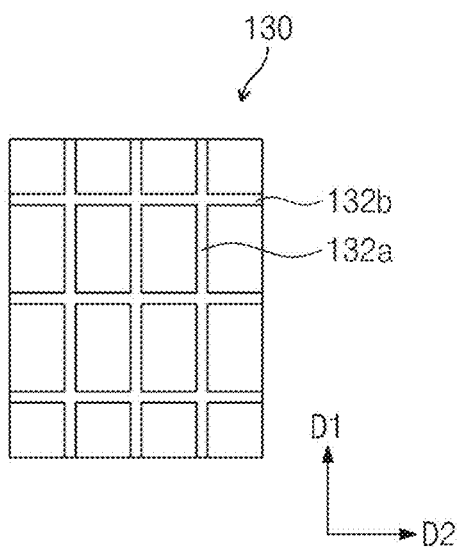
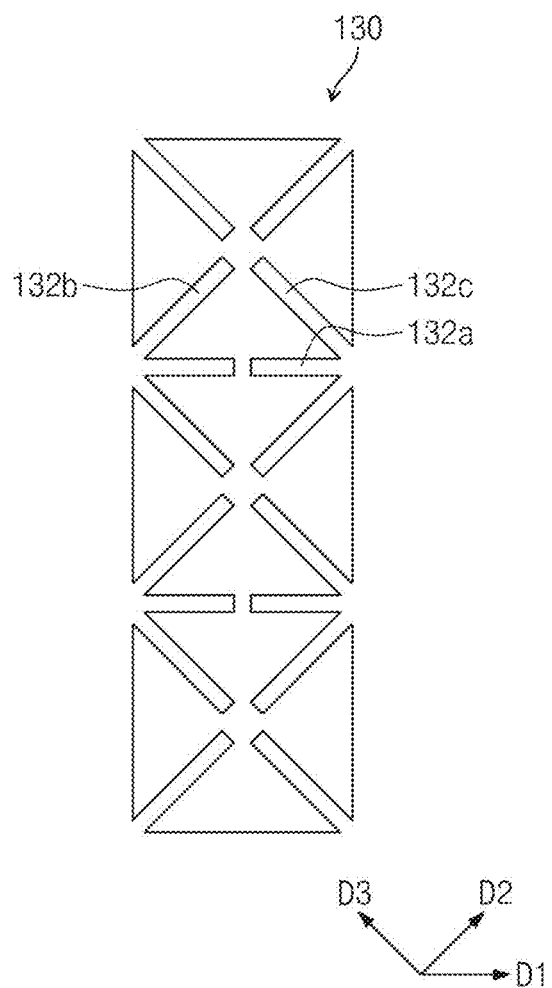

FIG. 3G
FIG. 3H
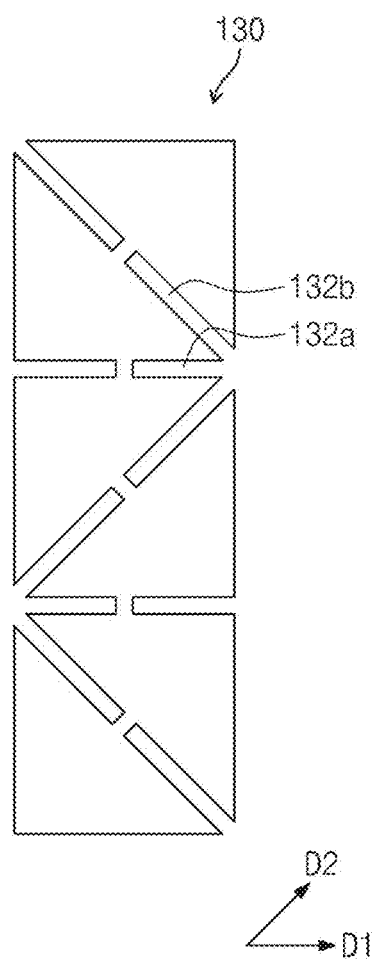
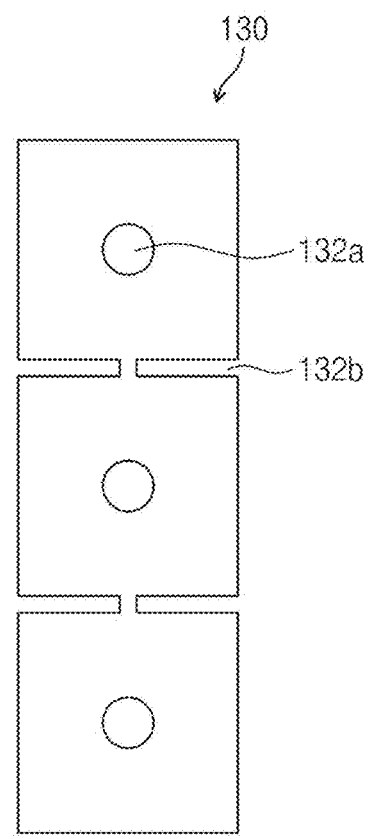

LIQUID CRYSTAL DISPLAY DEVICE AND METHOD OF DRIVING THE SAME

TECHNICAL FIELD

The present invention disclosed herein relates to a liquid crystal display device and a method of driving the same, and more particularly, to a liquid crystal display device including a liquid crystal layer containing a nematic liquid crystal and a ferroelectric liquid crystal, and a method of driving the same.

CROSS-REFERENCE TO RELATED APPLICATIONS

This U.S. non-provisional patent application claims priority under 35 U.S.C. §119 of Korean Patent Application Nos. 10-2012-0067984, filed on Jun. 25, 2012, 10-2012-0113534, filed on Oct. 12, 2012, 10-2012-0113530, filed on Oct. 12, 2012, 10-2012-0113539, filed on Oct. 12, 2012, 10-2012-0122466, filed on Oct. 31, 2012, 10-2012-0141029, filed on Dec. 6, 2012, 10-2013-0023976, filed on Mar. 6, 2013, and 10-2013-0023975, filed on Mar. 6, 2013, the entire contents of which are hereby incorporated by reference.

BACKGROUND ART

Liquid crystal display devices that are one type of widely used flat panel display devices at present have been actively studied to attain high definition, high luminance and a large size. As a part of the research, the structures of electrodes in the liquid crystal display device are diversified and complicated to realize the high definition, the high luminance and the large size. In the case when a driving voltage is applied to the electrodes, the alignment of liquid crystal molecules in a liquid crystal layer may be changed by an applied electric field. The alignment of the liquid crystal molecules is non-uniform and unstable due to the electrodes. The non-uniform and unstable alignment of the liquid crystal molecules may deteriorate the luminance of the liquid crystal display device.

DISCLOSURE OF THE INVENTION

Technical Problem

The present invention provides a liquid crystal display device having improved luminance.

The present invention also provides a method for driving the liquid crystal display device.

The technical limitation of the present invention is not limited to the above-described limitations, and other unmentioned limitations will be clearly understood from the following description by a person skilled in the art.

Technical Solution

Embodiments of the present invention provide liquid crystal display devices. The liquid crystal display devices include a first substrate; a second substrate separated from and opposing the first substrate; a liquid crystal layer between the first and second substrates; a first electrode between the first substrate and the liquid crystal layer and including a first slit; and a second electrode between the liquid crystal layer and the second substrate and including a second slit, wherein the liquid crystal layer includes a negative nematic liquid crystal, a positive nematic liquid crystal and a ferroelectric liquid crystal.

In other embodiments of the present invention, liquid crystal display devices are provided. The liquid crystal display devices include a first substrate; a second substrate separated from and opposing the first substrate; a liquid crystal layer between the first and second substrates; a first electrode between the first substrate and the liquid crystal layer and including a first slit; and a second electrode between the liquid crystal layer and the second substrate and including a second slit, wherein the liquid crystal layer includes a non-ferroelectric liquid crystal and a ferroelectric liquid crystal.

In still other embodiments of the present invention, liquid crystal display devices are provided. The liquid crystal display devices include a first electrode and a second electrode separated from and opposing to each other; and a liquid crystal layer filling up a space between the first and second electrodes and including a plurality of liquid crystal molecules having a first alignment direction perpendicular to the surface of the first or second electrode when no potential difference is present between the first and second electrodes, wherein the liquid crystal layer includes a negative nematic liquid crystal, a positive nematic liquid crystal and a ferroelectric liquid crystal, the plurality of liquid crystal molecules performs changing operation to have a second alignment direction substantially in parallel to an extended direction of the first or second electrode when potential difference is generated between the first and second electrodes, the changing operation of the liquid crystal molecules includes a first alignment step and a second alignment step in order, the liquid crystal molecules change to have a third alignment direction different from the first or second alignment direction in the first alignment step, and the liquid crystal molecules of the third alignment direction change to have the second alignment direction in the second alignment step.

In even other embodiments of the present invention, liquid crystal display devices are provided. The liquid crystal display devices include a first electrode and a second electrode separated from and opposing to each other; and a liquid crystal layer filling up a space between the first and second electrodes and including a plurality of liquid crystal molecules having a first alignment direction perpendicular to the surface of the first or second electrode when no potential difference is present between the first and second electrodes, wherein the liquid crystal layer includes a non-ferroelectric liquid crystal and a ferroelectric liquid crystal, the liquid crystal molecules in the liquid crystal layer filling up a space between the first and second electrodes perform changing operation to have a second alignment direction substantially in parallel to an extended direction of the first or second electrode when potential difference is generated between the first and second electrodes, the changing operation of the liquid crystal molecules includes a first alignment step and a second alignment step in order, the liquid crystal molecules change to have a third alignment direction different from the first or second alignment direction in the first alignment step, and the liquid crystal molecules of the third alignment direction change to have the second alignment direction in the second alignment step.

In yet other embodiments of the present invention, methods for driving a liquid crystal display devices are provided. The method for driving a liquid crystal display device includes aligning liquid crystal molecules of a liquid crystal layer filled between first and second electrodes in a first alignment direction that is perpendicular to the surface of the first or second electrode; generating potential difference between the first and second electrodes; stabilizing the liquid crystal molecules by a ferroelectric liquid crystal in the liquid crystal layer; and changing alignment direction of the liquid crystal molecules in a second alignment direction that is substantially in parallel to an extended direction of the first and second electrodes. The changing of the alignment direction of the liquid crystal molecules includes a first alignment step and a second alignment step, and the liquid crystal molecules change to have a third alignment direction different from the first or second alignment direction in the first alignment step, and the liquid crystal molecules in the third alignment direction change to have the second alignment direction in the second alignment step.

In further embodiments of the present invention, liquid crystal display devices are provided. The liquid crystal display devices include a first substrate; a second substrate separated from and opposing the first substrate; a liquid crystal layer between the first and second substrates; a common electrode between the first substrate and the liquid crystal layer and having a plate shape; and a pixel electrode between the common electrode and the liquid crystal layer and having a pattern for defining an opening part, wherein the liquid crystal layer includes a negative nematic liquid crystal, a positive nematic liquid crystal and a ferroelectric liquid crystal.

In still further embodiments of the present invention, liquid crystal display devices are provided. The liquid crystal display devices include a first substrate; a second substrate separated from and opposing the first substrate; a liquid crystal layer between the first and second substrates; a common electrode between the first substrate and the liquid crystal layer and having a plate shape; and a pixel electrode between the common electrode and the liquid crystal layer and having a pattern for defining an opening part, wherein the liquid crystal layer includes a non-ferroelectric liquid crystal and a ferroelectric liquid crystal.

In even further embodiments of the present invention, liquid crystal display devices are provided. The liquid crystal display devices include a first substrate; a second substrate separated from and opposing the first substrate; a liquid crystal layer between the first and second substrates; a common electrode between the first substrate and the liquid crystal layer and having a first pattern; and a pixel electrode between the first substrate and the liquid crystal layer and having a second pattern not overlapping with the first pattern, wherein the liquid crystal layer includes a negative nematic liquid crystal, a positive nematic liquid crystal and a ferroelectric liquid crystal.

In yet further embodiments of the inventive concept, liquid crystal display devices are provided. The liquid crystal display devices include a first substrate; a second substrate separated from and opposing the first substrate; a liquid crystal layer between the first and second substrates; a common electrode between the first substrate and the liquid crystal layer and having a first pattern; and a pixel electrode between the first substrate and the liquid crystal layer and having a second pattern not overlapping with the first pattern, wherein the liquid crystal layer includes a non-ferroelectric liquid crystal and a ferroelectric liquid crystal.

Advantageous Effects

According to an embodiment of the present invention, a liquid crystal display device may include a liquid crystal layer containing a negative nematic liquid crystal, a positive nematic liquid crystal and ferroelectric liquid crystal molecules. Due to the ferroelectric liquid crystal molecules of the liquid crystal layer, the alignment uniformity and the stability of the liquid crystal molecules in the liquid crystal layer may be improved, and the luminance of the liquid crystal display device may be increased.

BRIEF DESCRIPTION OF THE DRAWINGS

The accompanying drawings are included to provide a complete understanding and assistance of the present invention, and reference numerals are illustrated hereinafter.

FIGS. 3A to 3I are plan views for explaining the structures of first electrodes or second electrodes according to exemplary embodiments of the present invention;

MODE FOR CARRYING OUT THE INVENTION

Figure 1:
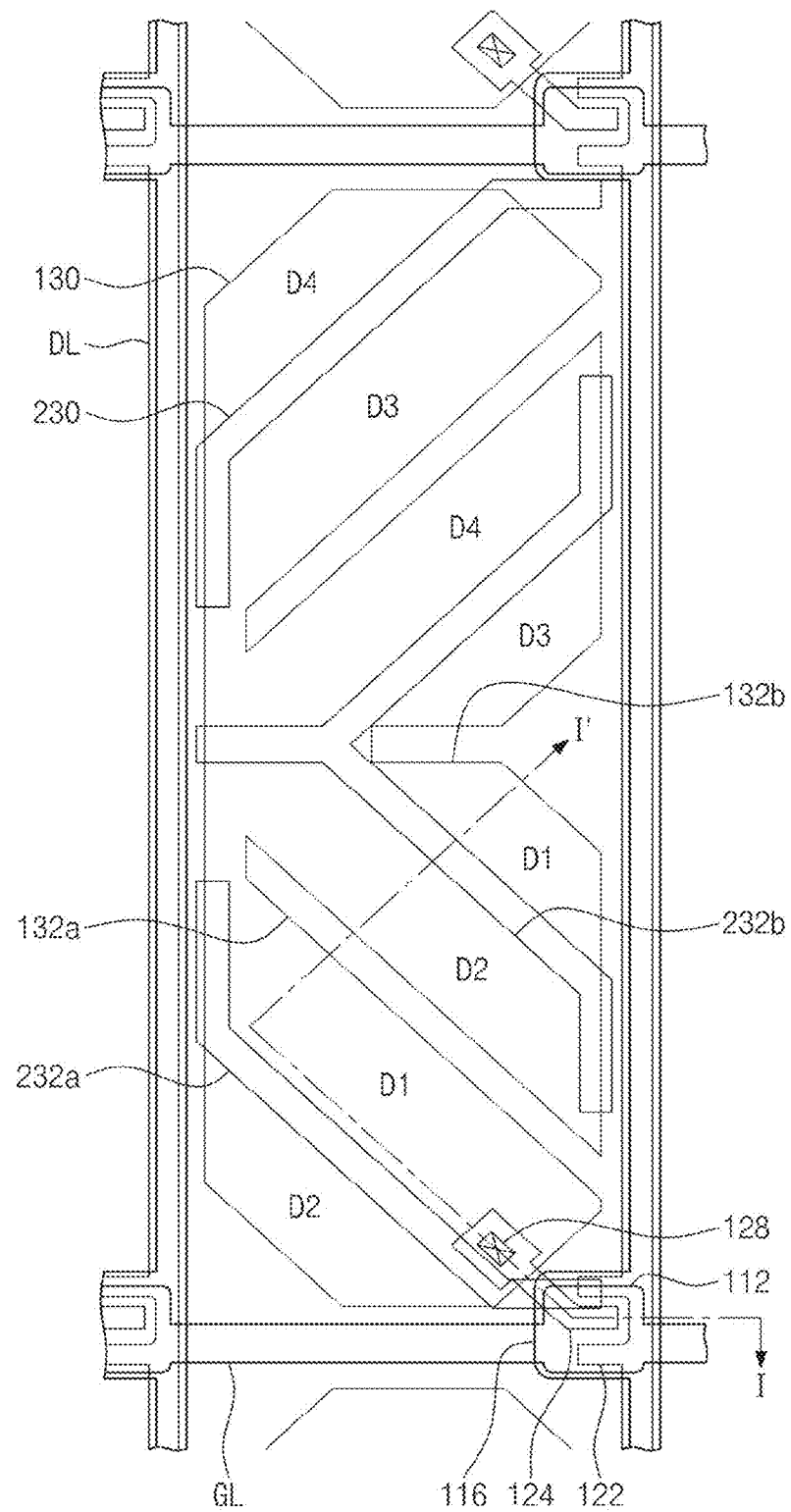
FIG. 1 is a plan view for explaining a liquid crystal display device according to an embodiment of the present invention.

Preferred embodiments of the present invention will be described below in more detail with reference to the accompanying drawings for the sufficient understanding of the configuration and effects of the present invention. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. A person skilled in the art will understand an appropriate environment for performing the concept of the present invention.

The terminology used herein is for the purpose of describing particular example embodiments only and is not intended to limit the present inventive concept. As used herein, the singular forms are intended to include the plural forms as well, unless the context clearly indicates otherwise. It will be further understood that the terms "comprises" and/or "comprising," when used in this specification, specify the presence of stated features, steps, operations, and/or devices, but do not preclude the presence or addition of one or more other features, steps, operations, and/or devices thereof.

It will also be understood that when a layer (or film) is referred to as being 'on' another layer (or film) or substrate, it can be directly on the other layer (or film) or substrate, or a third layer (or films) may also be present.

It will be understood that, although the terms first, second, third etc. may be used herein to describe various regions, layers (or films), etc. these regions and layers should not be limited by these terms. These terms are only used to distinguish one region or layer (or film) from another region or layer (or film). Thus, a first layer discussed below could be termed a second layer. Example embodiments embodied and described herein may include complementary example embodiments thereof. Like reference numerals refer to like elements throughout.

Unless otherwise defined, all terms used herein have the same meaning as commonly understood by one of ordinary skill in the art to which this inventive concept belongs.

Hereinafter, it will be described about exemplary embodiments of the present invention in conjunction with the accompanying drawings.

[[Liquid Crystal Display Device in PVA Mode]]

Figure 2:
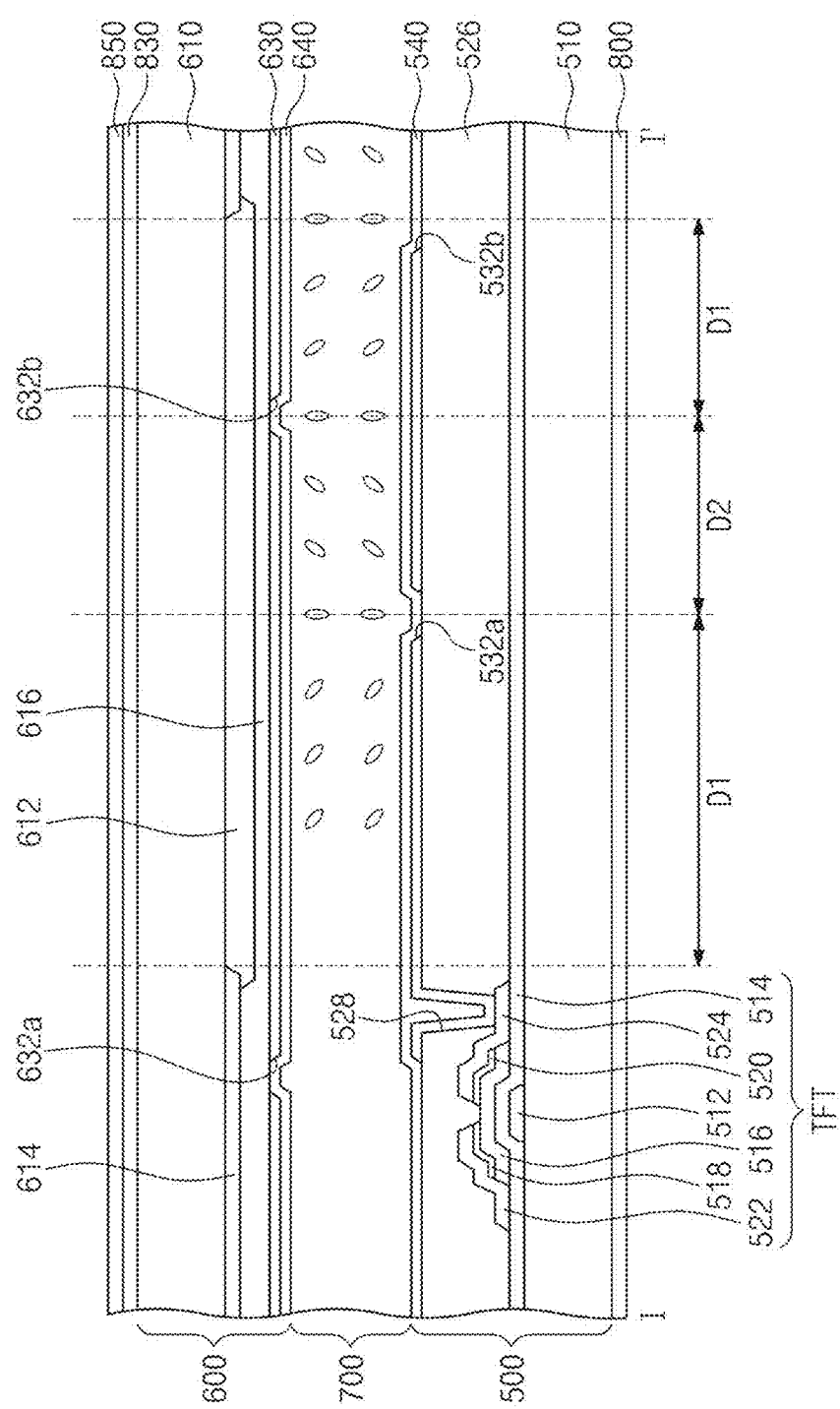
FIG. 2 is a cross-sectional view for explaining a liquid crystal display device according to an embodiment of the present invention.

FIGS. 1 and 2 are a plan view and a cross-sectional view for explaining a liquid crystal display device according to an embodiment of the present invention.

Referring to FIGS. 1 and 2, a liquid crystal display device may include a first display plate 100, a second display plate 200 separated from and opposing the first display plate 100, and a liquid crystal layer 300 disposed between the first and second display plates 100 and 200. In addition, the liquid crystal display device may further include a first polarization plate 400 and a second polarization plate 450 having a transmission axis perpendicular to the transmission axis of the first polarization plate 400.

The first display plate 100 may include a first substrate 110, a thin film transistor TFT and a first electrode 130. The first substrate 110 may include a transparent insulating material such as glass.

The thin film transistor may be disposed at one side of the first substrate 110. The thin film transistor TFT may include a gate electrode 112, a gate insulating layer 114, a semiconductor 116, a source electrode 122 and a drain electrode 124 stacked one by one. The gate electrode 112 may be a single layer or a multilayer including a metal or a metal alloy, and the gate insulating layer 114 may include silicon oxide, silicon nitride or silicon oxynitride. The intrinsic semiconductor 116 may include amorphous silicon. The source electrode 122 and the drain electrode 124 may be separately disposed to face to each other on the intrinsic semiconductor 116. In the intrinsic semiconductor 116 between the source electrode 122 and the drain electrode 124, the channel of the thin film transistor TFT may be formed. The source electrode 122 may be electrically connected to a data line DL and may receive a data voltage from the data line DL. The drain electrode 124 may be electrically connected to the first electrode 130.

According to an aspect, the thin film transistor TFT may further include ohmic contact members 118 and 120 disposed between the intrinsic semiconductor 116 and the source and drain electrodes 122 and 124. The ohmic contact members 118 and 120 may include silicide, $n^+$ hydrogenated amorphous silicon heavily doped with n-type impurities, or the like.

On the thin film transistor TFT, a first insulation layer 126 having a first contact hole 128 may be formed. The first insulation layer 126 may include an inorganic insulation material such as silicon oxide, silicon nitride, silicon oxynitride, etc. or an organic insulation material such as a resin, etc. The contact hole 128 may expose the top surface of the drain electrode 124.

On the first insulation layer 126, a first electrode 130 may be formed. The first electrode 130 may be a pixel electrode. The first electrode 130 may make an electrical connection with the drain electrode via the contact hole. The first electrode 130 may be applied with a data voltage from the drain electrode. The first electrode 130 may include a transparent conductive material such as indium tin oxide (ITO) or indium zinc oxide (IZO).

According to an embodiment of the present invention, the first electrode 130 may include a domain division element, for example, first slits 132a and 132b. The first slits 132a and 132b correspond to removed parts of the first electrode 130, and the first electrode 130 may have a pattern. When a voltage is applied to the first electrode 130 and the second electrode 230, an electric field is generated between the first and second electrodes 130 and 230, and the electric field may not be formed in a vertical direction with respect to the surface of the first substrate 110 but may be formed in a slanted direction having both a vertical component and a horizontal component due to the first slits 132a and 132b. According to another embodiment of the present invention, the domain division element may be formed on the first electrode 130 and may have an extruded shape in a direction from the first electrode 130 to the liquid crystal layer 300.

According to the structures of the first slits 132a and 132b, the first electrode 130 may have diverse structures. The first slits 132a and 132b of the first electrode 130 will be explained in detail below.

According to another embodiment of the present invention, the first display plate 100 may further include a first alignment layer 140 between the first electrode 130 and the liquid crystal layer 300. The first alignment layer 140 may pre-tilt liquid crystal molecules in the liquid crystal layer 300 in one direction. According to an embodiment, the first alignment layer 140 may include at least one selected from the group consisting of polyamic acid, polyimide, lecithin, nylon and polyvinyl alcohol (PVA). According to another embodiment, the first alignment layer 140 may further include a reactive mesogen material.

The first polarization plate 400 may be disposed on the other side of the first substrate 110. The other side of the first substrate 110 may be a side corresponding to the one side.

The second display plate 200 may include a second substrate 210 and a second electrode 230. The second substrate 210 may include a transparent insulation material such as glass.

The second electrode 230 may be disposed on one side of the second substrate 210, and the one side of the second substrate 210 may be a side opposing the first display plate 100. The second electrode 230 may be a common electrode. The second electrode 230 may include a transparent material such as ITO, IZO, etc.

According to an embodiment of the present invention, the second electrode 230 may include a domain division element, for example, second slits 232a and 232b. The second slits 232a and 232b correspond to removed parts of the second electrode 230, and the second electrode 230 may have a pattern. When a voltage is applied to the first electrode 130 and the second electrode 230, an electric field may be generated between the first and second electrodes 130 and 230, and the electric field may not be formed in a vertical direction with respect to the surface of the second substrate 210 but may be formed in a slanted direction having both a vertical component and a horizontal component due to the second slits 232a and 232b. According to another embodiment of the present invention, the domain division element may be formed on the second electrode 230 and may have an extruded shape in a direction from the second electrode 230 to the liquid crystal layer 300.

According to the structures of the second slits 232a and 232b, the second electrode 230 may have diverse structures. The second slits 232a and 232b of the second electrode 230 will be explained in detail below.

According to exemplary embodiments of the present invention, the liquid crystal display device may be a liquid crystal display device in a patterned vertical alignment (PVA) mode. Thus, the first electrode 130 having the first slits 132a and 132b and the second electrode 230 having the second slits 232a and 232b may face to each other, however the first slits 132a and 132b and the second slits 232a and 232b may not face to each other. For example, the first electrode 130 having the first slits 132a and 132b and the second electrode 230 having the second slits 232a and 232b may have substantially the same structure, and the first and second electrodes 130 and 230 may be disposed so that the first slits 132a and 132b and the second slits 232a and 232b may not face to each other. Alternatively, the first and second electrodes 130 and 230 may have different structures, and the first slits 132a and 132b of the first electrode 130 and the second slits 232a and 232b of the second electrode 230 may not face to each other. In addition, the first slits 132a and 132b and the second slits 232a and 232b may not be substantially overlapped and may be separated when seen from plane. The first slits 132a and 132b and the second slits 232a and 232b may be alternately formed when seen from plane.

According to exemplary embodiments of the present invention, slanted electric field may be formed between the first and second electrodes 130 and 230 when a voltage is applied due to the first slits 132a and 132b and the second slits 232a and 232b of the first and second electrodes 130 and 230 as described above. Therefore, multi-domains D1 to D4 may be formed in one pixel. Referring to FIG. 1, liquid crystal molecules may be aligned in four directions, and four domains D1 to D4 may be formed in one pixel. However, the domain number formed in one pixel will not be limited thereto in the present invention.

According to an embodiment, the second display plate 200 may further include a color filter 212. The color filter 212 may be disposed between the second substrate 210 and the second electrode 230. In addition, a shielding member 214 may be disposed on one side of the second substrate 210, and the color filter 212 may be formed in each area defined by the shielding member 214. The color filter 212 may be passivated by the second insulation layer 216. In this embodiment, the color filter 212 is explained to be disposed on the second display plate 200; however the color filter 212 may be disposed on the first display plate 100. However, the position of the color filter 212 is not limited in the present invention.

According to another embodiment of the present invention, the second display plate 200 may further include a second alignment layer 240 between the second electrode 230 and the liquid crystal layer 300. The second alignment layer 240 may pre-tilt the liquid crystal molecules in the liquid crystal layer 300 in one direction. According to an embodiment, the second alignment layer 240 may include at least one selected from the group consisting of polyamic acid, polyimide, lecithin, nylon and PVA. According to another embodiment, the second alignment layer 240 may further include a reactive mesogen material.

The second polarization plate 450 may be disposed on the other side of the second substrate 210. The other side of the second substrate 210 may be a side corresponding to the one side. The second polarization plate 450 may penetrate linearly polarized light vibrating in a vertical direction among lights penetrated through the first polarization plate 400.

The liquid crystal layer 300 may fill up a space between the first and second display plates 100 and 200. According to an embodiment, the liquid crystal layer 300 may include a negative nematic liquid crystal, a positive nematic liquid crystal and a ferroelectric liquid crystal. According to another embodiment, the liquid crystal layer 300 may include a non-ferroelectric liquid crystal and a ferroelectric liquid crystal. The liquid crystal layer 300 will be explained in detail hereinafter.

According to an embodiment of the present invention, the liquid crystal display device may further include an optical compensation film 430. The optical compensation film 430 may be disposed between the second polarization plate 450 and the second substrate 210. When the liquid crystal molecules maintain a vertically aligned state, the polarization axes of the first polarization plate 400 and the second polarization plate 450 may cross at right angles when observed from a front side, and light leakage may not be generated, however polarization angles formed by the polarization axes of the first and second polarization plates 400 and 450 may increase, and light leakage may be generated when seen from a side. To compensate the light leakage, the optical compensation film 430 such as a biaxial film or a uniaxial film may be disposed.

As described above, since the liquid crystal layer 300 of the liquid crystal display device in the PVA mode includes the ferroelectric liquid crystal together with the nematic liquid crystal, the alignment of the liquid crystal layer may become uniform, and the stability of the alignment may be improved. Thus, the luminance of the liquid crystal display device including the liquid crystal layer 300 may be improved. In addition, since at least one of the first and second alignment layers 140 and 240 further includes the reactive mesogen material, the alignment rate and the alignment angle of the liquid crystal molecules in the liquid crystal layer 300 may be increased, thereby improving optical properties.

Hereinafter, the structures of the first and second electrodes 130 and 230 will be explained in detail.

The structures of the electrode will be explained with the first electrode 130 as a typical embodiment; however the second electrode 230 may have one of the following structures of the electrode. As described above, if the first slits 132a and 132b and the second slits 232a and 232b are not face to each other, the strictures of the first and second electrodes may be the same or different, and the structure thereof may be changed diversely.

FIGS. 3A to 3I are plan views for explaining the structures of the first and second electrodes 130 and 230 according to exemplary embodiments of the present invention.

Figure 3A:
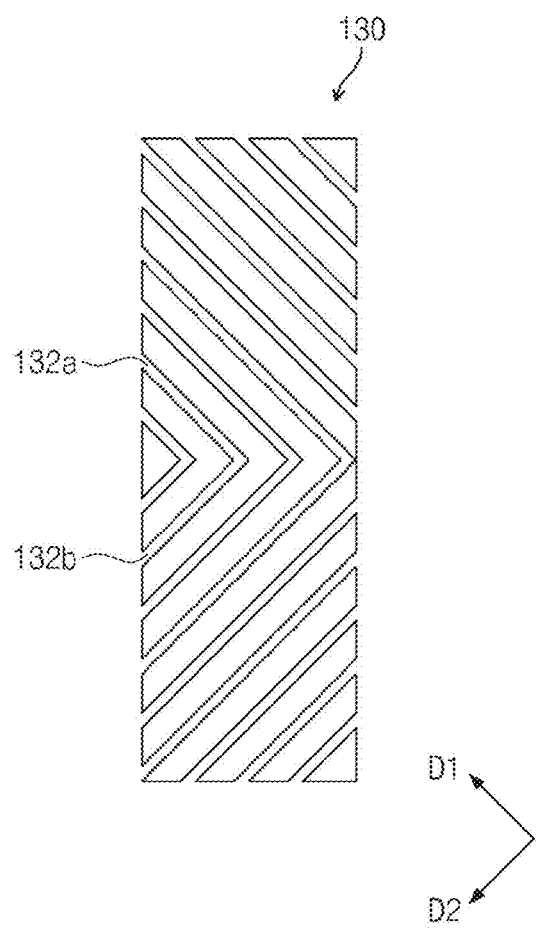

Referring to FIG. 3A, the first electrode 130 may have a Chevron pattern. The first slits 132a and 132b of the first electrode 130 may have a V-shape and may have a connected structure of a first line 132a extended in a first direction D1 and a second line 132b extended in a second direction D2 crossing the first direction D1.

Figure 3B:
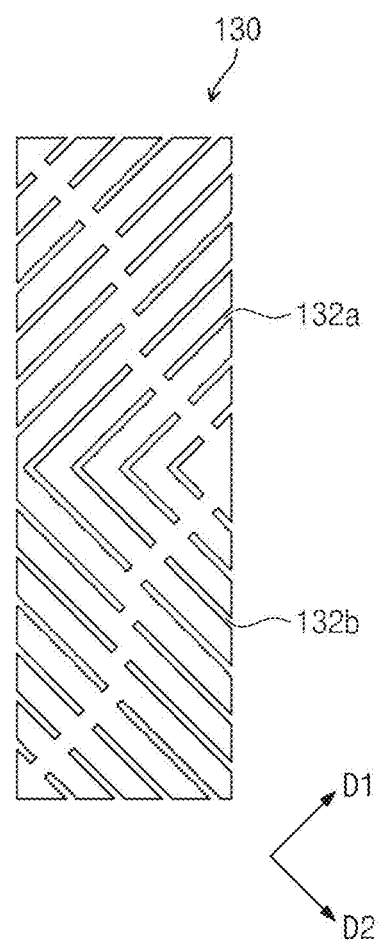

Referring to FIG. 3B, the first electrode 130 may have a modified Chevron pattern. The structure of the first slits 132a and 132b may be similar to that illustrated in FIG. 3A, however may have a structure in which the middle part of the first line 132a is cut by the first electrode 130 and the middle part of the second line 132b is cut by the first electrode 130.

Figure 3C:
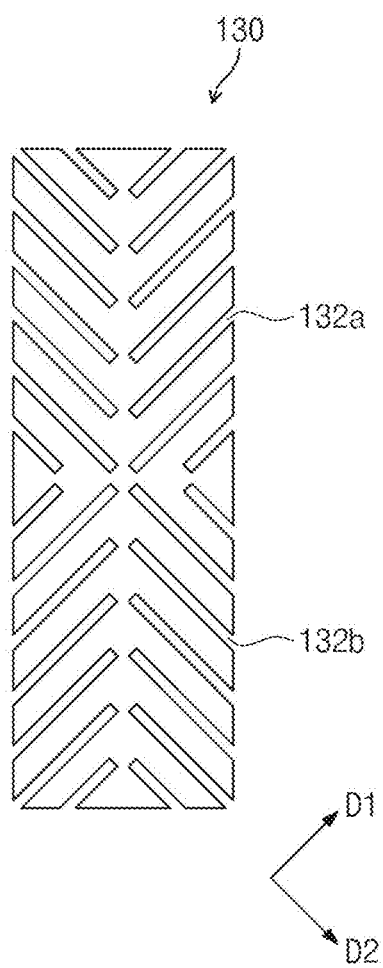

Referring to FIG. 3C, the first electrode 130 may have an X-shape pattern. The structure of the first slits 132a and 132b may include a first line 132a extended in a first direction D1 and a second line 132b extended in a second direction D2 crossing the first direction D1. Different from FIG. 3A, the first and second lines 132a and 132b are not connected to each other.

Figure 3D:
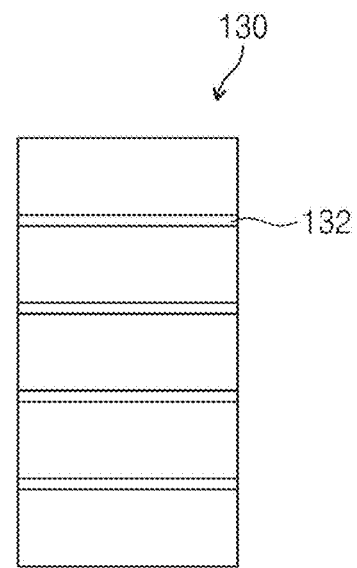

Referring to FIG. 3D, the first electrode 130 may have a stripe pattern. The structure of the first slit 132 may have a shape including lines extended in one direction and provided repeatedly and in parallel to each other.

Referring to FIG. 3E, the first electrode 130 may have a lattice pattern. The structure of the first slits 132a and 132b may be a connected structure of a first line 132a extended in a first direction D1 and a second line 132b extended in a second direction D2 perpendicular to the first direction D1.

Referring to FIG. 3F, the first electrode 130 may include square patterns, and each square pattern may include four triangles divided by the diagonals of the square pattern. The structure of first slits 132a, 132b and 132c may divide the square pattern and may divide the four triangles in the square pattern. More particularly, the first slits 132a, 132b and 132c may include a first line 132a extended in a first direction D1, a second line 132b extended in a second direction D2 different from the first direction D1 and a third line 132c extended in a third direction D3 crossing the second direction D2. The first and second lines 132a and 132b may make connection to each other, and the first and third lines 132a and 132c may make connection to each other.

Referring to FIG. 3G, the first electrode 130 may include square patterns, and each square pattern may include two triangles divided by the diagonal of the square pattern. The structure of the first slits 132a and 132b may divide the square pattern and the two triangles in the square pattern. More particularly, the first slit may include a first line 132a extended in a first direction D1 and a second line 132b extended in a second direction D2 different from the first direction D1. The first and second lines 132a and 132b may be connected to each other.

Referring to FIG. 3H, the first electrode 130 may have square patterns and a circular first slit 132a in the square pattern. The first slit 132a in the square pattern is illustrated as a circle in FIG. 3H; however the first slit 132a may include a polygon. In addition, the first slit may further include a structure 132b dividing the square patterns.

Figure 3I:
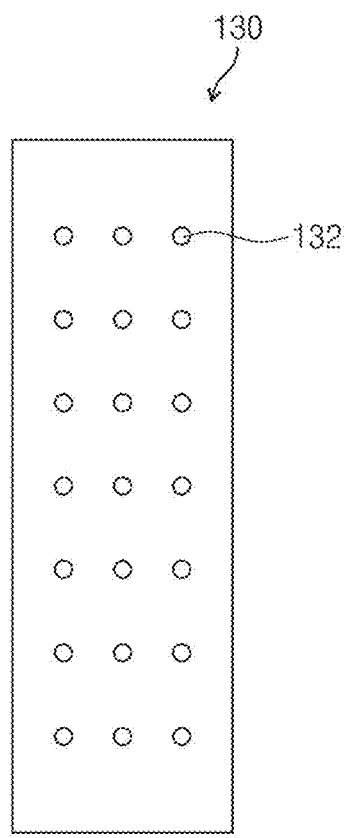

Referring to FIG. 3I, the first electrode 130 may include a plurality of first slits 132 having a circular shape. The first slits 132 may be separated by the same distance and may be disposed in rows and columns. The first slits 132 in FIG. 3I are illustrated as circles, however the first slits 132 may have a polygon.

Hereinafter, the liquid crystal layer will be explained in detail.

(First Embodiment of Liquid Crystal Layer)

A liquid crystal layer according to exemplary embodiments of the present invention may include a negative nematic liquid crystal, a positive nematic liquid crystal and a ferroelectric liquid crystal.

According to an embodiment, the liquid crystal layer may include from about 70 wt % to about 99.9 wt % of a negative nematic liquid crystal. The liquid crystal layer may further include a mixture of from about 0.1 wt % to about 30 wt % of a positive nematic liquid crystal and a ferroelectric liquid crystal.

The mixture of the positive nematic liquid crystal and the ferroelectric liquid crystal may include from about 1 wt % to about 90 wt % of the positive nematic liquid crystal and from about 10 wt % to about 99 wt % of the ferroelectric liquid crystal.

According to an embodiment, the amount of the ferroelectric liquid crystal in the liquid crystal layer may be from about 0.01 wt % to about 29.7 wt %. When the amount of the ferroelectric liquid crystal is less than or equal to about 0.01 wt % of the total amount of the liquid crystal layer, the liquid crystal alignment of the liquid crystal layer may become unstable. In addition, when the amount of the ferroelectric liquid crystal exceeds about 29.7 wt % of the total amount of the liquid crystal layer, the viscosity of the liquid crystal layer may increase, and the response time of a display apparatus including the liquid crystal layer may be decreased. More preferably, the liquid crystal layer may include about 10 wt % of the ferroelectric liquid crystal based on the total amount of the liquid crystal layer.

Hereinafter, exemplary materials of the negative nematic liquid crystal, the positive nematic liquid crystal and the ferroelectric liquid crystal will be explained. However, the negative nematic liquid crystal, the positive nematic liquid crystal and the ferroelectric liquid crystal of the present invention will not be limited to the following exemplary materials.

First, the properties of the nematic liquid crystal will be explained in brief, and exemplary materials of the negative nematic liquid crystal and the positive nematic liquid crystal will be classified.

The nematic liquid crystal is called a liquid crystal in which the longitudinal axes of thin and long liquid crystal molecules are directed in a certain direction even though the positions thereof are random. Each molecule of the nematic liquid crystal may freely move in the longitudinal axis direction thereof, and the molecules of the nematic liquid crystal may have small viscosity and may be liable to flow. Since the directions of the upper portion and the lower portion of the nematic molecules are substantially the same, the polarity may be offset, and ferroelectric properties are not exhibited in general. The physical properties are very different in the axis direction of the nematic liquid crystal and the perpendicular direction thereof. Thus, the nematic liquid crystal is a material having an optical anisotropy. When the difference ($\Delta\in$) of the dielectric constant of which axis direction is in parallel and the dielectric constant of which axis direction is perpendicular is less than 0, the nematic liquid crystal is called the negative nematic liquid crystal, while being called the positive nematic liquid crystal when the difference is greater than 0.

Negative Nematic Liquid Crystal

According to an embodiment, the negative nematic liquid crystal may include nematic liquid crystal molecules having negative dielectric anisotropy. In an aspect, the nematic liquid crystal molecules having negative dielectric anisotropy may be a single kind. In another aspect, the nematic liquid crystal molecules having negative dielectric anisotropy may be a mixture of different kinds. For example, the nematic liquid crystal molecules having negative dielectric anisotropy may include liquid crystal molecules having negative dielectric anisotropy and first dielectric constant and liquid crystal molecules having negative dielectric anisotropy and second dielectric constant. In this case, the second dielectric constant and the first dielectric constant may be different.

According to another embodiment, the negative nematic liquid crystal may include nematic liquid crystal molecules having negative dielectric anisotropy and first base liquid crystal molecules. The first base liquid crystal molecules may include at least one selected from the group consisting of liquid crystal molecules having negative dielectric anisotropy, liquid crystal molecules having positive dielectric anisotropy, and neutral liquid crystal molecules. In an aspect, the negative nematic liquid crystal may include nematic liquid crystal molecules having one kind of the liquid crystal molecules and the first base liquid crystal molecules. In another aspect, the negative nematic liquid crystal may include liquid crystal molecules having various kinds of liquid crystal molecules having negative dielectric anisotropy and the first base liquid crystal molecules.

Hereinafter, exemplary materials of the negative nematic liquid crystal will be explained. The following materials may be used alone or as a mixture.

The negative nematic liquid crystal may include a halogen group, a cyanide group or an isocyanate group nematic liquid crystal. The negative nematic liquid crystal may use the halogen group, the cyanide group or the isocyanate group nematic liquid crystal alone or as a mixture thereof. As described above, the negative nematic liquid crystal may further include the first base liquid crystal molecules.

The halogen group negative nematic liquid crystal may include a fluorine group, a chlorine group, a bromine group material, etc. and may have a monocyclic structure or a polycyclic structure.

The halogen group negative nematic liquid crystal of a dicyclic structure may be represented by the following Formulae 1 and 2.

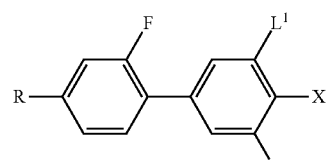

Formula 1

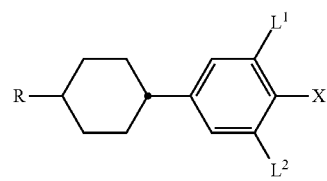

Formula 2

In Formulae 1 and 2, R may be alkyl or alkoxy having 1 to 15 carbon atoms (where hydrogen may be substituted with CN, $CF_3$ or halogen, and a —$CH_2$— group may be substituted with —CH═CH—, —O—, —CO—, —COO—, —OOC—, —O—OC—O— or —S—), X is independently halogen, or halogenated alkyl, halogenated alkoxy, halogenated alkenyl or halogenated oxy having 1 to 15 carbon atoms, and $L^1$ and $L^2$ are independently hydrogen or halogen.

The halogen group negative nematic liquid crystal having a tricyclic structure may be represented by the following Formulae 3 to 6.

Formula 3

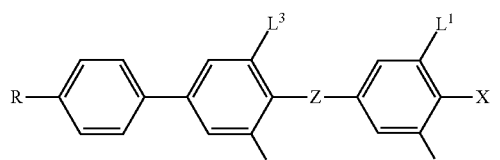

Formula 4

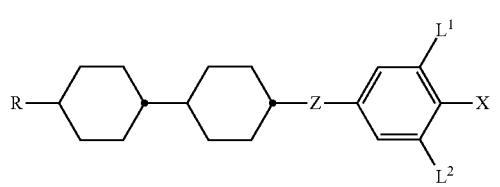

Formula 5

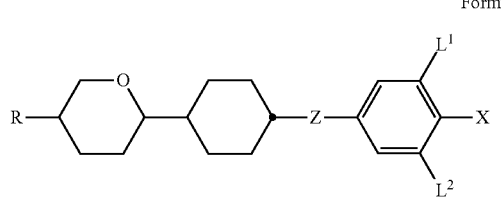

Formula 6

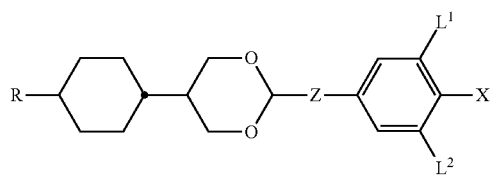

In Formulae 3 to 6, R, $L^1$ and $L^2$ are the same as defined in the above Formulae 1 and 2, $L^3$ and $L^4$ are independently hydrogen or halogen, Z is a single bond, —CF$_2$O—, —OCF$_2$—, —COO—, —O—CO—, —CH$_2$CH$_2$—, —CH═CH—, —C≡C—, —CH$_2$O—, —(CH$_2$)$_4$—, CF═CF—CH═CF— or —CF═CH—.

The halogen group negative nematic liquid crystal having a tetracyclic structure may be represented by the following Formulae 7 to 9.

Formula 7

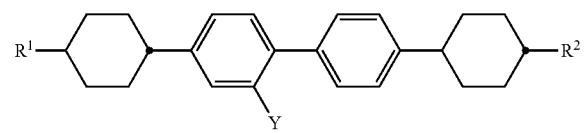

Formula 8

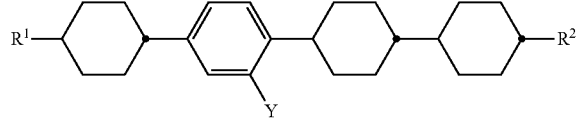

Formula 9

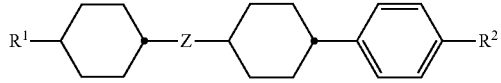

In Formulae 7 to 9, Y represents hydrogen or halogen, $R^1$ represents alkyl or alkenyl having 1 to 15 carbon atoms, $R^2$ represents alkyl, alkenyl or alkoxy having 1 to 15 carbon atoms (in $R^1$ and $R^2$, hydrogen may be substituted with CN, CF$_3$ or a halogen atom, and CH$_2$ may be substituted with —O—, —S—, —C≡C—, —CH═CH—, —OC—O— or —O—CO—), Z is a single bond, —CF$_2$O—, —OCF$_2$—, —COO—, —O—CO—, —CH$_2$CH$_2$—, —CH═CH—, —C≡C—, —CH$_2$O—, —(CH$_2$)$_4$—, CF═CF—, —CH═CF— or —CF═CH—.

The halogen group negative nematic liquid crystal includes a fluorinated indane derivative and may be represented by the following Formula 10.

Formula 10

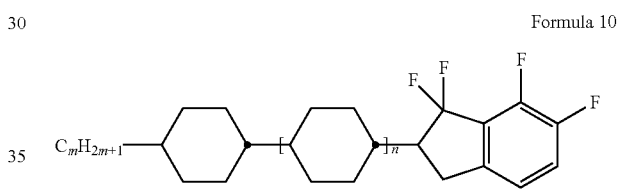

In the above Formula, m represents an integer, and n is 0 or 1.

The cyanide group negative nematic liquid crystal may be represented by the following Formulae 11 to 13.

Formula 11

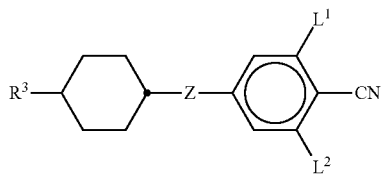

Formula 12

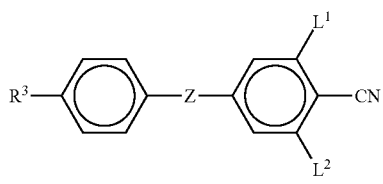

Formula 13

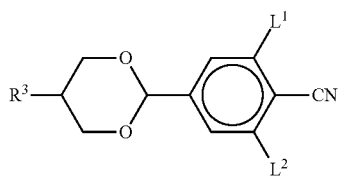

In Formulae 11 to 13, $R^3$ is an alkyl group having 1 to 15 carbon atoms (where hydrogen may be unsubstituted or at least monosubstituted with CN, $CF_3$ or halogen, and a $CH_2$ group may be substituted with —O—, —S—, —C≡C—, —CH=CH—, —OC—O— or —O—CO—), $L^1$ and $L^2$ are independently hydrogen or halogen, and Z is a single bond, —$CF_2$O—, —O$CF_2$—, —COO—, —O—CO—, —$CH_2CH_2$—, —CH=CH—, —C≡C—, —$CH_2$O—, —$(CH_2)_4$—, CF=CF—, —CH=CF— or —CF=CH—.

The negative nematic liquid crystal may be a single material or a mixture. According to exemplary embodiments, the negative nematic liquid crystal mixture may include:

(a) a liquid crystal component A including at least one compound having dielectric anisotropy of less than about −1.5;

(b) a liquid crystal component B including at least one compound having dielectric anisotropy from about −1.5 to about +1.5; and (c) a chiral component C.

The liquid crystal component A may include at least one compound of the following Formulae 14 to 17.

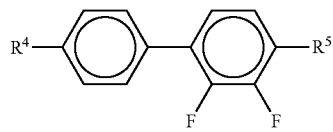

Formula 14

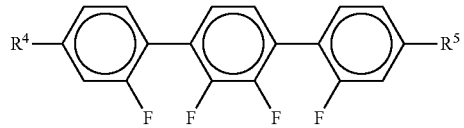

Formula 15

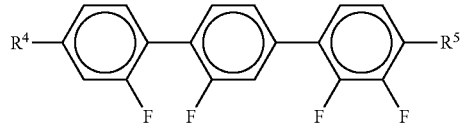

Formula 16

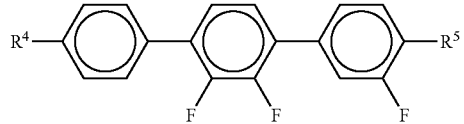

Formula 17

The liquid crystal component B may include at least one compound of the following Formulae 18 to 20. The liquid crystal component B may be the above-described first base liquid crystal molecules.

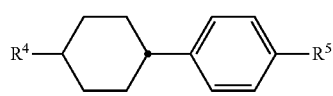

Formula 18

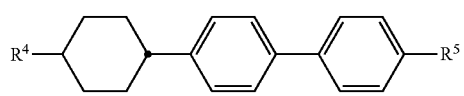

Formula 19

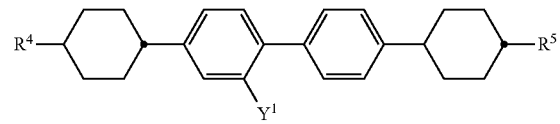

Formula 20

In Formulae 14 to 20, $R^4$ and $R^5$ are independently alkyl, alkoxy, alkoxyalkyl, alkenyl or alkenyloxy having 1 to 15 carbon atoms (where hydrogen may be substituted with CN, $CF_3$ or halogen, and a —$CH_2$— group may be substituted with —CH=CH—, —O—, —CO—, —COO—, —OOC—, —O—OC—O— or —S—), and $Y^1$ represents hydrogen or halogen.

Examples of the chiral component C may include a plurality of chiral dopants as follows. The selection of the chiral dopant is not significant per se.

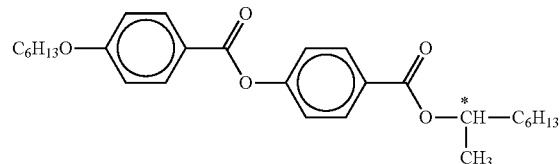

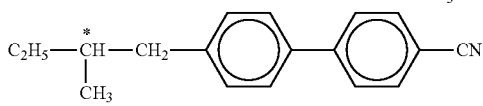

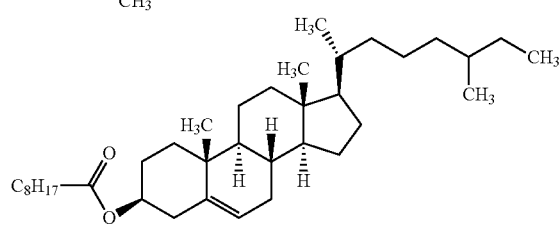

Positive Nematic Liquid Crystal

According to an embodiment, the positive nematic liquid crystal may include nematic liquid crystal molecules having positive dielectric anisotropy. In an aspect, the nematic liquid crystal molecules having positive dielectric anisotropy may be a single kind. In another aspect, the nematic liquid crystal molecules having positive dielectric anisotropy may be a mixture of different kinds. For example, the nematic liquid crystal molecules having positive dielectric anisotropy may include liquid crystal molecules having positive dielectric anisotropy and first dielectric constant and liquid crystal molecules having positive dielectric anisotropy and second dielectric constant. In this case, the second dielectric constant and the first dielectric constant may be different.

According to another embodiment, the positive nematic liquid crystal may include the nematic liquid crystal molecules having positive dielectric anisotropy and second base liquid crystal molecules. The second base liquid crystal molecules may include at least one selected from the group consisting of liquid crystal molecules having negative dielectric anisotropy, liquid crystal molecules having positive dielectric anisotropy, and neutral liquid crystal molecules. In an aspect, the positive nematic liquid crystal may include nematic liquid crystal molecules having one kind of positive dielectric anisotropy and the second base molecules. In another aspect, the positive nematic liquid crystal may include liquid crystal molecules having various kinds of liquid crystal molecules having positive dielectric anisotropy and the second base liquid crystal molecules.

Hereinafter, exemplary materials of the positive nematic liquid crystal will be explained. The following materials may be used alone or as a mixture.

The positive nematic liquid crystal may include a cyanide group, an isocyanate group or a halogen group positive nematic liquid crystal. The positive nematic liquid crystal may use the cyanide group, the isocyanate group or the halogen group positive nematic liquid crystal alone or as a mixture thereof. As described above, the positive nematic liquid crystal may further include second base liquid crystal molecules.

The cyanide group positive nematic liquid crystal may have a dicyclic structure or a tricyclic structure.

The cyanide group nematic liquid crystal of the dicyclic structure may be represented by the following Formula 21.

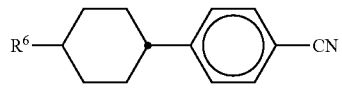

Formula 21

In Formula 21, $R^6$ is alkenyl having 1 to 15 carbon atoms (where hydrogen may be substituted with CN, $CF_3$ or halogen, and a —$CH_2$— group may be optionally substituted with —CH=CH—, —O—, —CO—, —COO—, —OOC—, —O—OC—O— or —S—). Particular examples of Formula 21 are illustrated as follows.

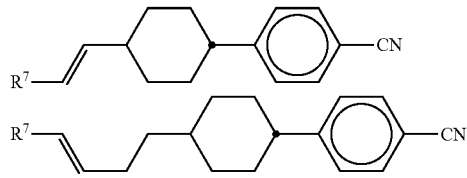

In Formula 21, $R^7$ is H, $CH_3$, $C_2H_5$ or n-$C_3H_7$.

The positive nematic liquid crystal having the tricyclic structure may be represented by the following Formula 22.

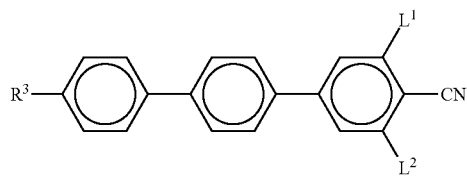

Formula 22

As defined in the above Formulae 11 to 13, $R^3$ may be an alkyl group having at most 15 carbon atoms unsubstituted or at least monosubstituted with CN, $CF_3$ or halogen, where at least one $CH_2$ of the alkyl group may be substituted with —O—, —S—, —C≡C—, —CH=CH—, —OC—O— or —O—CO—, and $L^1$ and $L^2$ are independently hydrogen or halogen.

The isocyanate group positive nematic liquid crystal may be represented by the following Formula 23.

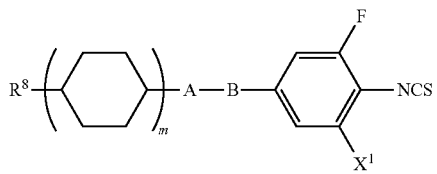

Formula 23

In Formula 23, $R^8$ is $C_nH_{2n+1}O$, $C_nH_{2n+1}$, or $C_nH2_{n-1}$, where n is 1 to 15, A is

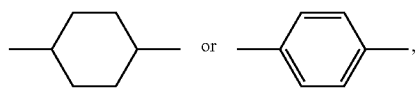

B is —$CH_2$—$CH_2$— or —C≡C—, $X^1$ is hydrogen or halogen, and m is 1, 2, 3 or 4. Particular examples of Formula 23 are illustrated as follows.

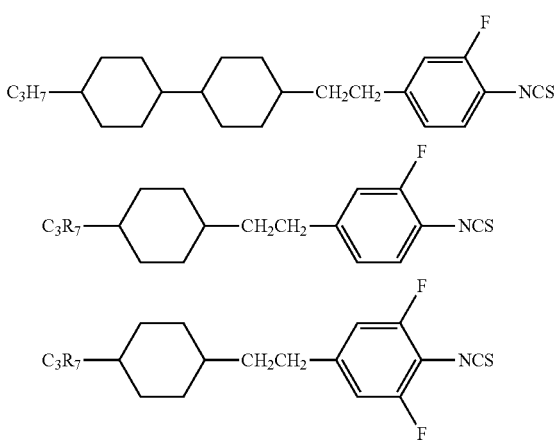

The halogen group positive nematic liquid crystal may include a fluorine group or a chlorine group material, and may have a monocyclic structure or a polycyclic structure. The fluorine group positive nematic liquid crystal may be represented by the following Formulae 24 to 27.

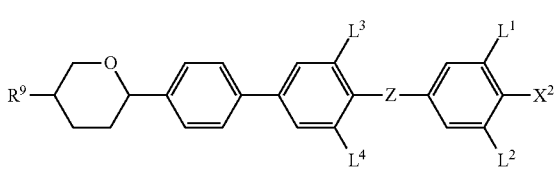

Formula 24

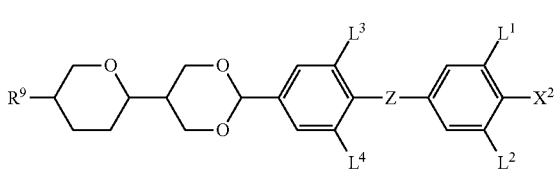

Formula 25

Formula 26

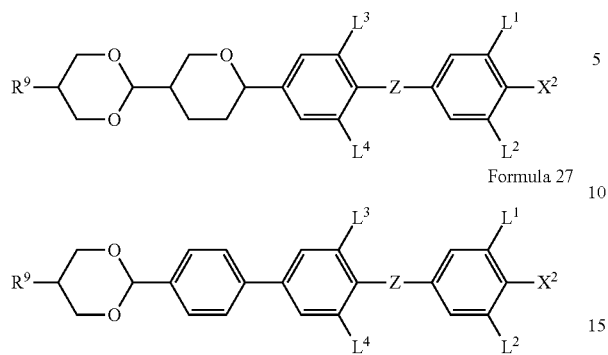

Formula 27

In Formulae 24 to 27, $R^9$ and $R^{10}$ are alkyl, alkoxy, fluorinated alkyl, fluorinated alkoxy, alkenyl, alkenyloxy, alkoxyalkyl or fluorinated alkenyl having 1 to 15 carbon atoms, $L^{21}$, $L^{22}$, $L^{23}$ and $L^{24}$ are independently hydrogen or fluorine, and Z represents a single bond, —$CF_2O$—, —$OCF_2$—, —COO—, —O—CO—, —$CH_2CH_2$—, —CH=CH—, —C≡C—, —$CH_2O$—, —$(CH_2)_4$—, CF=CF—, —CH=CF— or —CF=CH—.

The halogen group positive nematic liquid crystal of the dicyclic structure may be represented by the following Formula 28.

Formula 28

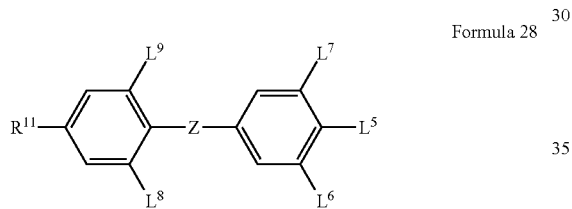

In Formula 28, $R^{11}$ represents hydrogen, halogen, or alkenyl, alkenyloxy, alkynyl or alkynoxy having 1 to 15 carbon atoms, where at least one of —$CH_2$— groups in $R^{11}$ may be substituted with —O—, C=O or —S—, $L^5$ is halogen, or fluorinated alkyl, fluorinated alkoxy, fluorinated alkenyl, alkenyloxy or oxyalkyl having 1 to 15 carbon atoms, —$OCF_3$, —$OCHFCF_3$ or $SF_5$, $L^6$, $L^7$, $L^8$ and $L^9$ are independently hydrogen (H) or halogen, and Z is a single bond, —$CF_2O$—, —$OCF_2$—, —COO—, —O—CO—, —$CH_2CH_2$—, —CH=CH—, —C≡C—, —$CH_2O$—, —$(CH_2)_4$—, CF=CF—, —CH=CF— or —CF=CH—. Particular examples of Formula 28 are illustrated as follows.

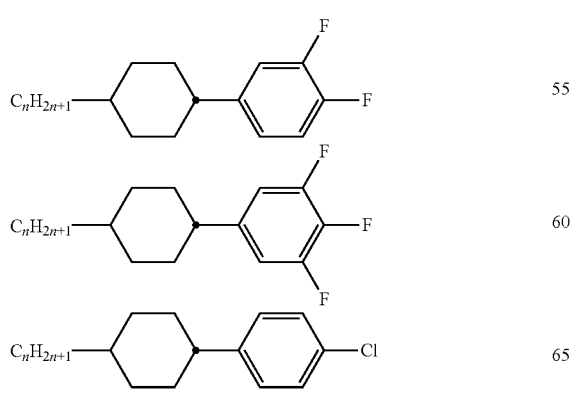

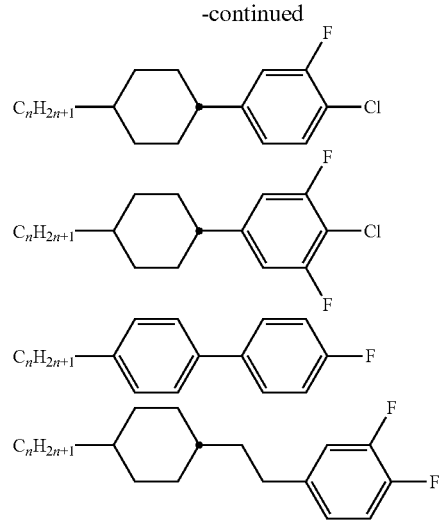

In the above Formulae, n is 1 to 15.

The halogen group positive nematic liquid crystal of the tricyclic structure may be represented by the following Formulae 29 to 33.

Formula 29

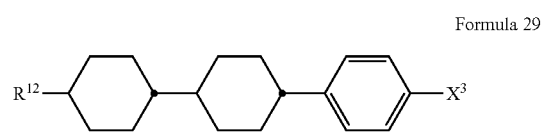

Formula 30

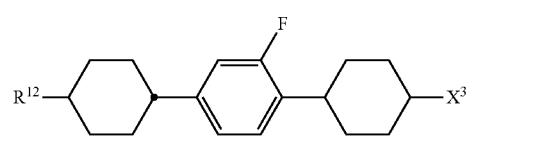

Formula 31

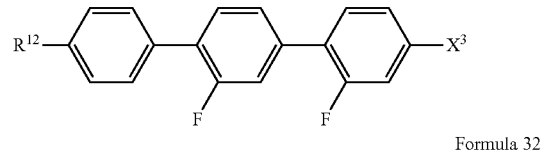

Formula 32

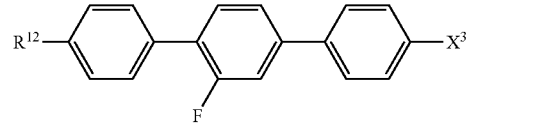

Formula 33

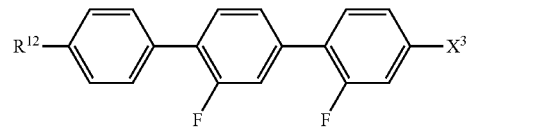

In Formulae 29 to 33, $R^{12}$ is alkyl or alkenyl having 1 to 15 carbon atoms (where the alkyl or the alkenyl may be unsubstituted or at least monosubstituted with CN, $CF_3$ or halogen, at least one of —$CH_2$— groups may be substituted with —O—), $X^3$ is —F, —Cl, —$OCF_3$, —$OCHF_2$, —$OCH_2F$ or —$CF_3$. Particular examples of Formula 29 are illustrated as follows.

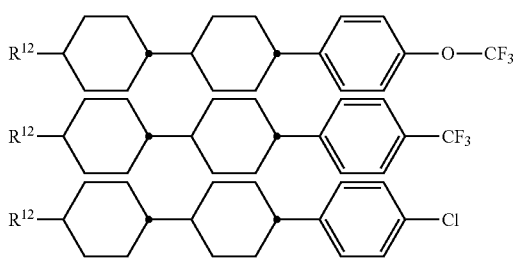

Here, R¹² is the same as defined above.

The halogen group positive nematic liquid crystal of the tetracyclic structure may be represented by the following Formulae 34 to 36.

Formula 34

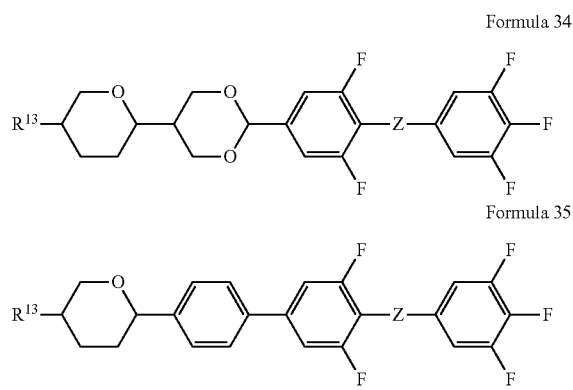

Formula 35

In Formulae 34 to 36, $R^{13}$ is independently alkyl, alkoxy or alkenyl having 1 to 15 carbon atoms (where the alkyl, the alkoxy or the alkenyl may be substituted with CN, CF₃ or halogen, and a —CH₂— group may be substituted with —CH=CH—, —O—, —CO—, —COO—, —OOC—, —O—OC—O— or —S—), and Z may be a single bond, —CF₂O—, —OCF₂—, —COO—, —O—CO—, —CH₂CH₂—, —CH=CH—, —C≡C—, —CH₂O—, —(CH₂)₄—, CF=CF—, —CH=CF— or —CF=CH—.

The positive nematic liquid crystal including three substituted fluorine groups or cyanide groups may be represented by the following Formula 37.

Formula 37

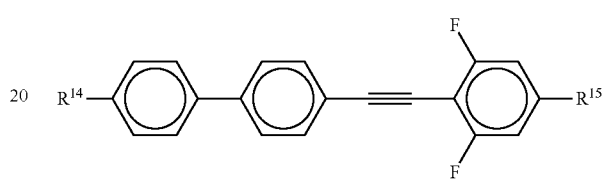

In Formula 37, at least one of two $R^{14}$ and $R^{15}$ may be an alkenyl group having at most 15 carbon atoms and unsubstituted or at least monosubstituted with CN, CF₃ or halogen, and the remainder thereof may be an alkyl group having at most 15 carbon atoms and unsubstituted or at least monosubstituted with CN, CF₃ or halogen, where at least one of CH₂ groups in $R^{14}$ and $R^{15}$ may be replaced with —O—, —S—, —C≡C—, —OCO—, or —O—CO—. Particular examples of Formula 37 are illustrated as follows.

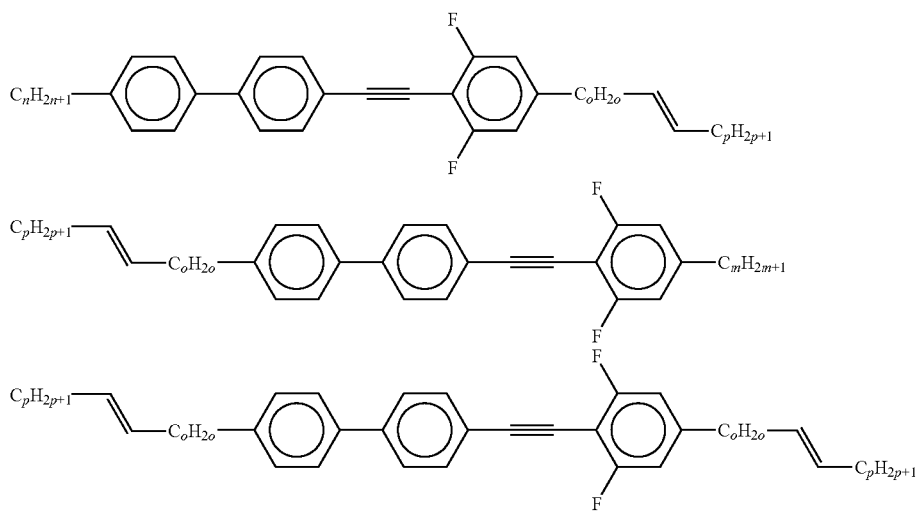

-continued

Formula 36

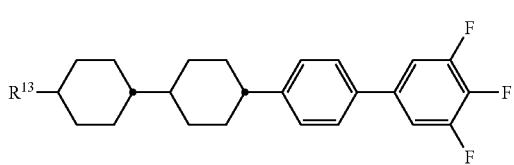

n and m are 1 to 10, and preferably, 1 to 5, and o and p are independently the same or different and 0 to 10, and preferably, 0 to 5, where the sum of o+p may preferably be less than or equal to 7.

The positive nematic liquid crystal may be a single material or a mixture. The mixture of the positive nematic liquid crystal according to an embodiment may include:

a) a liquid crystal component A including at least one compound having dielectric anisotropy of greater than about +1.5;

b) a liquid crystal component including at least one compound having dielectric anisotropy from about −1.5 to about +1.5; and c) a chiral component C in case of need.

Liquid crystal component A may include at least one compound of the above Formula 37. Liquid crystal component B may include at least one compound represented by the following Formula 38. The above liquid crystal component B may be the above-described second base liquid crystal molecules.

Component C may include a plurality of chiral dopants and may use a plurality of commercially available dopants such as cholesteryl nonanoate (CN), S-811, S-1011, S-2011 (Merck KGaA in Darmstat, Germany) and CB15 (BDH in Poole, England). The selection of the dopant itself is not significant.

Formula 38

$R^{16}$ and $R^{17}$ are independently the same or different and may be an alkyl group having at most 15 carbon atoms unsubstituted or at least monosubstituted with CN, $CF_3$ or halogen, where at least one of $CH_2$ in the alkyl group may be replaced with —O—, —S—, —C≡C—, —C═C—, —OC—O—, or —OCO—, and a 1,4-phenylene ring may be independently monosubstituted or polysubstituted with fluorine.

Ferroelectric Liquid Crystal

A ferroelectric liquid crystal has spontaneous polarization even though an electric field is not applied and is a kind of electrically insulating dielectric material, however, the dielectric polarity thereof is not proportional to an electric field different from a general dielectric material, and the ferroelectric liquid crystal exhibits ideality by which the relation between polarity and electric field has electrical hysteresis. The ferroelectric liquid crystal typically has the physical properties of the spontaneous polarization and polarization reversal phenomenon of the spontaneous polarization by an electric field.

According to an embodiment, the ferroelectric liquid crystal may include ferroelectric liquid crystal molecules. In an aspect, the ferroelectric liquid crystal molecules may be one kind. In another aspect, the ferroelectric liquid crystal molecules may be a mixture of different kinds. For example, the ferroelectric liquid crystal molecules may include first ferroelectric liquid crystal molecules and second ferroelectric liquid crystal molecules. In this case, the second ferroelectric liquid crystal molecules may be different from the first ferroelectric liquid crystal molecules.

According to another embodiment, the ferroelectric liquid crystal may include ferroelectric liquid crystal molecules and third base liquid crystal molecules. Each of the third base liquid crystal molecules may include at least one selected from liquid crystal molecules having negative dielectric anisotropy, liquid crystal molecules having positive dielectric anisotropy, and neutral liquid crystal molecules. In an aspect, the ferroelectric liquid crystal may include ferroelectric liquid crystal molecules of one kind and the third base liquid crystal molecules. In another aspect, the ferroelectric liquid crystal may include different ferroelectric liquid crystal molecules and the third base liquid crystal molecules.

Hereinafter, examples of the ferroelectric liquid crystal will be illustrated and explained. The following materials may be used alone or as a mixture thereof.

The ferroelectric liquid crystal may be chiral. For example, the ferroelectric liquid crystal may include a fluorine chiral end ferroelectric liquid crystal, a chiral allyl ester ferroelectric liquid crystal, a center core polyring chiral ferroelectric liquid crystal, a smectic chiral ferroelectric liquid crystal, etc. In addition, the ferroelectric liquid crystal may be a banana shape ferroelectric liquid crystal. The ferroelectric liquid crystal may use the fluorine chiral end ferroelectric liquid crystal, the chiral allyl ester ferroelectric liquid crystal, the center core polyring chiral ferroelectric liquid crystal, the smectic chiral ferroelectric liquid crystal and the banana shape ferroelectric liquid crystal alone, or as a mixture thereof. In addition, the ferroelectric liquid crystal may further include the third base liquid crystal molecules.

The fluorine chiral end ferroelectric liquid crystal may be represented by the following Formula 39.

Formula 39

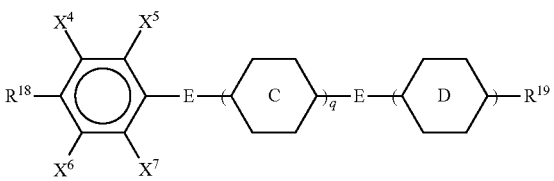

Here, $X^4$, $X^5$, $X^6$ and $X^7$ are independently $CF_3$, $CF_2H$, $CFH_2$, halogen, alkyl or alkoxy, C and D are independently selected from phenyl, mono-fluorophenyl di-fluorophenyl and cyclohexyl, E is independently selected from a single bond, COO, OOC, and C≡C, where at least one of E is a single bond, q is 0 or 1, and $R^{18}$ is the terminal group of the following Formula 40.

Formula 40

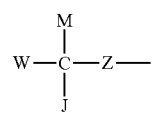

In Formula 40, Z is O, $(CH_2)_1O$, or $(CH_2)_2O$, J and M are independently selected from hydrogen and alkyl having 1 to 15 carbon atoms, W is a linear or branched alkyl chain having 1 to 15 carbon atoms, J, M and W are different from each other, and $R^{19}$ is selected from alkenyl, alkenyloxy, alkynyl or alkynoxy having 1 to 15 carbon atoms.

The chiral allyl ester liquid crystal may be represented by Formula 41.

Formula 41

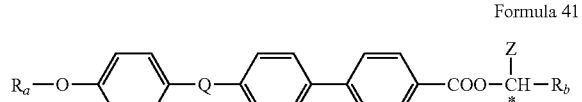

In Formula 41, $R_a$ and $R_b$ are independently alkyl having 1 to 20 carbon atoms, Q is —C(═O)O— or —OC(═O)—, Z represents fluorine-containing alkyl or an alkyl group substituted with halogen, and * represents chiral carbon. Particular examples of Formula 41 may include 4'-n-(octyloxyphenyl4'-(1,1,1-trifluoro-2-octyloxycarbonyl)biphenyl-4-carboxylate of the following Formula.

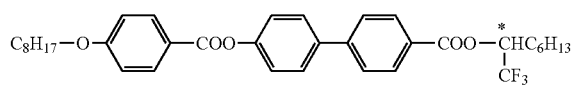

The center core polyring chiral ferroelectric liquid crystal may be represented by Formulae 42 to 44.

Formula 42

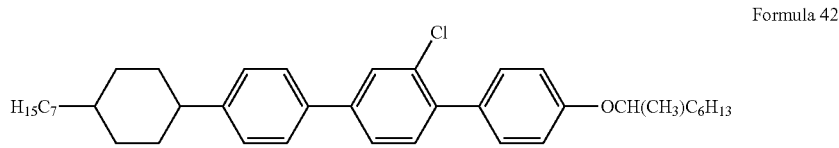

Formula 42 represents S-4-(trans-4-heptylcyclohexyl)-3'-chloro-4"-(1-methylheptyloxy)terphenyl.

Formula 43

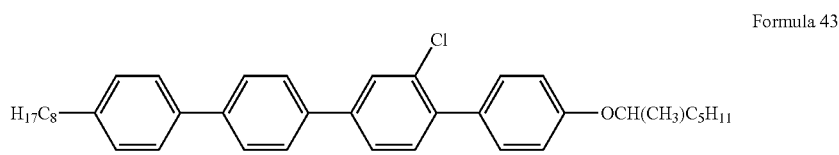

Formula 43 represents R-4-octyl-3"'-chloro-4"'-(1-methylhexyloxy)quarterphenyl.

Formula 44

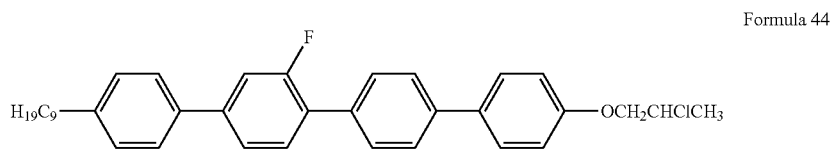

Formula 44 represents S-4-nonyl-3'-fluoro-4"'-(2-chloropropyloxy)quarterphenyl

Formula 45

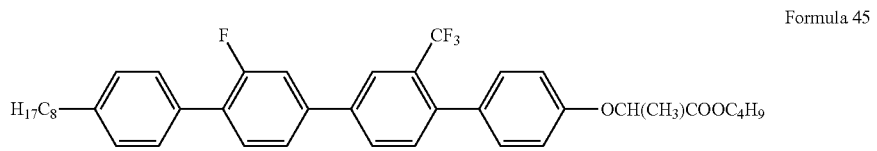

Formula 45 represents S-2-(4-octyl-2'-fluoro-3"-trifluoromethyl-4"'-quarterphenyloxy)-propionate.

The ferroelectric smectic liquid crystal may be represented by at least one of the following Formulae 46 and 47.

Formula 46

Formula 47

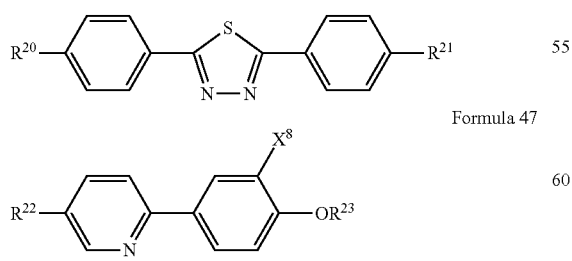

In Formulae 46 and 47, $R^{20}$ and $R^{21}$ are different and a linear alkyl group having 1 to 9 carbon atoms, $R^{22}$ and $R^{23}$ are the same or different and a linear alkyl group having 1 to 18 carbon atoms (in $R^{20}$ to $R^{23}$, hydrogen may be substituted with CN, $CF_3$ or halogen, and a —$CH_2$— group may be optionally substituted with —CH=CH—, —O—, —CO—, —COO—, —OOC—, —O—OC—O— or —S—), and X represents hydrogen or halogen. Particular examples of the above Formulae 47 and 48 are illustrated as follows.

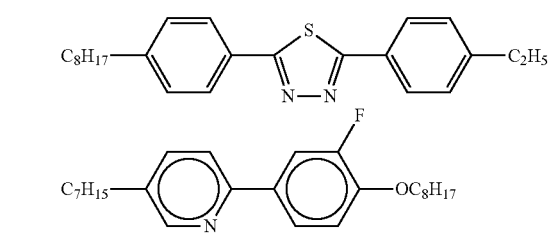

The chiral smectic ferroelectric liquid crystal may be represented by Formula 48.

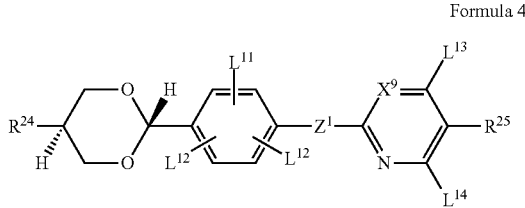

Formula 48

In Formula 48, $R^{24}$ is chiral or achiral alkyl or alkenyl having 1 to 24 carbon atoms, $R^{25}$ is chiral or achiral alkoxy, alkenyloxy, alkylcarbonyloxy (alkyl-COO—) or alkenylcarbonyloxy (alkenyl-COO—) having 1 to 20 carbon atoms (in $R^{24}$ and $R^{25}$, hydrogen may be substituted with CN, $CF_3$ or halogen, and a —CH2- group may be substituted with —CH=CH—, —O—, —CO—, —COO—, —OOC—, —O—OC—O— or —S—), $Z^1$ is a single bond, —COO— or —OOC—, —$CH_2CH_2$—, —CH=CH—, —C≡C—, —$OCH_2$— or —$CH_2O$—, $L^{10}$ to $L^{14}$ are hydrogen, halogen, cyano, nitro, or alkyl or alkenyl having 1 to 20 carbon atoms (where a —$CH_2$— group may be substituted with —CH=CH—, —O—, —CO—, —COO—, —OOC—, —O—OC—O— or —S—), and $X^9$ is —CH— or nitrogen. Particular example of the above Formula 48 is illustrated as follows.

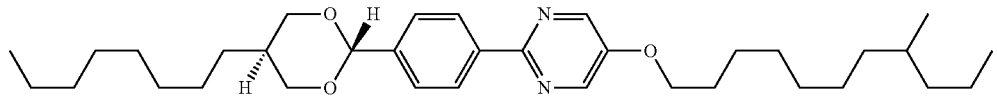 [SMILES: CCCCCCCC[C@H]1CO[C@H](c2ccc(-c3ncc(OCCCCCCCC(C)CCC)cn3)cc2)OC1]

The banana shape ferroelectric liquid crystal may be represented by the following Formula 49.

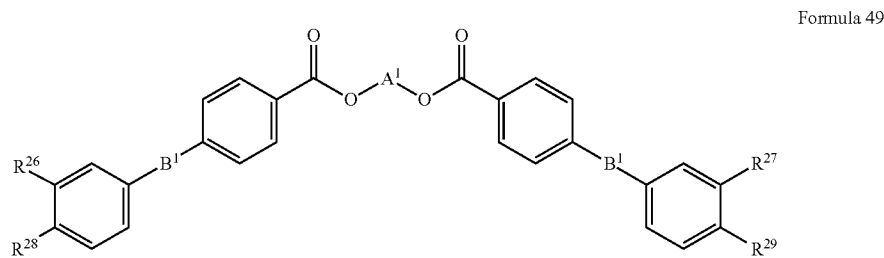

Formula 49

In Formula 49, $A^1$ is

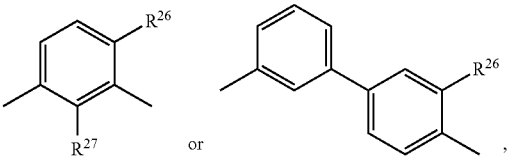

or $B^1$ is

—N=CH— or

—OOC—, $R^{26}$ and $R^{27}$ are independently hydrogen or halogen, and $R^{28}$ and $R^{29}$ are independently alkyl or alkoxy having 8 to 16 carbon atoms. Particular examples of the above Formula 49 are illustrated as follows.

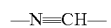

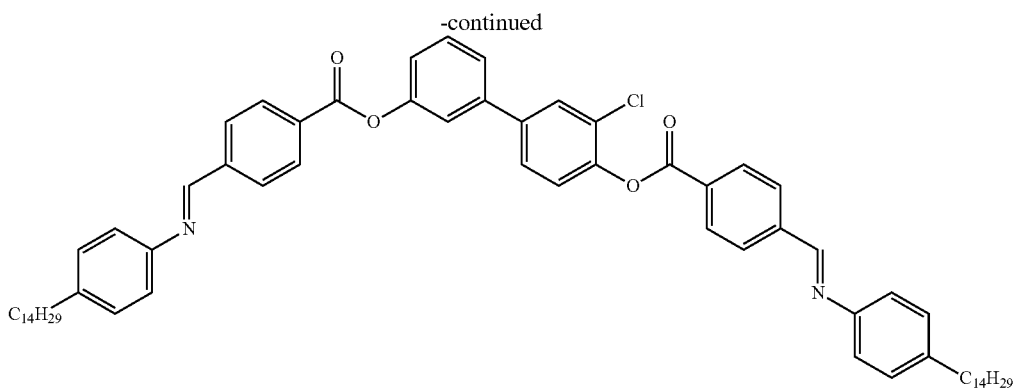

The ferroelectric liquid crystal may be a single material of the ferroelectric liquid crystal or a mixture including the ferroelectric liquid crystal.

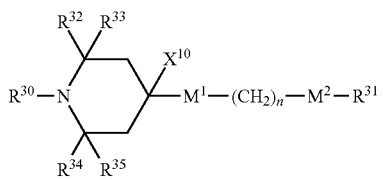

Formula 50

In Formula 50, $X^{10}$ is hydrogen (H), $R^{30}$ is hydrogen or alkyl having 1 to 15 carbon atoms, $R^{31}$ is hydrogen, halogen, or an alkyl group or an alkenyl group having 1 to 20 carbon atoms (where one or two of —CH$_2$— groups may be replaced with —O—, —C(=O)O— or —Si(CH$_3$)$_2$—, and at least one hydrogen of the alkyl or the alkenyl group may be replaced with fluorine or CH$_3$), and each of $R^{32}$, $R^{33}$, $R^{34}$ and $R^{35}$ is CH$_3$.

As described above, when an electric field is applied from outward to the liquid crystal layer according to an embodiment of the present invention, induced dipole may be in parallel to the electric field, and the negative nematic liquid crystal may be aligned in a vertical direction to the electric field. Since the ferroelectric liquid crystal of the liquid crystal layer has great alignment properties between molecules and great alignment properties according to the electric field, the alignment of the liquid crystal layer may become uniform and stable.

According to an embodiment of the present invention, the liquid crystal layer may further include a reactive mesogen material. The liquid crystal layer may include from about 0.01 wt % to about 3 wt % of a reactive mesogen material and from about 70 wt % to about 99.9 wt % of a negative nematic liquid crystal. The liquid crystal layer may include from about 0.1 wt % to about 30 wt % of a mixture of a positive nematic liquid crystal and a ferroelectric liquid crystal, and a remainder of a negative nematic liquid crystal.

The reactive mesogen material means a polymerizable mesogenic compound. The "mesogenic compound" or "mesogenic material" may include a material or a compound containing at least one mesogenic group of a rod shape, a plate shape or a disc shape, i.e. a group capable of inducing liquid crystalline behavior. The reactive mesogen material may be polymerized by light such as ultraviolet, etc. and may be a material being aligned according to the alignment state of an adjacent material.

Examples of the reactive mesogen material may include compounds represented by the following Formula.

P1-A1-(Z1-A2)n-P2,

Here, P1 and P2 are at least one of acrylate, methacrylate, vinyl, vinyloxy and epoxy group, A1 and A2 are at least one of 1,4-phenylene and naphthalene-2,6-diyl groups, Z1 is at least one of COO—, OCO— and a single bond, and n is one of 0, 1 and 2.

More particularly, compounds represented by one of the following Formulae may be illustrated.

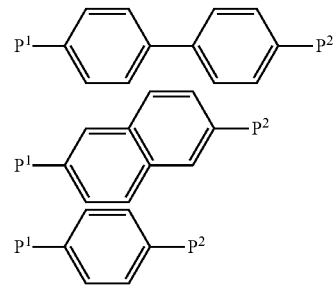

Here, P1 and P2 may include at least one selected from the group consisting of an acrylate group, a methacrylate group, a vinyl group, a vinyloxy group and an epoxy group.

According to this embodiment, since the liquid crystal layer includes the ferroelectric liquid crystal together with the nematic liquid crystal, the alignment of the liquid crystal layer may become uniform and the stability of alignment may be improved. In addition, since the liquid crystal layer includes the reactive mesogen material, the aligning rate and the aligning angle of the liquid crystal layer may be increased, thereby improving optical properties.

(Second Embodiment of Liquid Crystal Layer)

A liquid crystal layer according to exemplary embodiments of the present invention may include a non-ferroelectric liquid crystal and a ferroelectric liquid crystal.

According to an embodiment of the present invention, the non-ferroelectric liquid crystal may include a negative nematic liquid crystal. In this case, the ferroelectric liquid crystal may be from about 0.1 wt % to about 30 wt % in the total amount of the liquid crystal layer. When the ferroelectric liquid crystal is less than or equal to about 0.1 wt % of the liquid crystal layer, the liquid crystal alignment of the liquid crystal layer may become unstable. In addition, when the amount of the ferroelectric liquid crystal exceeds about 30 wt % of the total amount of the liquid crystal layer, the viscosity of the liquid crystal layer may increase, and the response time of a display apparatus including the liquid crystal layer may decrease. More preferably, the liquid crystal layer may include about 10 wt % of the ferroelectric liquid crystal.

According to an aspect, the liquid crystal layer may further include a reactive mesogen material. In this case, the liquid crystal layer may include from about 0.1 wt % to about 30 wt % of the ferroelectric liquid crystal, from about 0.01 wt % to about 3 wt % of the reactive mesogen material and a remainder of the negative nematic liquid crystal.

The configuration elements, the structure and the examples of the negative nematic liquid crystal, the ferroelectric liquid crystal and the reactive mesogen material explained in this embodiment are substantially the same as those described above, and detailed description thereof will be omitted.

According to another embodiment of the present invention, the ferroelectric liquid crystal may include a positive nematic liquid crystal and a negative nematic liquid crystal. In this case, the liquid crystal layer may include from about 70 wt % to about 99.9 wt % of the negative nematic liquid crystal. The liquid crystal layer may further include a mixture of from about 0.1 wt % to about 30 wt % of the positive nematic liquid crystal and the ferroelectric liquid crystal.

The mixture of the positive nematic liquid crystal and the ferroelectric liquid crystal may include from about 1 wt % to about 90 wt % of the positive nematic liquid crystal and from about 10 wt % to about 99 wt % of the ferroelectric liquid crystal.

According to an aspect, the liquid crystal layer may further include a reactive mesogen material. In this case, the liquid crystal layer may include from about 0.1 wt % to about 30 wt % of the mixture of the positive nematic liquid crystal and the ferroelectric liquid crystal, from about 0.01 wt % to about 3 wt % of the reactive mesogen material and a remainder of the negative nematic liquid crystal.

The configuration elements, the structure and the examples of the negative nematic liquid crystal, the positive nematic liquid crystal, the ferroelectric liquid crystal and the reactive mesogen material explained in this embodiment are substantially the same as those described above, and detailed description thereof will be omitted.

According to this embodiment, since the liquid crystal layer includes the ferroelectric liquid crystal together with the non-ferroelectric liquid crystal, the alignment of the liquid crystal layer may become uniform and the stability of the alignment may be improved. In addition, since the liquid crystal layer includes the reactive mesogen material, the aligning rate and the aligning angle of the liquid crystal layer may be increased, thereby improving optical properties.

Hereinafter, a manufacturing method of the liquid crystal layer will be explained in brief.

(Manufacturing Method of Liquid Crystal Layer)

According to an embodiment of the present invention, a liquid crystal layer may be manufactured by mixing a negative nematic liquid crystal, a positive nematic liquid crystal and a ferroelectric liquid crystal. The liquid crystal layer may be manufactured by mixing from about 70 wt % to about 99.9 wt % of the negative nematic liquid crystal and from about 0.1 wt % to about 30 wt % of a mixture of the positive nematic liquid crystal and the ferroelectric liquid crystal. Here, the mixture of the positive nematic liquid crystal and the ferroelectric liquid crystal may be obtained by mixing from about 1 wt % to about 90 wt % of the positive nematic liquid crystal and from about 10 wt % to about 99 wt % of the ferroelectric liquid crystal.

According to an aspect, the liquid crystal layer may further include a reactive mesogen material. In this case, the liquid crystal layer may be manufactured by mixing from about 0.01 wt % to about 3 wt % of the reactive mesogen material, from about 0.1 wt % to about 30 wt % of the mixture of the positive nematic liquid crystal and the ferroelectric liquid crystal, and a remainder of the negative nematic liquid crystal.

According to another aspect of the present invention, the liquid crystal layer may be manufactured by mixing the negative nematic liquid crystal and the ferroelectric liquid crystal. In more detail, the liquid crystal layer may be manufactured by mixing from about 70 wt % to about 99.9 wt % of the negative nematic liquid crystal and from about 0.1 wt % to about 30 wt % of the ferroelectric liquid crystal.

According to an aspect, the liquid crystal layer may further include a reactive mesogen material. In this case, the liquid crystal layer may be manufactured by mixing from about 0.01 wt % to about 3 wt % of the reactive mesogen material, from about 0.1 wt % to about 30 wt % of the ferroelectric liquid crystal and a remainder of the negative nematic liquid crystal.

During performing a mixing process, the process temperature may be the temperature at which isotropic properties of a material included at the greatest amount in the liquid crystal layer are shown. According to exemplary embodiments of the present invention, the process of the mixing may be performed in a temperature range from about 90° C. to about 100° C. The temperature range may be a temperature range at which the negative nematic liquid crystal exhibits isotropic properties. In this embodiment, the mixing of the liquid crystal layer is performed at from about 90° C. to about 100° C., however the mixing temperature of the liquid crystal layer is not specifically limited in the present invention.

Hereinafter, the electrical properties of the liquid crystal layer thus manufactured will be explained.

Figure 4:
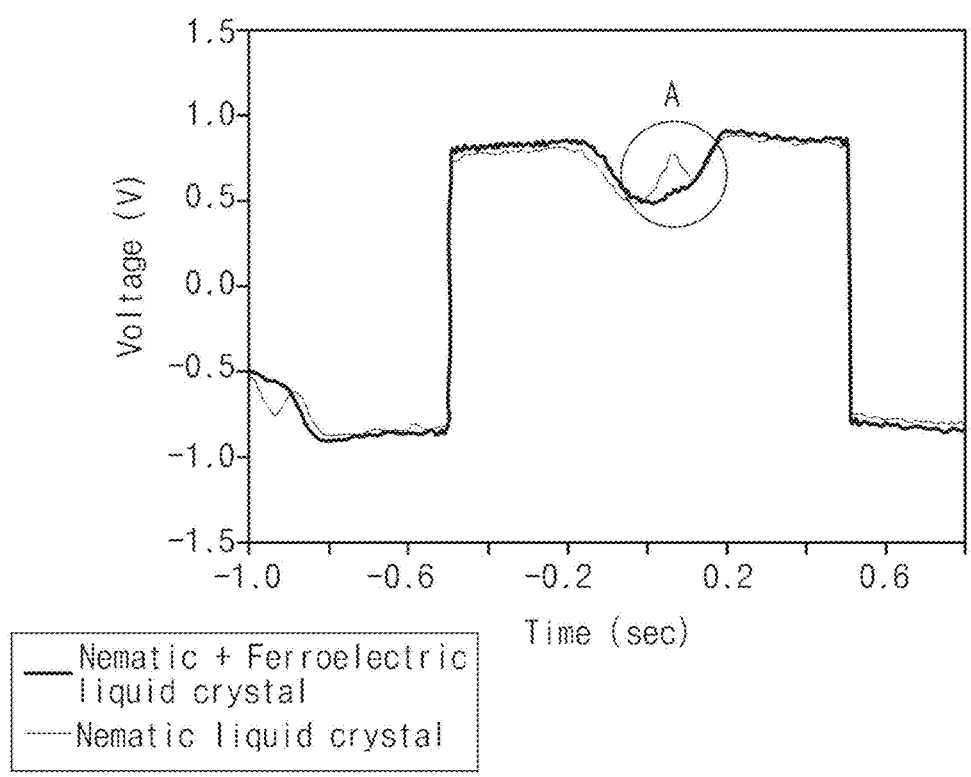
FIG. 4 is a graph illustrating the electrical properties of a liquid crystal layer according to an embodiment of the present invention.

FIG. 4 is a graph illustrating the electrical properties of a liquid crystal layer according to an embodiment of the present invention. In FIG. 1, x-axis represents time, and the unit thereof is second, and Y-axis represents an applied voltage, and the unit thereof is volt [V].

When a voltage is applied to the liquid crystal layer manufactured by the above-described method, a peak that is not shown in a liquid crystal layer including only a nematic liquid crystal is shown as illustrated in FIG. 4. This peak is due to a ferroelectric liquid crystal. Thus, the nematic liquid crystal and the ferroelectric liquid crystal are present not as a compound shape but as a mixture in the liquid crystal layer, and the nematic liquid crystal may exhibit intrinsic properties thereof, and the ferroelectric liquid crystal may exhibit intrinsic properties thereof. Therefore, the nematic liquid crystal and the ferroelectric liquid crystal may reinforce and/or interfere the movement from each other.

Hereinafter, the present invention will be explained in detail through examples and comparative examples. However, the following examples are described only for illustrating the present invention. Thus, the present invention is not limited thereto and may be modified and changed diversely.

Liquid Crystal Display Device in PVA Mode

EXAMPLE 1

A liquid crystal display device including a first display plate including a first electrode having a first slit of Chevron pattern, a second display plate including a second electrode having a second slit of Chevron pattern, and a liquid crystal layer filling up a space between the first and second display plates was manufactured. The liquid crystal display device was manufactured in a PVA mode.

The liquid crystal layer was manufactured by using about 90 wt % of MLC 6608 ($\Delta n=0.084$, $\Delta\in=-4.3$) of Merck Co. and about 10 wt % of KFLC 3 ($\Delta n=0.18$) of Kingston Chemical Co. at about 100° C. The thickness of the liquid crystal layer of the liquid crystal display device was about 3.8 µm.

EXAMPLES 2 to 4

Liquid crystal display devices of Examples 2 to 4 were manufactured by the same procedure described in Example 1 except for the thickness of the liquid crystal layer. The thickness of the liquid crystal layers of Examples 2 to 4 are illustrated in the following Table 1.

EXAMPLE 5

A liquid crystal display device including a first display plate including a first electrode having a first slit of Chevron pattern, a second display plate including a second electrode having a second slit of Chevron pattern, and a liquid crystal layer filling up a space between the first and second display plates was manufactured. The liquid crystal display device was manufactured in a PVA mode.

The liquid crystal layer was manufactured by using about 99 wt % of MLC 6608 ($\Delta n=0.084$, $\Delta\in=-4.3$) of Merck Co. and about 1 wt % of KFLC 3 ($\Delta n=0.18$) of Kingston Chemical Co. at about 100° C. The thickness of the liquid crystal layer of the liquid crystal display device was about 4.3 µm.

EXAMPLES 6 to 8

Liquid crystal display devices of Examples 6 to 8 were manufactured by the same procedure described in Example 5 except for the mixing ratio of MLC 6608 and KFLC 3 in the liquid crystal layer. The mixing ratios of MLC 6608 and KFLC 3 in the liquid crystal layer are illustrated in the following Table 1.

EXAMPLE 9

A liquid crystal display device including a first display plate including a first electrode having a first slit of Chevron pattern, a second display plate including a second electrode having a second slit of Chevron pattern, and a liquid crystal layer filling up a space between the first and second display plates was manufactured. The liquid crystal display device was manufactured in a PVA mode.

The liquid crystal layer was manufactured by using about 90 wt % of MLC 6608 ($\Delta n=0.084$, $\Delta\in=-4.3$) of Merck Co., about 5 wt % of ZKC-5085 ($\Delta n=0.16$, $\Delta\in=12$) of Chisso Co. and about 5 wt % of KFLC 3 ($\Delta n=0.18$) of Kingston Chemical Co. at about 100° C. The thickness of the liquid crystal layer of the liquid crystal display device was about 4.3 µm.

COMPARATIVE EXAMPLE 1

A liquid crystal display device including a first display plate including a first electrode having a first slit of Chevron pattern, a second display plate including a second electrode having a second slit of Chevron pattern, and a liquid crystal layer filling up a space between the first and second display plates was manufactured. The liquid crystal display device was manufactured in a PVA mode.

The liquid crystal layer was manufactured by mixing about 100 wt % of MLC 6608 ($\Delta n=0.084$, $\Delta\in=-4.3$) of Merck Co. The thickness of the liquid crystal layer was about 4.3 µm.

COMPARATIVE EXAMPLES 2 and 3

Liquid crystal display devices of Comparative Examples 2 and 3 were manufactured by the same procedure described in Comparative Example 1 except for the thickness of the liquid crystal layer. The thickness of the liquid crystal layers of Comparative Examples 2 and 3 are illustrated in the following Table 1.

TABLE 1

| | Liquid crystal layer | | | Thickness of |
|---|---|---|---|---|
| | MLC 6608 [wt %] (negative nematic liquid crystal) | KFLC 3 [wt %] (ferroelectric liquid crystal) | ZKC-5085 [wt %] (positive nematic liquid crystal) | liquid crystal layer [µm] |
| Example 1 | 90 | 10 | 0 | 3.8 |
| Example 2 | 90 | 10 | 0 | 4.0 |
| Example 3 | 90 | 10 | 0 | 4.3 |
| Example 4 | 90 | 10 | 0 | 4.5 |
| Comparative Example 1 | 100 | 0 | 0 | 4.3 |
| Comparative Example 2 | 100 | 0 | 0 | 4.5 |
| Comparative Example 3 | 100 | 0 | 0 | 4.8 |
| Example 5 | 99 | 1 | 0 | 4.3 |
| Example 6 | 95 | 5 | 0 | 4.3 |
| Example 7 | 80 | 20 | 0 | 4.3 |
| Example 8 | 70 | 30 | 0 | 4.3 |
| Example 9 | 90 | 5 | 5 | 4.3 |

Evaluation of Transmittance

FIGS. 5A to 5E are graphs for comparing the transmittance of the liquid crystal display devices of Examples 1 to 4 and the liquid crystal display devices of Comparative Examples 1 to 3. FIG. 5F is a graph for comparing the transmittance of the liquid crystal display devices of Comparative Example 1, Example 3 and Example 9.

Figure 5A:
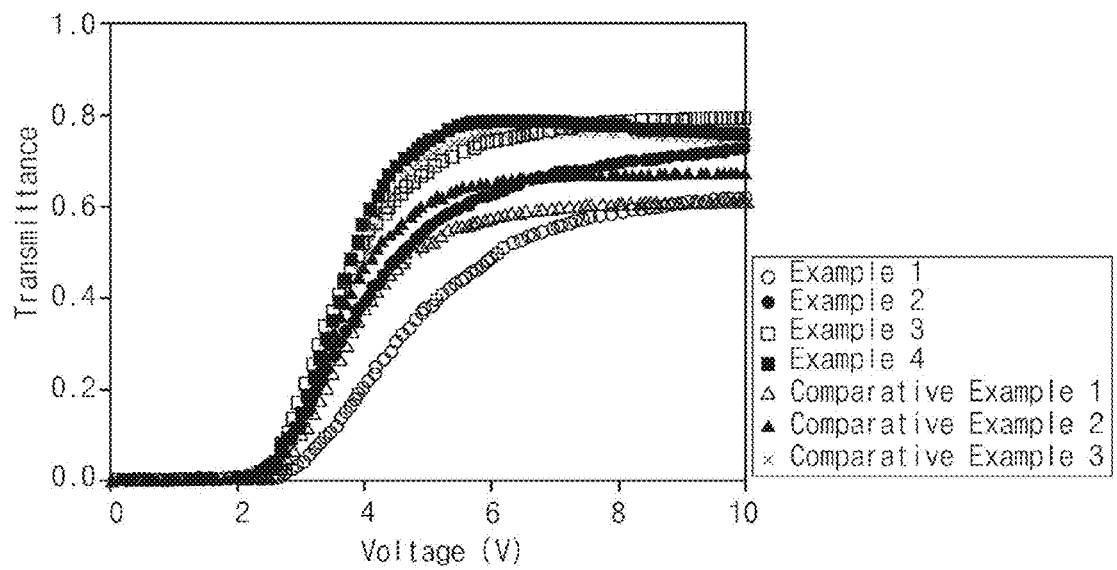
FIGS. 5A to 5E are graphs for comparing the transmittance of the liquid crystal display devices of Examples 1 to 4 and the liquid crystal display devices of Comparative Examples 1 to 3.
Figure 5B:
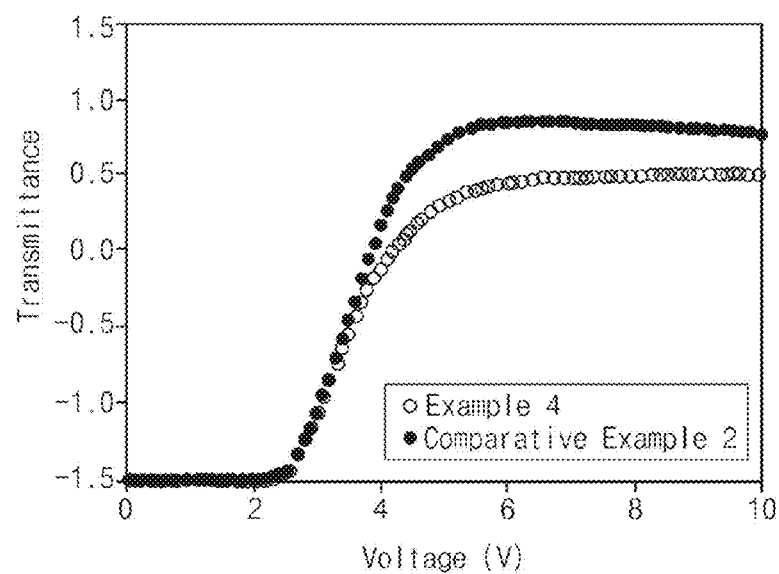
Figure 5C:
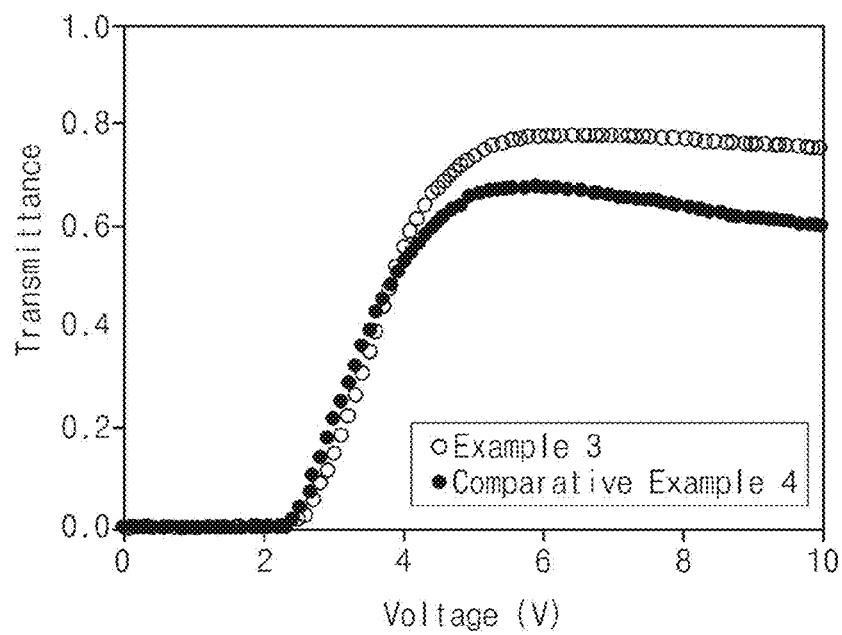

FIGS. 5A to 5C are graphs illustrating the transmittance according to an applied voltage. In FIGS. 5A to 5C, x-axes represent an applied voltage, and the unit thereof is [V], and y-axes represent transmittance.

Referring to FIG. 5A, the transmittance of the liquid crystal display devices according to Examples 1 to 4 is good in general when compared to that of the liquid crystal display devices according to Comparative Examples 1 to 3. In more detail, FIG. 5B selectively illustrates the transmittance of the liquid crystal display devices of Example 4 and Comparative Example 2 in FIG. 5A. Referring to FIG. 5B, the transmittance of the liquid crystal display device of Example 4 is better than that of Comparative Example 2 with the same thickness of the liquid crystal layer of about 4.5 µm. FIG. 5C selectively illustrates the transmittance of the liquid crystal display devices of Example 4 and Comparative Example 3 in FIG. 5A. Referring to FIG. 5C, the transmittance of Example 4 is found better when comparing Example 4 of which transmittance is the best among Examples 1 to 4, and Comparative Example 3 of which transmittance is the best among Comparative Examples 1 to 3.

Figure 5D:
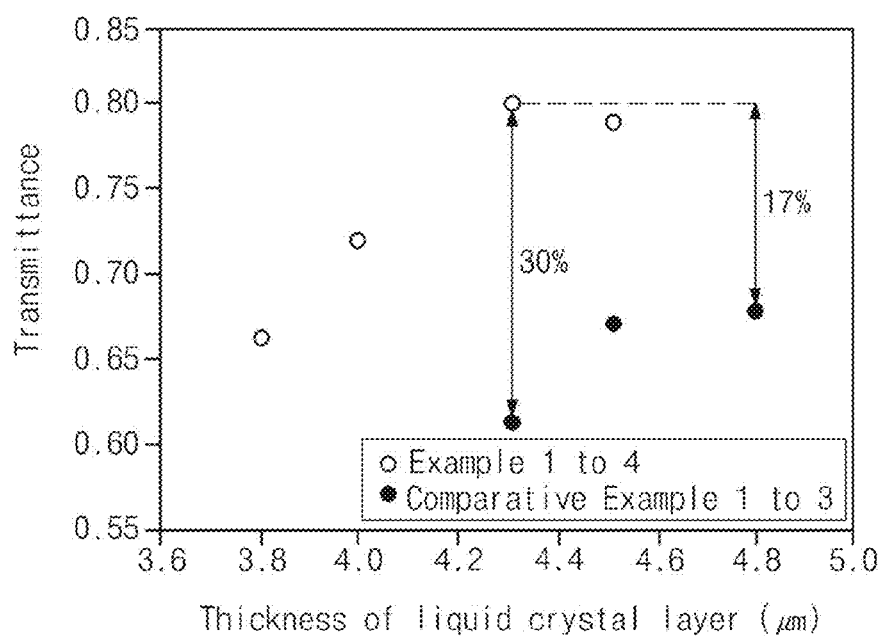
Figure 5E:
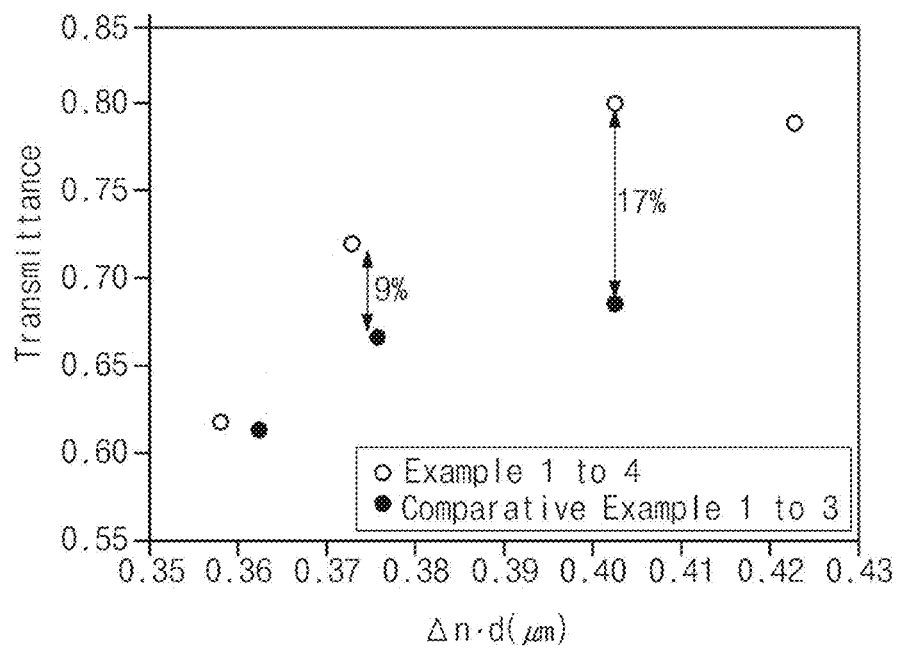
Figure 5F:
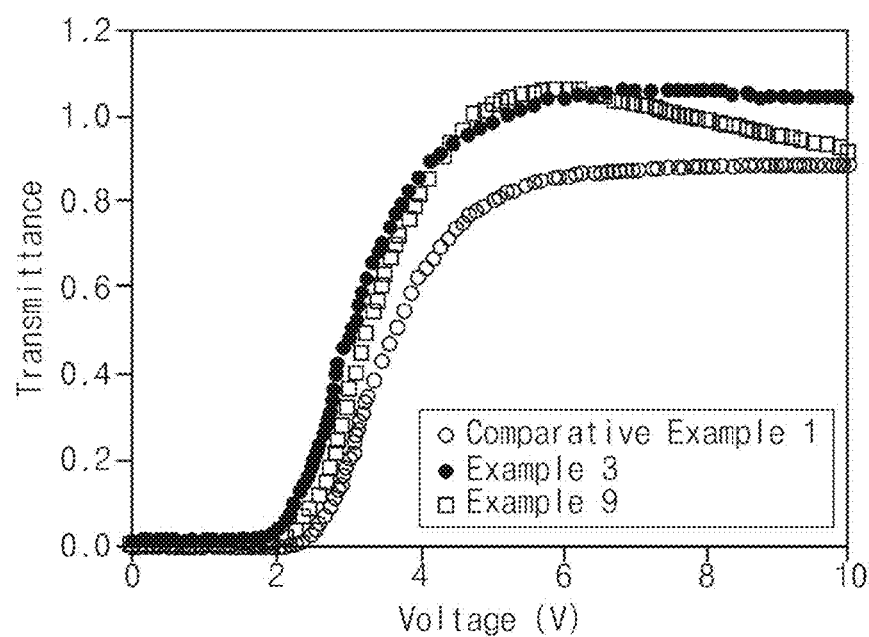
FIG. 5F is a graph for comparing the transmittance of the liquid crystal display devices of Examples 3 and 9 and the liquid crystal display device of Comparative Example 3.

FIGS. 5D and 5E are graphs illustrating the transmittance according to the thickness of the liquid crystal layer after applying a voltage of 7 V in the liquid crystal display devices of Examples 1 to 4 and the liquid crystal display devices of Comparative Examples 1 to 3. In more detail, FIG. 5D is a graph illustrating the transmittance according to the thickness of the liquid crystal layer, and FIG. 5E is a graph illustrating the transmittance according to the product ($\Delta n \cdot d$) of the thickness (d) of the liquid crystal layer and the refractive index ($\Delta n$) of the liquid crystal layer. In FIGS. 5D and 5E, x-axes represent the length, and the unit thereof is [μm], and y-axes represent transmittance.

Referring to FIG. 5D, the transmittance of the liquid crystal display devices of Examples 1 to 4 is better by from about 17% to about 30% when compared to that of the liquid crystal display devices of Comparative Examples 1 to 3 with the same thickness of the liquid crystal layers. Referring to FIG. 5E, when examining the transmittance according to $\Delta n \cdot d$, the transmittance of the liquid crystal display devices of Examples 1 to 4 is better by from about 9% to about 17% when compared to that of the liquid crystal display devices of Comparative Examples 1 to 3.

Referring to FIG. 5F, the transmittance of the liquid crystal display device of Example 3 is better than the transmittance of the liquid crystal display device of Comparative Example 1 as described above. In addition, the transmittance of the liquid crystal display device of Example 9 in which about 5 wt % of a positive nematic liquid crystal, ZKC-5085, was included is better than the transmittance of the liquid crystal display device of Comparative Example 1.

Through the above evaluation, the ferroelectric liquid crystal in the liquid crystal layers of Examples 1 to 4 and Example 9 is expected to induce the alignment of the liquid crystal molecules uniformly and stably. Thus, the transmittance of the liquid crystal display devices of Examples 1 to 4 and Example 9 is better than that of the liquid crystal display devices of Comparative Examples 1 to 3.

Evaluation of Response Time

FIGS. 6A to 6D are graphs for comparing the response time of the liquid crystal display devices of Examples 1 to 4 and the liquid crystal display devices of Comparative Examples 1 to 3. FIG. 6F is a graph for comparing the response time of the liquid crystal display devices of Comparative Example 1, Example 3 and Example 9.

Figure 6A:
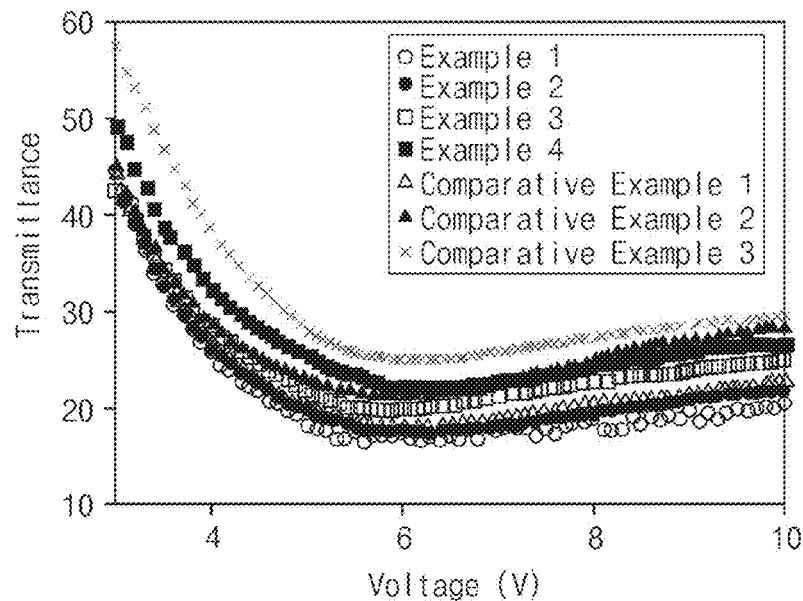
FIGS. 6A to 6D are graphs for comparing the response time of the liquid crystal display devices of Examples 1 to 4 and the liquid crystal display devices of Comparative Examples 1 to 3.
Figure 6B:
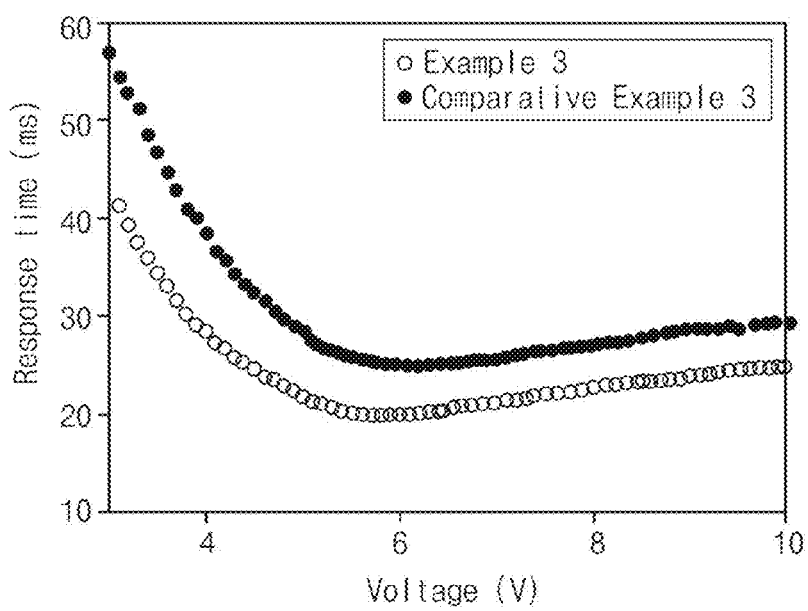

FIGS. 6A and 6B are graphs illustrating the response time according to an applied voltage. In FIGS. 6A and 6B, x-axes represent an applied voltage, and the unit thereof is [V], and y-axes represent response time.

Referring to FIG. 6A, the response time of the liquid crystal display devices of Examples 1 to 4 is not much slow when compared to that of the liquid crystal display devices of Comparative Examples 1 to 3. Since the liquid crystal layers of Examples 1 to 4 include the ferroelectric liquid crystal, the viscosity of the liquid crystal layer is increased, and the response time thereof is expected to be a little slower than or similar to that of the liquid crystal display devices of Comparative Examples 1 to 3.

FIG. 6B selectively illustrates the response time of Example 3 which illustrates the maximum transmittance among Examples 1 to 4 and Comparative Example 3 which illustrates the maximum transmittance among Comparative Examples 1 to 3 according to a voltage. Referring to FIG. 6B, when comparing the response time of Example 3 and Comparative Example 3, which have good transmittance, the response time of Example 3 is greater than that of Comparative Example 3.

Figure 6C:
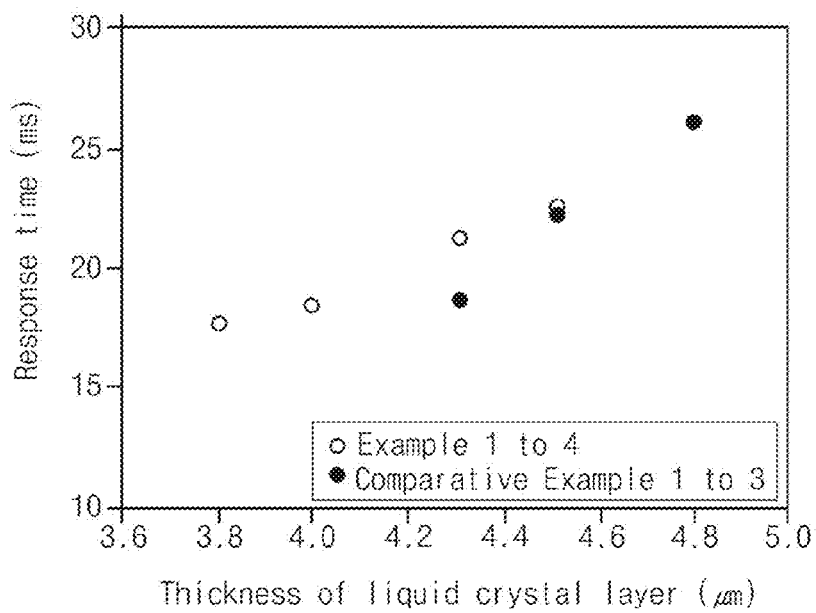
Figure 6D:
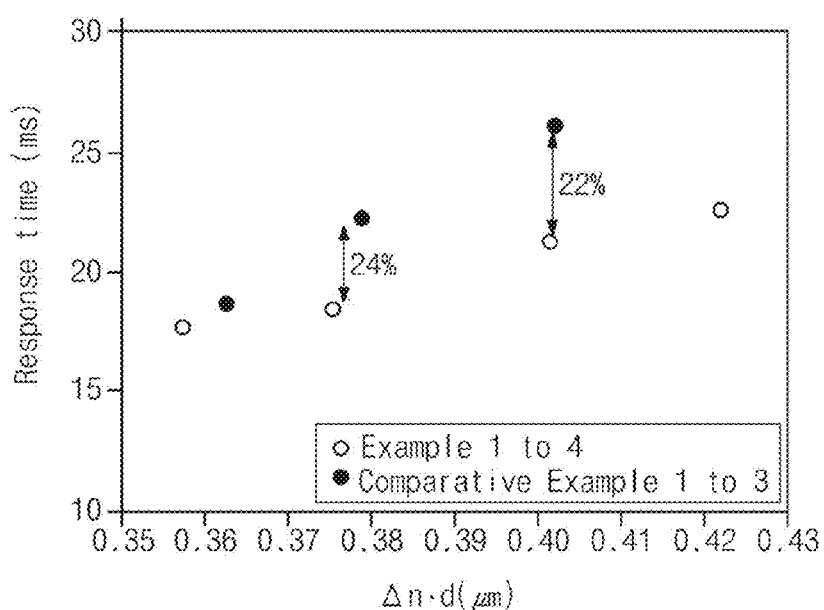

FIGS. 6C and 6D are graphs illustrating the response time of the liquid crystal display devices of Examples 1 to 4 and the liquid crystal display devices of Comparative Examples 1 to 3 according to the thickness of liquid crystal layers when a voltage of 7 V is applied. In more detail, FIG. 6C is a graph illustrating the response time according to the thickness of the liquid crystal layer, and FIG. 6D is a graph illustrating the response time according to the product ($\Delta n \cdot d$) of the thickness (d) of the liquid crystal layer and the refractive index ($\Delta n$) of the liquid crystal layer. In FIGS. 6C and 6D, x-axes represent the length, and the unit thereof is [μm], and y-axes represent transmittance and the unit thereof is [ms].

Referring to FIG. 6C, the response time of Example 1 having the thickness of the liquid crystal layer of about 3.8 μm is about 18 ms. To obtain the response time of about 18 ms, the thickness of the liquid crystal layer for the comparative examples is required to be at least 4.3 μm. Referring to FIG. 6D, when examining the response time according to $\Delta n \cdot d$, the response time of the liquid crystal display devices of Examples 1 to 4 is found greater by from about 22% to about 24% than that of the liquid crystal display devices of Comparative Examples 1 to 3.

Figure 6E:
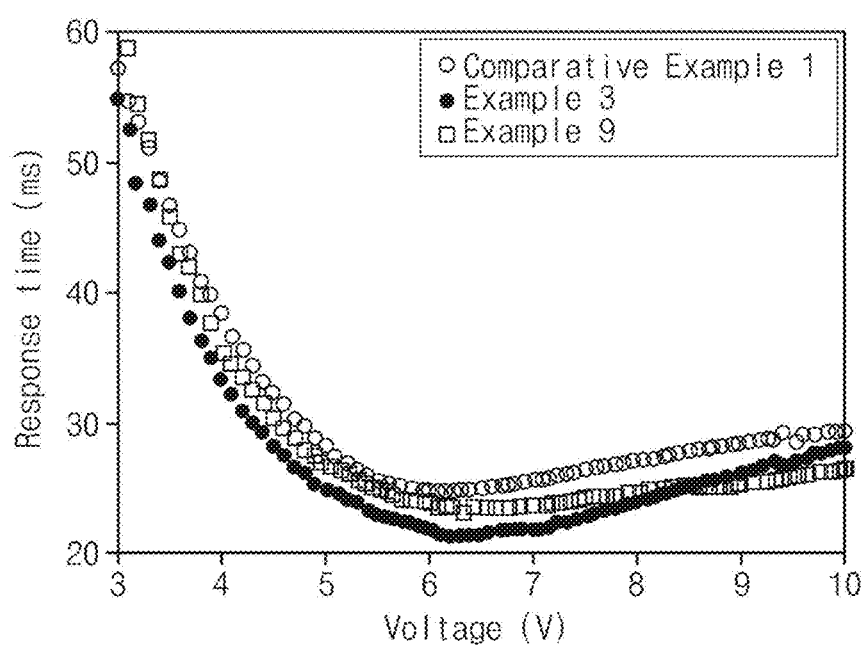
FIG. 6E is a graph for comparing the response time of the liquid crystal display devices of Examples 3 and 9 and the liquid crystal display device of Comparative Example 3.

Referring to FIG. 6E, the response time of the liquid crystal display device of Example 3 is greater than that of the liquid crystal display device of Comparative Example 1 as described above. In addition, the response time of the liquid crystal display device of Example 9 in which about 5 wt % of a positive nematic liquid crystal, ZKC-5085, is included is greater than the response time of the liquid crystal display device of Comparative Example 1.

As shown from the response time according to an applied voltage and the response time according to the product of the thickness of the liquid crystal layer and the refractive index of the liquid crystal layer, the liquid crystal display devices of Examples 1 to 4 and 9 exhibit greater response time even though including the ferroelectric liquid crystal having relatively high viscosity than that of Comparative Examples 1 to 3 through including a liquid crystal layer having an appropriate thickness and refractive index. Thus, the liquid crystal display devices of Examples 1 to 4 and 9 have great response time, and stable and uniform alignment of the ferroelectric liquid crystal molecules may be attained.

Figure 7A:
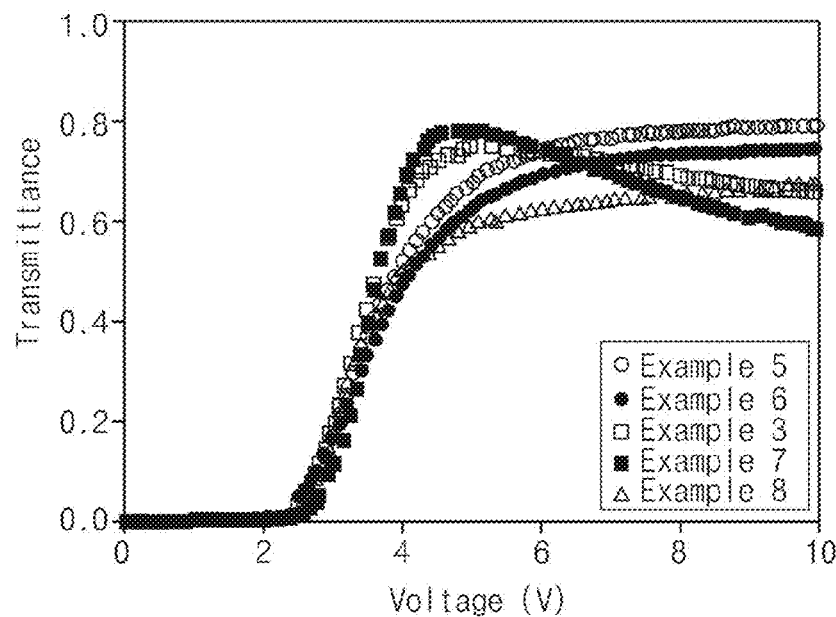
FIG. 7A is a graph illustrating the transmittance of the liquid crystal display devices of Examples 5 to 8.
Figure 7B:
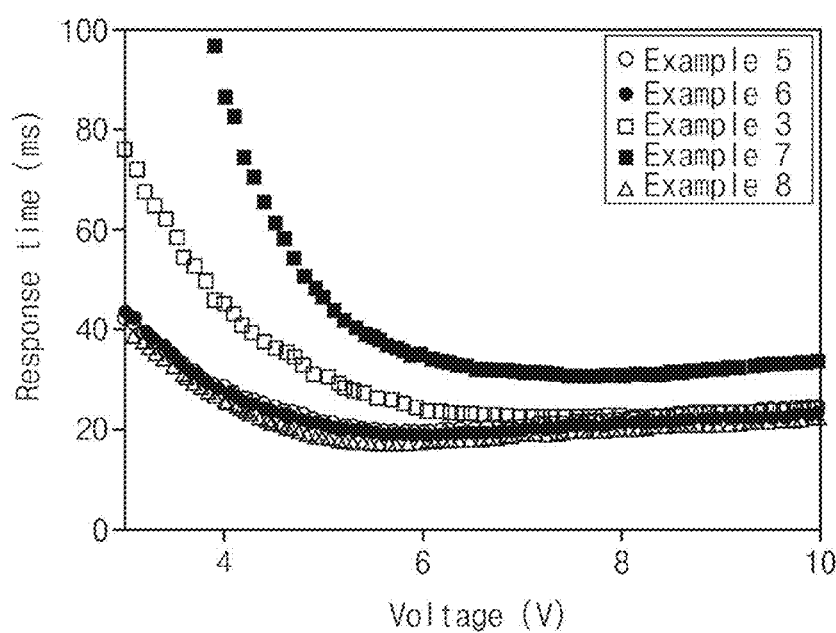
FIG. 7B is a graph illustrating the response time of the liquid crystal display devices of Examples 5 to 8.

Evaluation of Transmittance and Response Time According to the Amount of Ferroelectric Liquid Crystal FIG. 7A is a graph illustrating the transmittance of the liquid crystal display devices of Examples 5 to 8, and FIG. 7B is a graph illustrating the response time of the liquid crystal display devices of Examples 5 to 8.

Referring to FIG. 7A, the transmittance is found to increase as the amount of the ferroelectric liquid crystal in the liquid crystal layer increases. However, referring to FIG. 7B, the response time is slowed by two times when the amount of the ferroelectric liquid crystal in the liquid crystal layer increases. Thus, in these embodiments, the preferred amount of the ferroelectric liquid crystal is less than or equal to about 30 wt % of the total amount of a composition.

Evaluation of Textures

FIGS. 8A to 8C and FIGS. 9A to 9C are the textures of liquid crystal display devices of Comparative Example 1 and Examples 3 to 9.

The liquid crystal display devices of Comparative Example 1 and Examples 3 and 9 are substantially the same except for the component ratios of the liquid crystal layers.

For convenience of explanation, the component ratios thereof are illustrated again in the following Table 2.

TABLE 2

| | Liquid crystal layer | | | Thickness of liquid crystal layer [μm] |
|---|---|---|---|---|
| | MLC 6608 [wt %] (negative nematic liquid crystal) | KFLC 3 [wt %] (ferroelectric liquid crystal) | ZKC-5085 [wt %] (positive nematic liquid crystal) | |
| Comparative Example 1 | 100 | 0 | 0 | 4.3 |
| Example 3 | 90 | 10 | 0 | 4.3 |
| Example 9 | 90 | 5 | 5 | 4.3 |

After applying a voltage of about 7 V in the liquid crystal display devices of Comparative Example 1, Example 3 and Example 9, a cross polarization plate was rotated to obtain white images and black images.

Figure 8A:
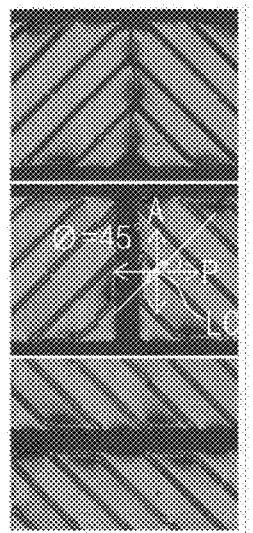
FIGS. 8A to 8C and 9A to 9C are the textures of the liquid crystal display devices of Comparative Example 1 and Examples 3 and 9.
Figure 8B:
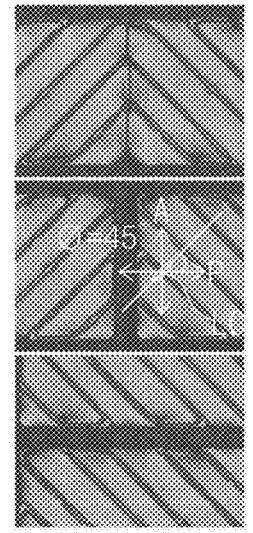
Figure 8C:
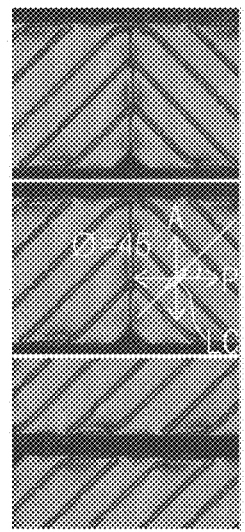

The textures of FIGS. 8A to 8C are white images under the cross polarization plate. In more detail, the white images are obtained when the angle between the cross polarization plate and the liquid crystal molecules of the liquid crystal layer is about 45°, and bright images are shown via the penetration of lights through the liquid crystal layer. This may be confirmed in the following Mathematical Formula 1.

$$T = \frac{1}{2}\sin^2(2\varphi)\sin^2\left(\frac{\pi\Delta n \cdot d}{\lambda}\right)$$ Mathematical Formula 1

In the above Mathematical Formula 1, T is transmittance, φ is an angle formed by a polarization plate and liquid crystal molecules, Δn is a birefringence value, d is the thickness of a liquid crystal layer, and λ is the wavelength of exposing lights. In Mathematical Formula 1, when φ is 45°, a $\sin^2$ value is the maximum value, and the transmittance is the highest.

FIGS. 8A to 8C are textures of Comparative Example 1 and Examples 3 and 9. Referring to FIG. 8A, defects appearing black are shown at the edge portions of the slit or at the border of the slits. Referring to FIG. 8B, the defects are removed a lot at the edge portions of the slit when compared to those in FIG. 8A. Referring to FIG. 8C, the defects are removed at the border of the slits as well as the edge portions of the slit φ.

Figure 9A:
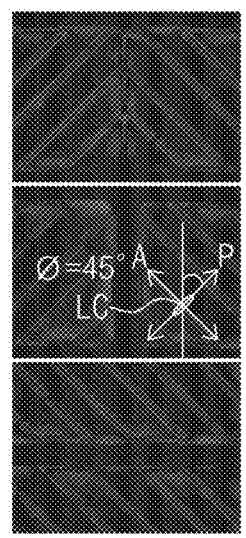
Figure 9B:
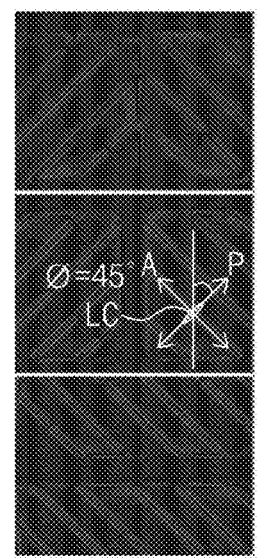
Figure 9C:
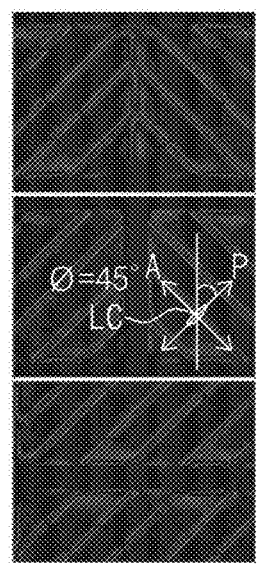

The textures in FIGS. 9A to 9C, black images are illustrated under the cross polarization plate. In more detail, the black images are obtained when the angle between the cross polarization plate and the liquid crystal molecules of the liquid crystal layer is about 0°, and black images are shown because a rotated upper polarization plate has perpendicular polarization with respect to polarized lights penetrated through the liquid crystal layer. In the above Mathematical Formula 1, when φ=0°, a $\sin^2$ value is 0, and the transmittance becomes 0.

FIGS. 9A to 9C are textures of Comparative Example 1 and Examples 3 and 9. Referring to FIG. 9A, light leakage phenomena are shown at the edge portions of the slit or at the border of the slits. Referring to FIGS. 9B and 9C, the light leakage phenomena are removed a lot at the border of the slits as well as at the edge portions of the slit when compared to those in FIG. 9A.

When inspecting the textures, the alignment of the liquid crystal molecules in the liquid crystal layer including the ferroelectric material is uniform and stable when compared to that of a liquid crystal layer not including the ferroelectric material, thereby improving the luminance of a liquid crystal display device.

Figure 10A:
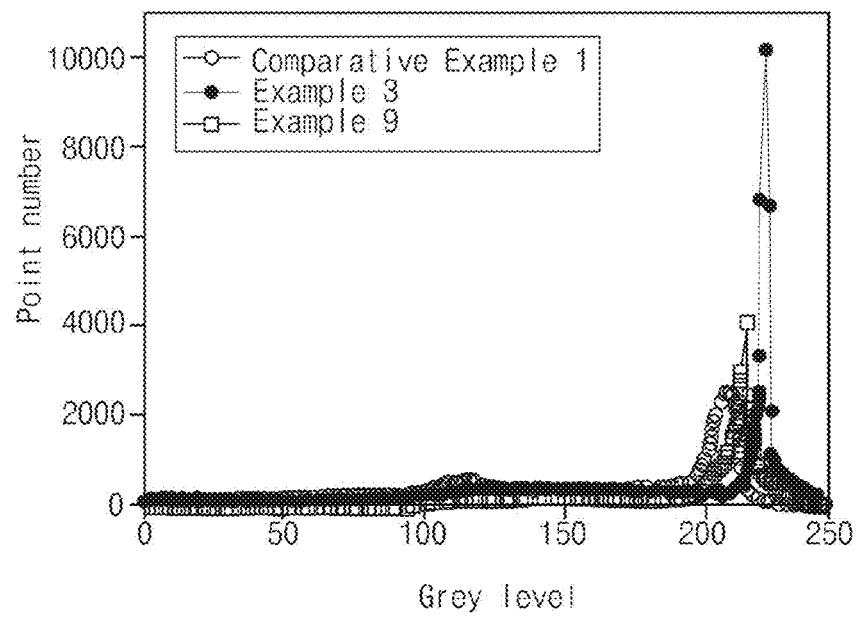
FIGS. 10A and 10B are graphs illustrating the grey level of the textures in FIGS. 7A, 7B, 8A and 8B.
Figure 10B:
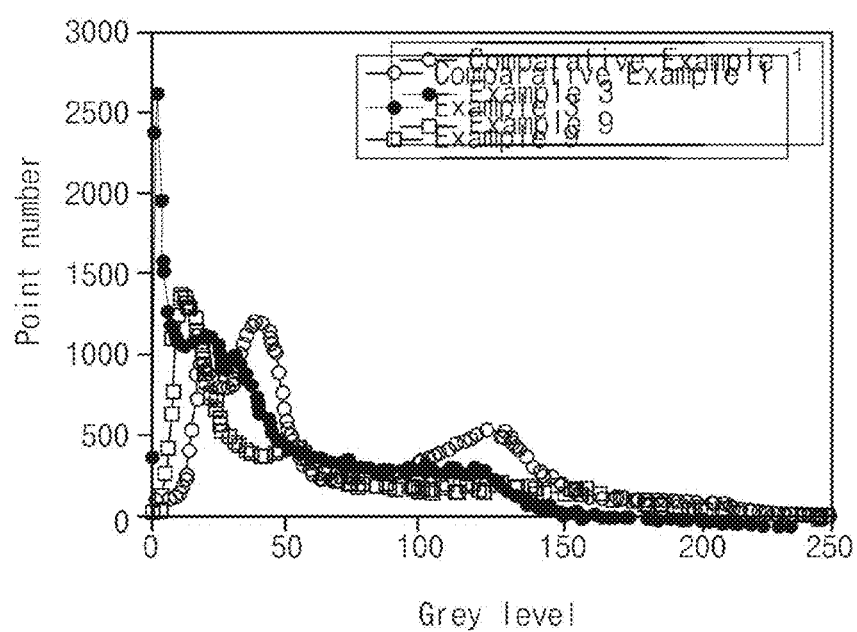

FIGS. 10A and 10B are graphs illustrating the grey level of the textures of Comparative Example 1 and Examples 3 and 9. FIGS. 10A and 10B are evaluated by 256 ($2^8$) grey levels. As the grey level approaches to 0, grey closes to black, and the concentration of the grey is represented by the levels from 0 to 256.

FIG. 10A illustrates the grey level of the textures in FIGS. 8A to 8C, and the white images are found at the grey level of about 256. The white image of Comparative Example 1 in FIG. 8A is found a lot from about 200 to about 230 of the grey level, and the peak width thereof is found wide. The white image of Example 3 in FIG. 8B is found a lot from about 240 to about 250 of the grey level, and the peak width thereof is found narrow when compared to that of Comparative Example 1. The white image of Example 9 in FIG. 8C is found a lot at the grey level of from about 230 to about 250, and the peak width becomes narrow when compared to that of Comparative Example 1.

FIG. 10B represents the grey level of the textures in FIGS. 9A to 9C, and the black images are found around 0 of the grey level. The black image of Comparative Example 1 in FIG. 9A is found a lot at from about 30 to about 50 of the grey level, and the peak width thereof is found wide. The black image of Example 3 in FIG. 9B is found a lot from about 0 to about 20 of the grey level, and the peak width thereof is found narrow when compared to that of Comparative Example 1. The black image of Example 9 in FIG. 9C is found a lot at the grey level of from about 0 to about 30, and the peak width becomes narrow when compared to that of Comparative Example 1.

When inspecting the graphs in FIGS. 10A and 10B, the alignment of the liquid crystal molecules in the liquid crystal layer including the ferroelectric material is uniform and stable when compared to that of a liquid crystal layer not including the ferroelectric material, thereby improving the luminance of a liquid crystal display device.

Figure 11A:
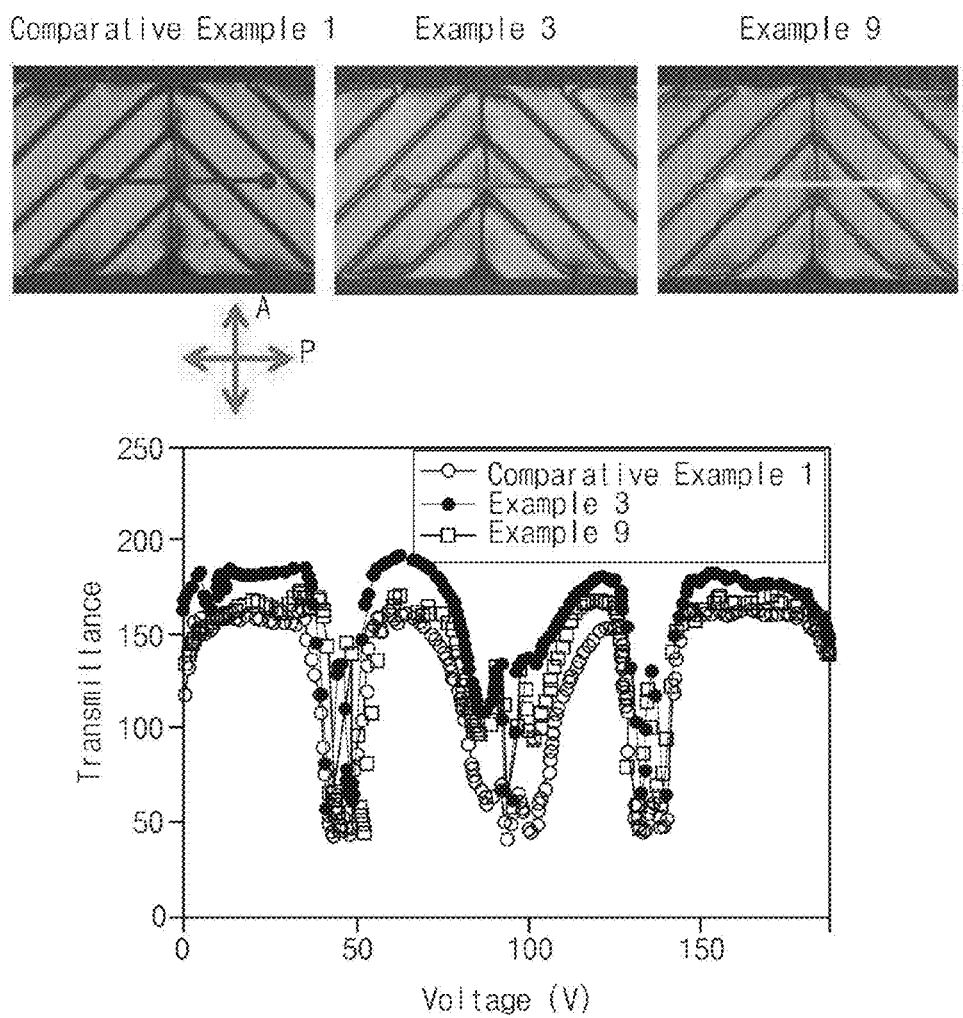
FIGS. 11A and 11B are graphs illustrating the transmittance according to an applied voltage to the textures of Comparative Example 1 and Examples 3 and 9.
Figure 11B:
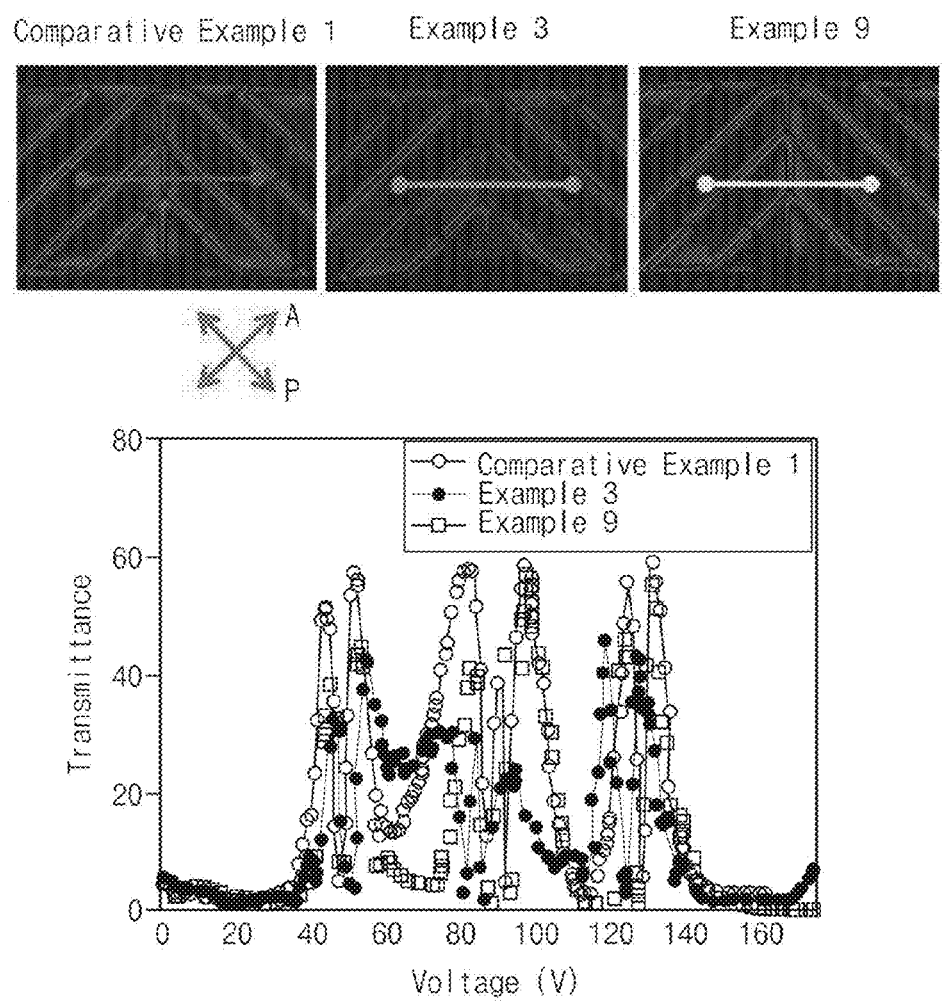

FIGS. 11A and 11B are graphs illustrating the transmittance of Comparative Example 1 and Examples 3 and 9 according to regular interval of the textures. FIGS. 11A and 11B are graphs obtained by performing experiments on transmittance according to the regular interval of the textures including an electrode portion and a slit portion according to Comparative Example 1 and Examples 3 and 9.

FIG. 11A is a graph of experiment with respect to the white textures of Comparative Example 1 and Examples 3 and 9. Referring to FIG. 11A, the transmittance at the edge portions of the slit or at the border of the slits appearing black is decreased to less than or equal to about 50 for Comparative Example 1. When examining Examples 3 and 9, the transmittance is relatively high in general when compared to that of the comparative example, and the transmittance at a particularly bright portion is greater than or equal to about 180. Even in a dark portion, the transmittance is higher than that of Comparative Example 1.

FIG. 11B is a graph of experiment with respect to the black textures of Comparative Example 1 and Examples 3 and 9. Referring to FIG. 11B, light leakage is shown at the edge portions of the slit or at the border of the slits, and the transmittance is about 60 for Comparative Example 1. On the contrary, when examining Examples 3 and 9, the transmittance is lower than that of Comparative Example 1 in general, and the maximum transmittance is found at most 60.

When examining the graphs in FIGS. 11A and 11B, the alignment of liquid crystal molecules in a liquid crystal layer including the ferroelectric material is uniform and stable when compared to a liquid crystal layer not including the ferroelectric material, thereby improving the luminance of a liquid crystal display device.

[[Liquid Crystal Display Device in PVA Mode]]

Figure 12A:
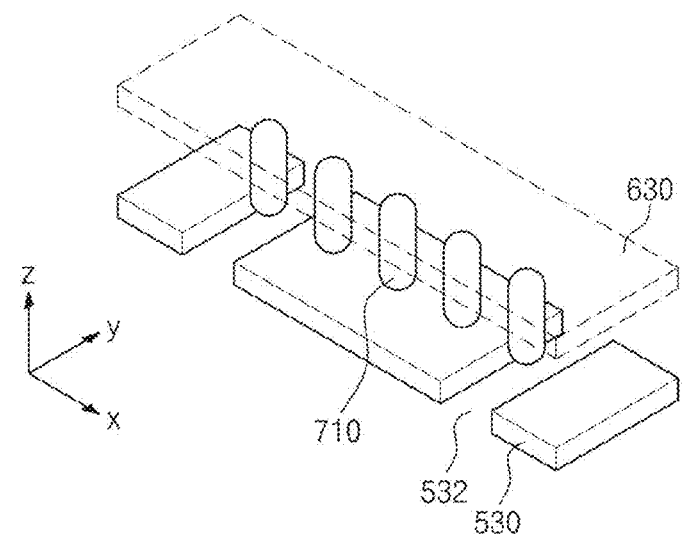
FIGS. 12A, 13A and 14A are perspective views for explaining a liquid crystal display device according to an embodiment of the present invention.
Figure 12B:
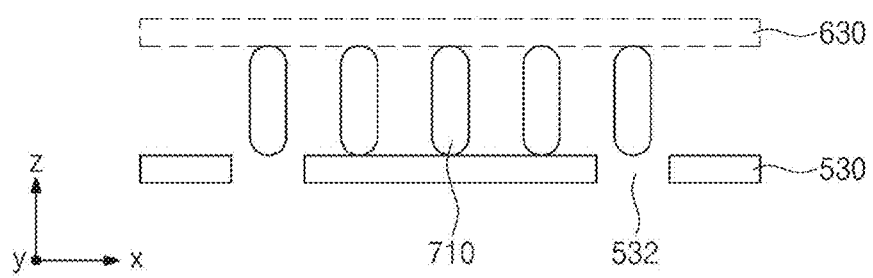
FIGS. 12B, 13B and 14B are cross-sectional views for explaining a liquid crystal display device according to an embodiment of the present invention.
Figure 12C:
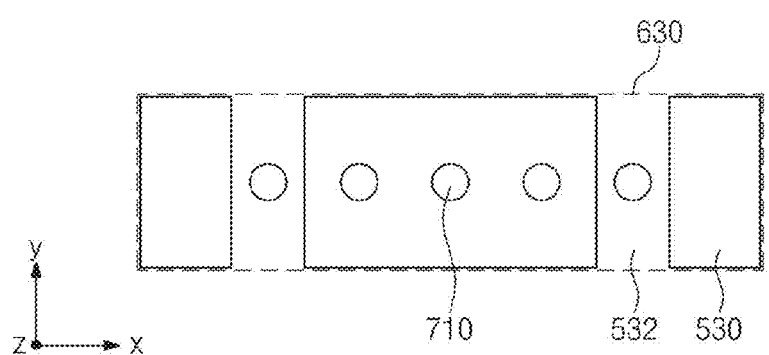
FIGS. 12C, 13C and 14C are plan views for explaining a liquid crystal display device according to an embodiment of the present invention.
Figure 13A:
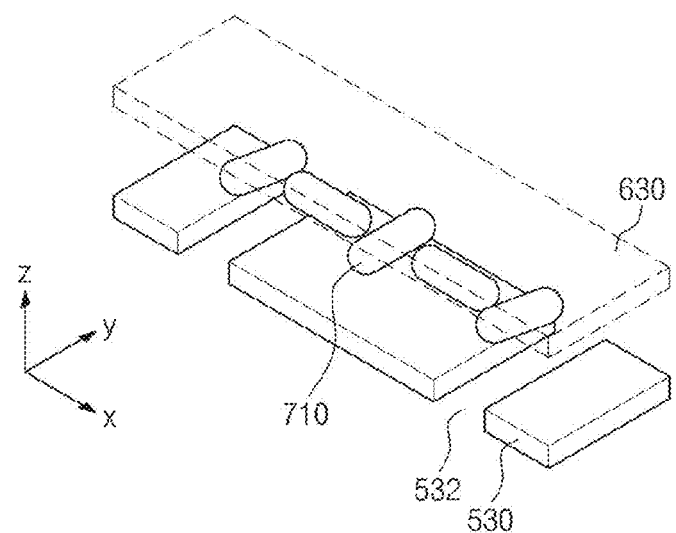
Figure 13B:
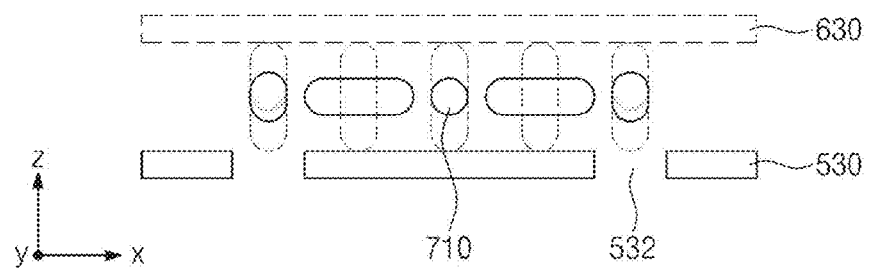
Figure 13C:
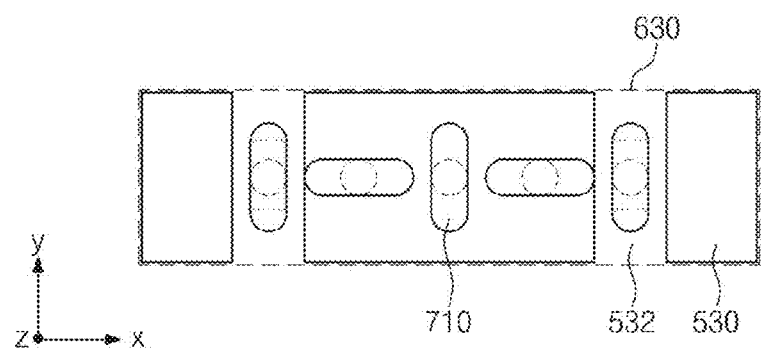
Figure 14A:
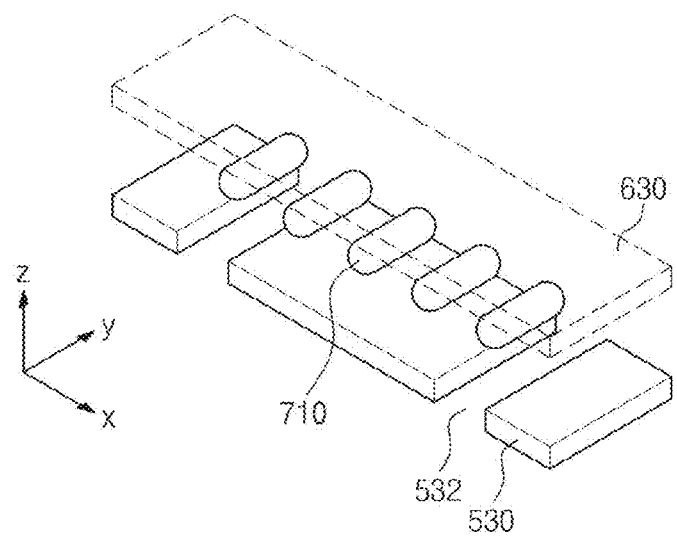
Figure 14B:
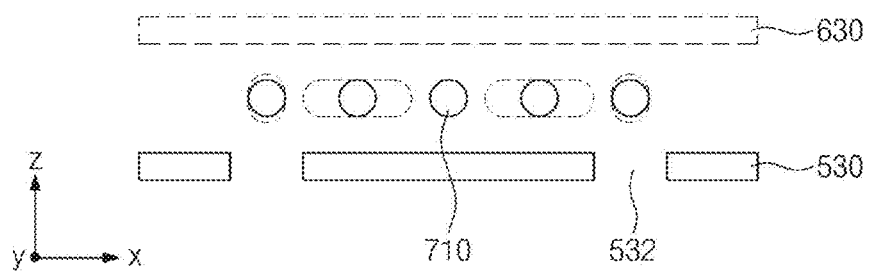
Figure 14C:
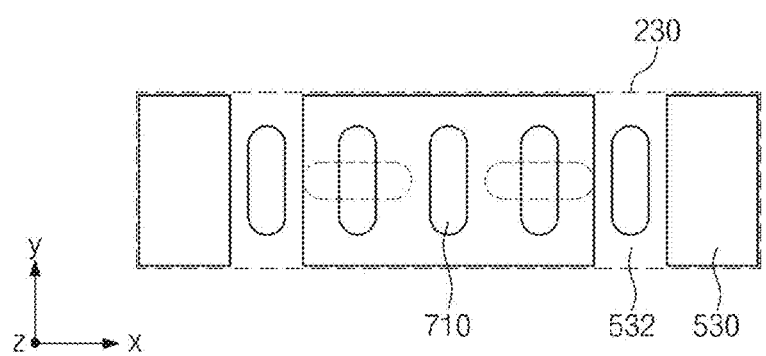

FIGS. 12A, 13A and 14A are perspective views for explaining a liquid crystal display device according to an embodiment of the present invention, FIGS. 12B, 13B and 14B are cross-sectional views for explaining a liquid crystal display device according to an embodiment of the present invention, and FIGS. 12C, 13C and 14C are plan views for explaining a liquid crystal display device according to an embodiment of the present invention.

FIGS. 12A to 12C are obtained when no potential difference is between the first and second electrodes of the liquid crystal display device. FIGS. 13A to 13C and FIGS. 14A to 14C are obtained when potential difference is present between the first and second electrodes of the liquid crystal display device.

Referring to FIGS. 12A to 14C, the liquid crystal display device may include a first electrode 530, a second electrode 630 separated from and opposing the first electrode 530, and a liquid crystal layer 700 filling up a space between the first and second electrodes 530 and 630.

The first electrode 530 and the second electrode 630 may be extended in an x-axis direction. According to an embodiment of the present invention, a slit 532 may be formed in the first electrode 530. The slit 532 formed in the first electrode 530 may be extended in a y-axis direction. The width of the slit 532 may be a few μm. In this embodiment, the first electrode and the second electrode 630 illustrated in FIGS. 12A to 14C are explained as an illustration, and the structures of the first and second electrodes 530 and 630 are not limited thereto in the present invention.

The liquid crystal layer 700 may include a plurality of liquid crystal molecules 710. Referring to FIG. 12A, the plurality of liquid crystal molecules 710 may be aligned in a first alignment direction that is perpendicular to the surface of the first or second electrode 530 or 630 when no potential difference is present between the first and second electrodes 530 and 630. For example, the first alignment direction may be substantially in parallel to a z-axis direction.

When the potential difference is generated between the first and second electrodes 530 and 630, the alignment of the liquid crystal molecules 710 may be changed to a second alignment direction that is substantially in parallel to the extended direction of the first or second electrode 530 or 630. For example, the second alignment direction may be substantially in parallel to the extended direction of the slit 532. As described above, the slit 532 is extended in the y-axis direction, and the second alignment direction may be substantially in parallel to the y-axis direction.

According to an embodiment of the present invention, when potential difference is generated between the first and second electrodes 530 and 630, the alignment direction of the liquid crystal molecules 710 may be changed in at least two steps, and finally the liquid crystal molecules may be aligned in the second direction. For example, the operation of changing the alignment direction of the liquid crystal molecules 710 may include a first alignment step and a second alignment step in order. The alignment direction of the liquid crystal molecules 710 of the liquid crystal layer 700 is not changed to a target direction immediately because the intensity or the shape of electric field generated between the first and second electrodes 530 and 630 is different in accordance with the structures of the first and second electrodes 530 and 630.

Hereinafter, the first alignment step and the second alignment step for changing the liquid crystal molecules 710 one by one by generating the potential difference between the first and second electrodes 530 and 630 will be explained in detail.

Referring to FIGS. 13A to 13C, the first alignment step (as soon as the potential difference is generated between the first and second electrodes) may be a procedure of changing the liquid crystal molecules 710 aligned in the first alignment direction into a third alignment direction. The third alignment direction may include directions different from the first or second alignment directions. The third alignment direction of the liquid crystal molecules 710 may have various alignment directions according to the structures of the first and second electrodes 530 and 630 and the disposed position of the liquid crystal molecules 710 between the first and second electrodes 530 and 630.

The change of the alignment direction of the liquid crystal molecules 710 in the first alignment step in accordance with the position between the first and second electrodes 530 and 630 will be explained in more detail for illustration. When potential difference is generated between the first and second electrodes 530 and 630, relatively strong electric field may be formed at a center portion (the farthest portion from the slits) between a pair of adjacent slits 532 between the first electrode 530 and the second electrode 630 in a perpendicular direction of the surface of the first or the second electrode 530 or 630. In addition, at the portion where the slit 532 is formed between the first electrode 530 and the second electrode 630, relatively weak electric field may be formed obliquely.

The liquid crystal molecules 710 disposed at the first electrode 530 at the center portion between a pair of adjacent slits 532, where relatively strong electric field is generated may be changed from the first alignment direction to the third alignment direction, and the third alignment direction may be an optional direction and may not be easily anticipated. The liquid crystal molecules 710 disposed at the first electrode 530 having the slits 532, where relatively weak electric field is generated may be changed from the first alignment direction to the third alignment direction, and the third alignment direction may be a perpendicular direction to the electric field. According to an embodiment, the alignment direction of the liquid crystal molecules disposed at one slit of the pair of slits 532 and the alignment direction of the liquid crystal molecules disposed at other one slit may be different from each other. For example, the alignment directions may face to each other.

Referring to FIGS. 14A to 14C, the second alignment step (after a certain time from the generation of the potential difference between the first and second electrodes) may be a procedure of changing the liquid crystal molecules 710 aligned in the third alignment direction to the second alignment direction. In more detail, the liquid crystal molecules 710 at the center portion of a pair of the adjacent slits 532 formed in the first electrode 530 may change to a final alignment direction that offsets different alignment directions of adjacent liquid crystal molecules 710. In this embodiment, the final alignment direction may be the second alignment direction substantially in parallel to the direction of the slit 532. When the alignment direction of the liquid crystal molecules 710 at the center portion of the pair of the slits 532 is changed to the second alignment direction, the alignment direction of unstably disposed adjacent liquid crystal molecules 710 may be changed to substantially the same alignment direction as the alignment direction of the liquid crystal molecules 530 at the center portion of the pair of the slits 532. Thus, the alignment direction of the liquid crystal molecules 710 between the first and second electrodes 530 and 630 may be changed to the target second alignment direction.

According to an embodiment of the present invention, the liquid crystal display device may include a plurality of pixels. Each pixel may include multi domains. The formation of the multi domains in one pixel may be determined by the structures of the first and second electrodes 530 and 630.

The structures of the first and second electrodes 530 and 630 of the present invention may be diverse, and the structures of the first and second electrodes 530 and 630 may not be limited in the present invention only if the alignment direction of the liquid crystal molecules 710 may be changed subsequently by the first and second alignment steps as described above when potential difference is generated between the first and second electrodes 530 and 630.

According to an embodiment, the liquid crystal layer 700 may include a negative nematic liquid crystal, a positive nematic liquid crystal and a ferroelectric liquid crystal. The detailed explanation of the liquid crystal layer 700 is substantially the same as that of the liquid crystal layer in the PVA mode, and detailed description thereof will be omitted.

Because of the ferroelectric liquid crystal in the liquid crystal layer 700, the liquid crystal molecules 710 may have uniform and stable alignment. Thus, the luminance of a liquid crystal display device including the liquid crystal layer 700 including the ferroelectric liquid crystal may be improved. Experimental evaluation thereon will be explained in detail through the following experimental examples.

According to an embodiment of the present invention, the liquid crystal layer 700 may include a reactive mesogen material. The alignment direction of the liquid crystal molecules 710 may be changed from the first alignment direction to the second alignment direction when potential difference is generated between the first and second electrodes 530 and 630 due to the reactive mesogen material in the liquid crystal layer 700. That is, the alignment direction of the liquid crystal molecules 710 may be changed from the first alignment direction to the second alignment direction without being changed from the first alignment direction to the third alignment direction, thereby improving the response time of the liquid crystal display device.

According to another embodiment of the present invention, the liquid crystal display device may further include alignment layers 540 and 640 (see FIGS. 15A and 15B) in at least one between the liquid crystal layer 700 and the first electrode 530 and between the liquid crystal layer 700 and the second electrode 630. The alignment layers 540 and 640 may include a reactive mesogen material. The alignment direction of the liquid crystal molecules 710 may be changed from the first alignment direction to the second alignment direction when potential difference is generated between the first and second electrodes 530 and 630 due to the reactive mesogen material in the alignment layers 540 and 640. That is, the alignment direction of the liquid crystal molecules 710 may be changed from the first alignment direction to the second alignment direction without being changed from the first alignment direction to the third alignment direction, thereby improving the response time of the liquid crystal display device.

Figure 15A:
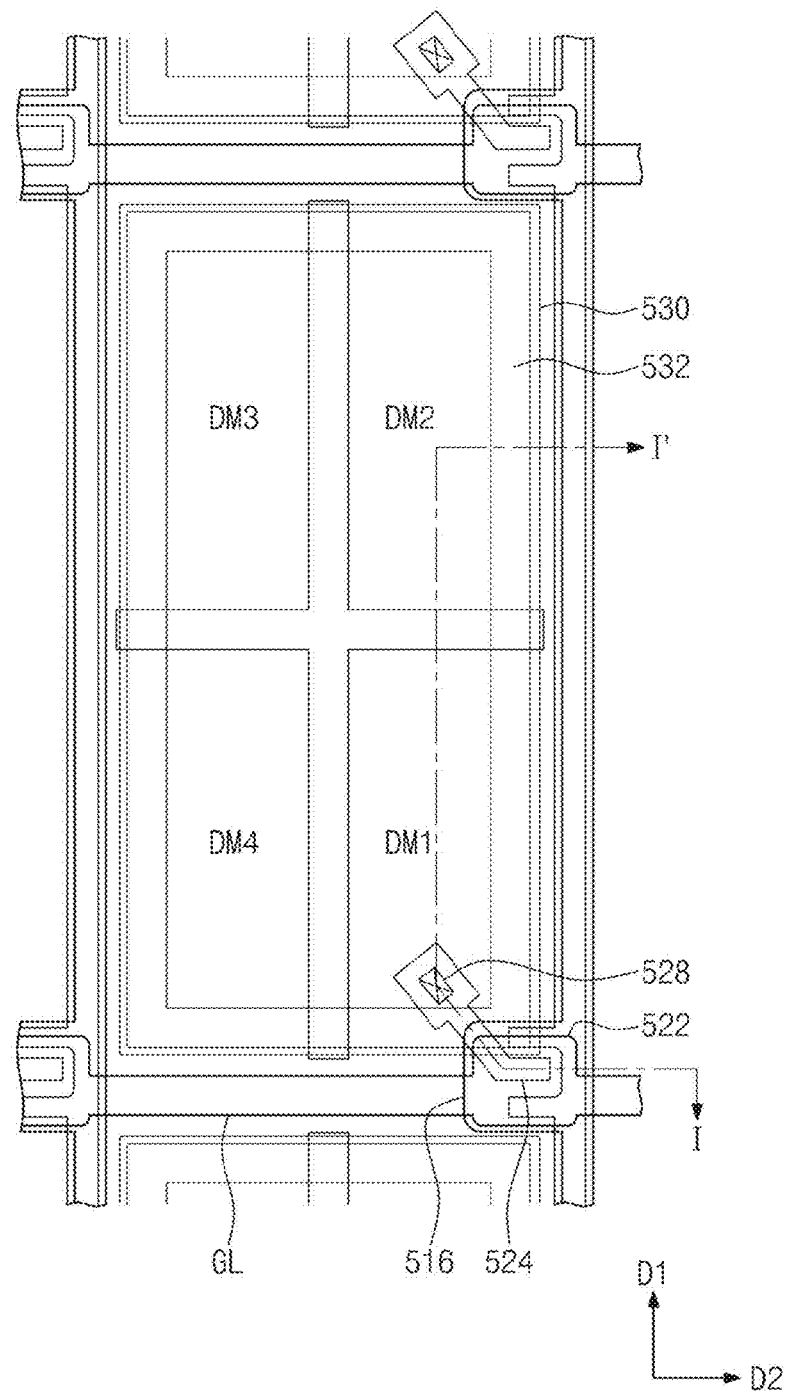
FIGS. 15A and 15B are a plan view and a cross-sectional view for explaining a liquid crystal display device according to an embodiment of the present invention.
Figure 15B:
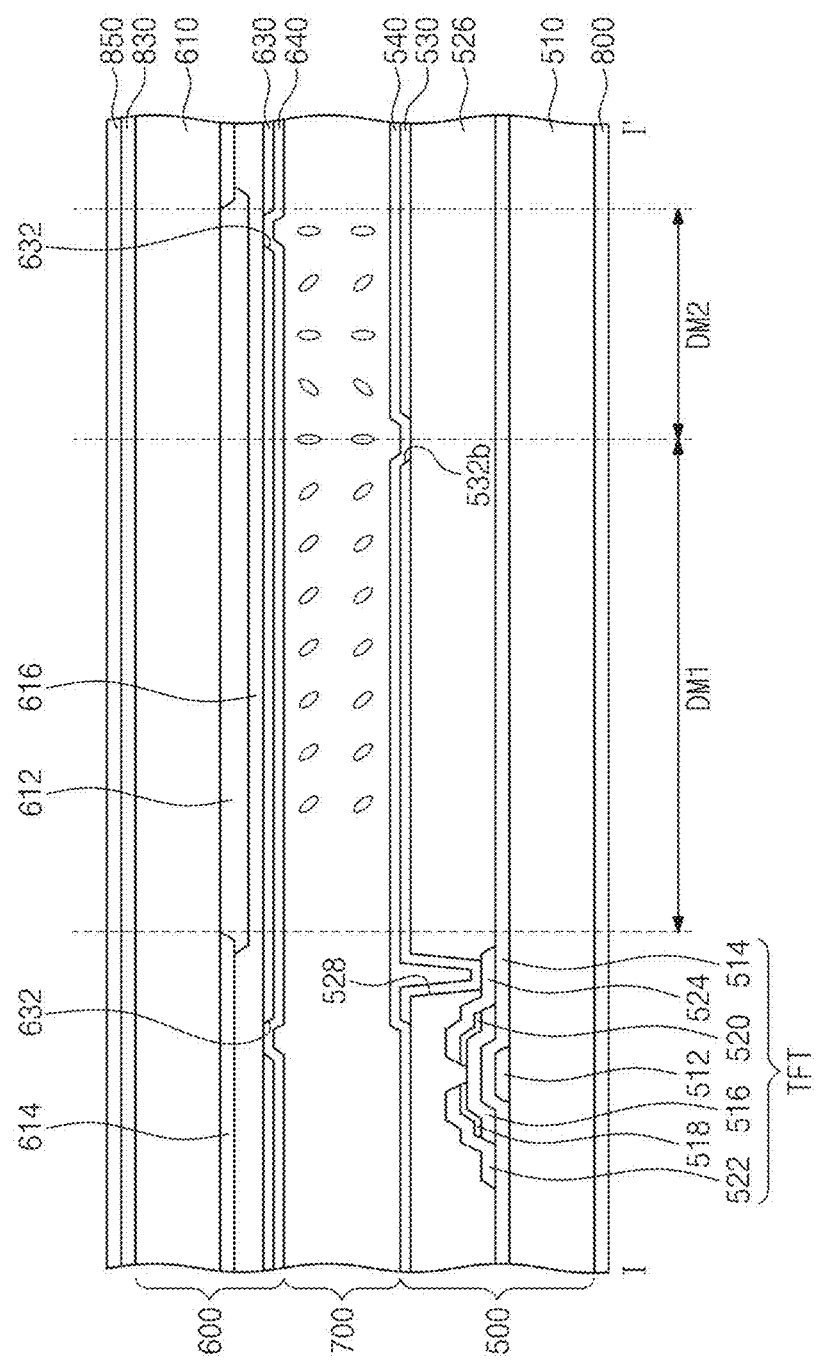

FIGS. 15A and 15B are a plan view and a cross-sectional view for explaining a liquid crystal display device according to an embodiment of the present invention. FIG. 15B is a cross-sectional view taken along line I-I' in FIG. 15A.

Referring to FIGS. 15A and 15B, a liquid crystal display device may include a first display plate 500, a second display plate 600 separated from and opposing the first display plate 500, and a liquid crystal layer 700 disposed between the first and second display plates 500 and 600. In addition, the liquid crystal display device may further include a first polarization plate 800 and a second polarization plate 850 having a transmission axis perpendicular to the transmission axis of the first polarization plate 800.

The first display plate 500 may include a first substrate 510, a thin film transistor TFT and a first electrode 530. The first substrate 510 may include a transparent insulating material such as glass.

The thin film transistor TFT may be disposed at one side of the first substrate 510. The thin film transistor TFT may include a gate electrode 512, a gate insulating layer 514, a semiconductor 516, a source electrode 522 and a drain electrode 524 stacked subsequently. The gate electrode 512 may include a single layer or a multi layer of a metal or a metal alloy, and the gate insulating layer 514 may include silicon oxide, silicon nitride or silicon oxynitride. The intrinsic semiconductor 516 may include amorphous silicon. The source electrode 522 and the drain electrode 524 may be disposed separately while facing to each other on the intrinsic semiconductor 516. In the intrinsic semiconductor 516 between the source electrode 522 and the drain electrode 524, a channel of the thin film transistor TFT may be formed. The source electrode 522 may be electrically connected with a data line DL and may receive a data voltage from the data line DL. The drain electrode 524 may make electrical connection with the first electrode 530.

According to an aspect, the thin film transistor TFT may further include resistive contact members 518 and 520 disposed between the intrinsic semiconductor 516 and the source and drain electrodes 522 and 524. The resistive contact members 518 and 520 may include silicide or n+ hydrogenated amorphous silicon heavily doped with n-type impurities.

On the thin film transistor TFT, a first insulation layer 526 having a contact hole 528 may be formed. The first insulation layer 526 may include inorganic insulation material such as silicon oxide, silicon nitride, silicon oxynitride, etc. or an organic insulation material such as a resin, etc. The contact hole 528 may expose the top surface of the drain electrode 524.

On the first insulation layer 526, a first electrode 530 may be formed. The first electrode 530 may be a pixel electrode. The first electrode 530 may be electrically connected with the drain electrode by the contact hole. The first electrode 530 may be applied with a data voltage from the drain electrode. The first electrode 530 may include a transparent conductive material such as ITO and IZO.

According to an embodiment of the present invention, the first electrode 530 may include a domain division element, for example, a first slit 532. The first slit 532 of the first electrode 530 corresponds to a removed part of the first electrode 530. When a voltage is applied between the first electrode 530 and the second electrode 630, an electric field is generated between the first and second electrodes 530 and 630, and the electric field may not be formed in a vertical direction with respect to the surface of the first substrate 510 but may be formed in a slanted direction having both a vertical component and a horizontal component due to the first slit 532 of the first electrode 530. According to another embodiment of the present invention, the domain division element may be formed on the first electrode 530 and may have an extruded shape in a direction from the first electrode 530 to the liquid crystal layer 700.

According to an aspect, the first slit 532 may be formed along the edge portion of the first electrode 530. The first slit 532 may have a square ring shape when seen from plane when the first electrode 530 has a square shape. The first slit 532 of the first electrode 530 may have diverse structures. Hereinafter, the structure of the first electrode 530 will be described in detail.

As described above, the structure of the first electrode 530 is not limited. The structure of the first electrode 530 may be satisfactory together with the second electrode 630 explained subsequently only when the alignment direction of the liquid crystal molecules between the first and second electrodes 530 and 630 may be changed by at least two steps.

The first display plate 500 may further include a first alignment layer 540 between the first electrode 530 and the liquid crystal layer 700. The first alignment layer 540 may pre-tilt liquid crystal molecules in the liquid crystal layer 700 in one direction. According to an embodiment, the first alignment layer 540 may include at least one selected from the group consisting of polyamic acid, polyimide, lecithin, nylon and PVA. According to another embodiment, the first alignment layer 540 may further include a reactive mesogen material.

The first polarization plate 800 may be disposed on the other side of the first substrate 510. The other side of the first substrate 510 may be a side corresponding to the one side.

The second display plate 600 may include a second substrate 610 and a second electrode 630. The second substrate 610 may include a transparent insulation material such as glass.

The second electrode 630 may be disposed on one side of the second substrate 610, and the one side of the second substrate 610 may be a side opposing the first display plate 500. The second electrode 630 may be a common electrode. The second electrode 630 may include a transparent conductive material such as ITO, IZO, etc.

According to an embodiment of the present invention, the second electrode 630 may include a domain division element, for example, a second slit 632. The second slit 632 corresponds to a removed part of the second electrode 630, and the second electrode 630 may have a pattern. When a voltage is applied between the first electrode 530 and the second electrode 630, an electric field may be generated between the first and second electrodes 530 and 630, and the electric field may not be formed in a vertical direction with respect to the surface of the second substrate 610 but may be formed in a slanted direction having both a vertical component and a horizontal component due to the second slit 632. According to another embodiment of the present invention, the domain division element may be formed on the second electrode 630 and may have an extruded shape in a direction from the second electrode 630 to the liquid crystal layer 700.

According to an aspect, the second slit 632 may include a first line 632a crossing the center of the second electrode 630 in a first direction and a second line 632b crossing the center of the second electrode 630 in a second direction that is perpendicular to the first direction. The second slit 632 may have a cross shape when seen from plane. The structure of the second electrode 630 will be explained in detail hereinafter. According to another aspect, the second electrode 630 may not include the second slit 632 according to the structure of the first electrode 530.

As described above, the structure of the second electrode 630 is not limited. The structure of the second electrode 630 may be satisfactory together with the first electrode 530 only when the alignment direction of the liquid crystal molecules between the first and second electrodes 530 and 630 may be changed by at least two steps.

According to exemplary embodiments of the present invention, slanted electric field may be formed between the first and second electrodes 530 and 630 when a voltage is applied due to the first and second slits 532 and 632 of the first and second electrodes 530 and 630 as described above. Therefore, multi-domains D1 to D4 may be formed in one pixel. In this embodiment, the liquid crystal molecules may align in four directions, and four domains D1 to D4 may be formed in one pixel. However, the domain number formed in one pixel will not be limited thereto in the present invention.

According to an embodiment, the second display plate 600 may further include a color filter 612. The color filter 612 may be disposed between the second substrate 610 and the second electrode 630. In addition, a shielding member 614 may be disposed on one side of the second substrate 610, and the color filter 612 may be formed in each area defined by the shielding member 614. The color filter 612 may be passivated by a second insulation layer 616. In this embodiment, the color filter 612 is explained to be disposed on the second display plate 600, however the color filter 612 may be disposed on the first display plate 500. However, the position of the color filter 612 is not limited in the present invention.

According to another embodiment of the present invention, the second display plate 600 may further include a second alignment layer 640 between the second electrode 630 and the liquid crystal layer 700. The second alignment layer 640 may pre-tilt the liquid crystal molecules in the liquid crystal layer 700 in one direction. According to an embodiment, the second alignment layer 640 may include at least one selected from the group consisting of polyamic acid, polyimide, lecithin, nylon and PVA. According to another embodiment, the second alignment layer 640 may further include a reactive mesogen material.

The second polarization plate 850 may be disposed on the other side of the second substrate 610. The other side of the second substrate 610 may be a side corresponding to the one side. The second polarization plate 850 may penetrate linearly polarized light vibrating in a vertical direction among lights penetrated through the first polarization plate 800.

The liquid crystal layer 700 may fill up a space between the first and second display plates 500 and 600. According to an embodiment, the liquid crystal layer 700 may include a negative nematic liquid crystal, a positive nematic liquid crystal and a ferroelectric liquid crystal. According to another embodiment, the liquid crystal layer 700 may include a non-ferroelectric liquid crystal and a ferroelectric liquid crystal. The explanation on the liquid crystal layer 700 is substantially the same as the description concerning the above PVA mode, and detailed description thereof will be omitted. According to a further another embodiment, the liquid crystal layer may further include a mesogen material. Detailed explanation on the liquid crystal layer 700 is substantially the same as the description concerning the PVA mode, and detailed description thereof will be omitted.

According to an embodiment of the present invention, the liquid crystal display device may further include an optical compensation film 830. The optical compensation film 830 may be disposed between the second polarization plate 850 and the second substrate 610. When the liquid crystal molecules maintain a vertically aligned state, the polarization axes of the first polarization plate 800 and the second polarization plate 850 may cross at right angles when observed from a front side, and light leakage may not be generated, however polarization angles formed by the polarization axes of the first and second polarization plates 800 and 850 may be increased, and light leakage may be generated when seen from a side. To compensate the light leakage, the optical compensation film 8,5 such as a biaxial film or a uniaxial film may be disposed.

As described above, since the liquid crystal layer 700 of the liquid crystal display device includes the ferroelectric liquid crystal together with the nematic liquid crystal, uniform alignment of the liquid crystal layer may be attained, and the stability of the alignment may be improved. Thus, the luminance of the liquid crystal display device including the liquid crystal layer 700 may be improved. In addition, since at least one of the liquid crystal layer 700 and the first and second alignment layers 540 and 640 further include the reactive mesogen material, the alignment rate and the alignment angle of the liquid crystal molecules in the liquid crystal layer 700 may be increased, thereby improving optical properties.

Hereinafter, the driving of a liquid crystal display device having the structures of first and second electrodes 530 and 630 illustrated in FIGS. 15A and 15B will be described in brief.

When no potential difference is present between the first and second electrodes 530 and 630, liquid crystal molecules may be aligned in a first direction that is perpendicular to the surface of the first and second electrodes 530 and 630.

When potential difference is generated between the first and second electrodes 530 and 630, the alignment of the liquid crystal molecules may be changed to a second alignment direction that is substantially in parallel to the extended direction of the first and second electrodes 530 and 630. In this embodiment, the second alignment direction of the liquid crystal molecules may be different depending on the position of the liquid crystal molecules between the first and second electrodes. The liquid crystal molecules disposed between the first and second electrodes and having the first and second slits may have the second alignment direction that is perpendicular to the first and second slits. Meanwhile, the liquid crystal molecules provided between the first and second electrodes and separated from the first and second slits may have the second alignment direction that is a twisted direction by about 45° or about 135° with respect to the first and second slits.

According to an embodiment of the present invention, when potential difference is generated between the first and second electrodes 530 and 630, the alignment direction of the liquid crystal molecules may be changed by at least two steps, thereby finally aligning thereof in the second alignment direction. For example, the changing operation of the alignment direction of the liquid crystal molecules may include a first alignment step and a second alignment step one by one. The alignment direction of the liquid crystal molecules of the liquid crystal layer 700 is not changed to a target direction immediately because the intensity or the shape of electric field generated between the first and second electrodes 530 and 630 are different in accordance with the structures of the first and second electrodes 530 and 630.

Hereinafter, the first alignment step and the second alignment step for changing the alignment direction of the liquid crystal molecules one by one by generating the potential difference between the first and second electrodes 530 and 630 will be explained in detail.

The first alignment step (as soon as the potential difference is generated between the first and second electrodes) may be a procedure for changing the alignment direction of the liquid crystal molecules aligned in the first alignment direction into a third alignment direction. The third alignment direction may include directions different from the first or second alignment direction.

The change of the alignment direction of the liquid crystal molecules in the first alignment step in accordance with the position between the first and second electrodes 530 and 630 will be explained in more detail for illustration. When potential difference is generated between the first and second electrodes 530 and 630, relatively strong electric field may be formed at a farther portion from the first and second slits. In addition, at the portion where the first and second slits are formed, relatively weak electric field may be formed.

The alignment direction of the liquid crystal molecules disposed where relatively strong electric field is generated may be changed from the first alignment direction to the third alignment direction, and the third alignment direction may be an optional direction and may not be easily anticipated. The liquid crystal molecules disposed where relatively weak electric field is generated may be changed from the first alignment direction to the third alignment direction, and the third alignment direction may be a perpendicular direction to the first and second slits.

The second alignment step (after a certain time from the generation of the potential difference between the first and second electrodes) may be a procedure of changing the alignment direction of the liquid crystal molecules aligned in the third alignment direction to the second alignment direction. In more detail, the liquid crystal molecules disposed where relatively strong electric field is generated may be changed to have the second alignment direction that is a twisted direction to about 45° or about 135° with respect to the first and second slits. The liquid crystal molecules disposed where relatively weak electric field is generated may be changed to have the second alignment direction that is perpendicular to the first and second slits. Thus, the liquid crystal molecules between the first and second electrodes 530 and 630 may be changed to have a target second alignment direction.

Meanwhile, when the liquid crystal layer 700 or a first or second alignment layer 540 or 640 includes a reactive mesogen material, and when potential difference is generated between the first and second electrodes 530 and 630, the alignment direction of the liquid crystal molecules having the first alignment direction may be changed to the second alignment direction immediately. That is, the alignment direction of the liquid crystal molecules may be directly changed from the first alignment direction to the second alignment direction while omitting the step of changing to the third alignment direction.

Hereinafter, the structures of the first and second electrodes 530 and 630 will be described in detail. Hereinafter, the slit structure of the first electrode will be explained in detail. However, the structures of the first and second electrodes are explained only for illustration, and the present invention is not limited thereto.

FIGS. 16A to 16E are plan views for explaining the structures of first and second electrodes according to exemplary embodiments of the present invention.

Figure 16A:
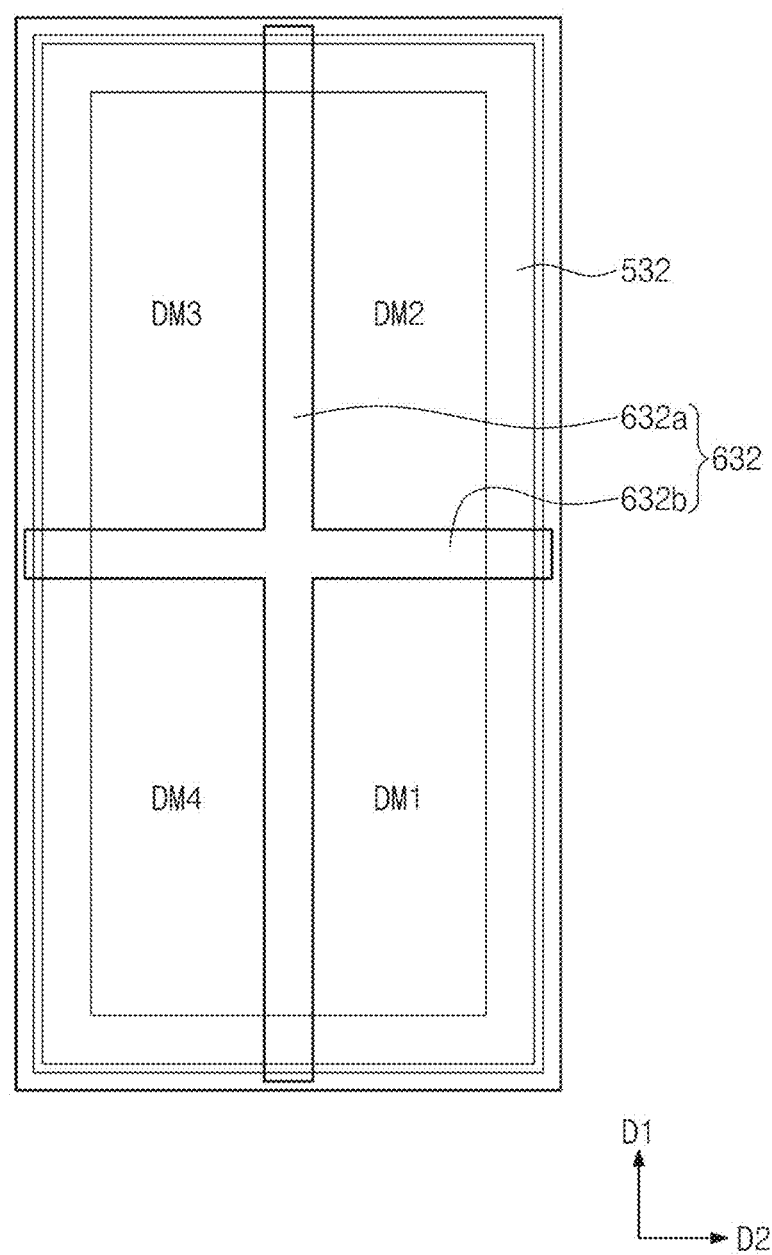
FIGS. 16A to 16F are plan views for explaining the structures of first and second electrodes according to exemplary embodiments of the present invention.

Referring to FIG. 16A, a first electrode 530 may include a first slit 532 formed along the edge portion of the first electrode 530. When the first electrode 530 has a square shape, the first slit 532 may have a square ring shape when seen from plane. The second electrode 630 may include a second slit 632 including a first line 632a penetrating the center of the second electrode 630 and extended in a first direction D1 and a second line 632*b* penetrating the center of the second electrode 630 and extended in a second direction D2. The first and second directions D1 and D2 may be perpendicular to each other. In addition, the first and second lines 632*a* and 632*b* may be connected to each other. For example, the second electrode 630 may have a cross shape.

Figure 16B:
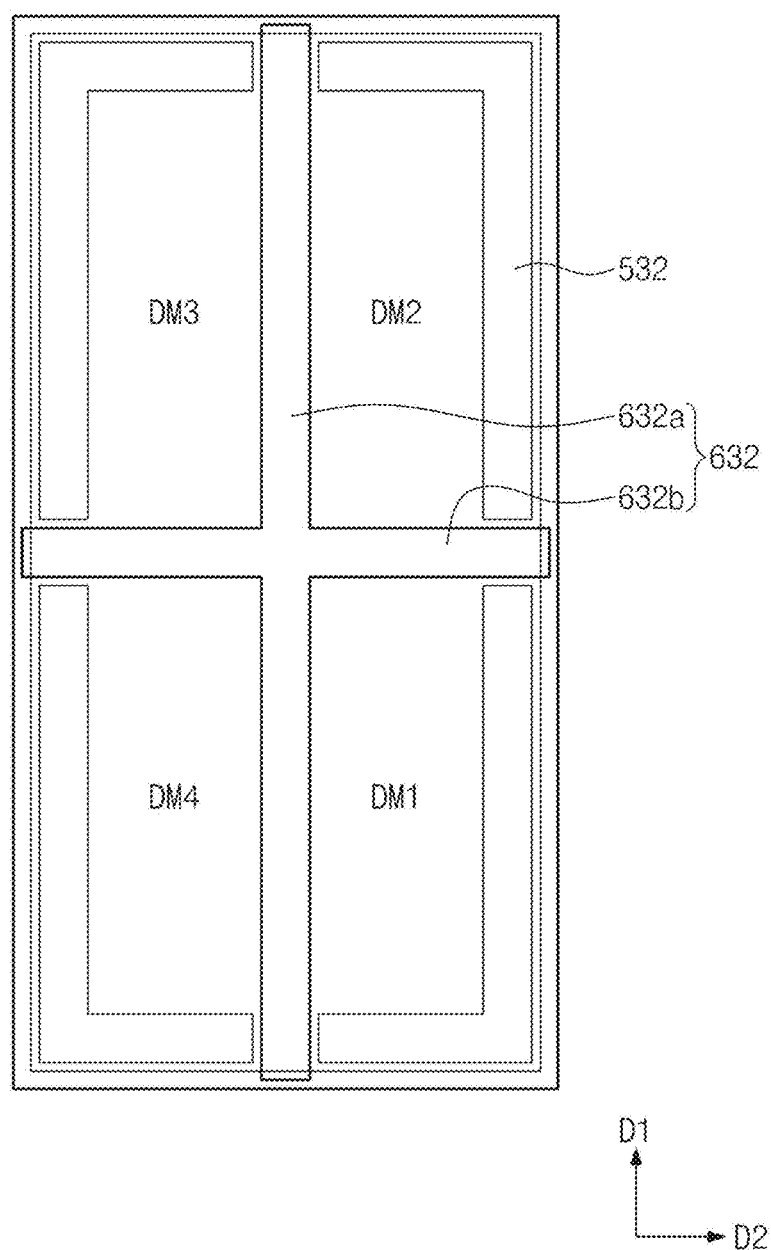

Referring to FIG. 16B, a first electrode 530 may include a first slit 532 formed along the edge portion of the first electrode 530. Different from FIG. 16A, the first slit 532 may not be continuously formed but may include a cut portion in this embodiment. For example, the cut portion of the first slit 532 may be formed at the middle of a side. When the first electrode 530 has a square shape, the first slit 532 may have a clamp shape disposed at each vertex when seen from plane. The structure of a second electrode 630 is substantially the same as that explained in FIG. 16A, and detailed description thereof will be omitted. For example, the second slit 632 of the second electrode 630 may have a cross shape.

In this embodiment, the first slit 532 may be formed so as not to overlap with the second slit 632. For example, a portion of the second slit 632 may be overlapped at the cut portion of the first slit 532.

Figure 16C:
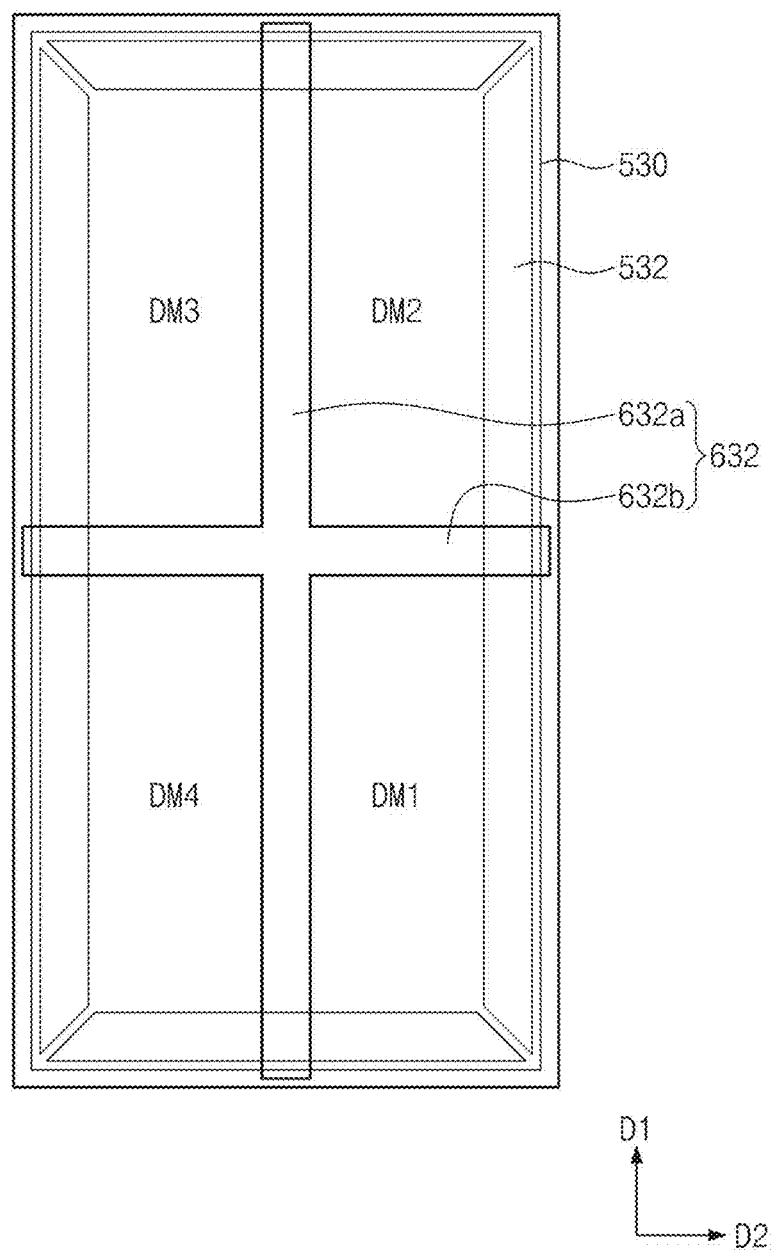

Referring to FIG. 16C, a first electrode 530 may include a first slit 532 formed along the edge portion of the first electrode 530. Different from FIG. 16A, the first slit 532 may not be continuously formed but may include a cut portion at the middle thereof in this embodiment. For example, the cut portion of the first slit 532 may be formed at a vertex portion. When the first electrode 530 has a square shape, the first slit 532 may have a line shape disposed at each side when seen from plane. The structure of the second electrode 630 is substantially the same as that explained in FIG. 16A, and detailed description thereon will be omitted.

Figure 16D:
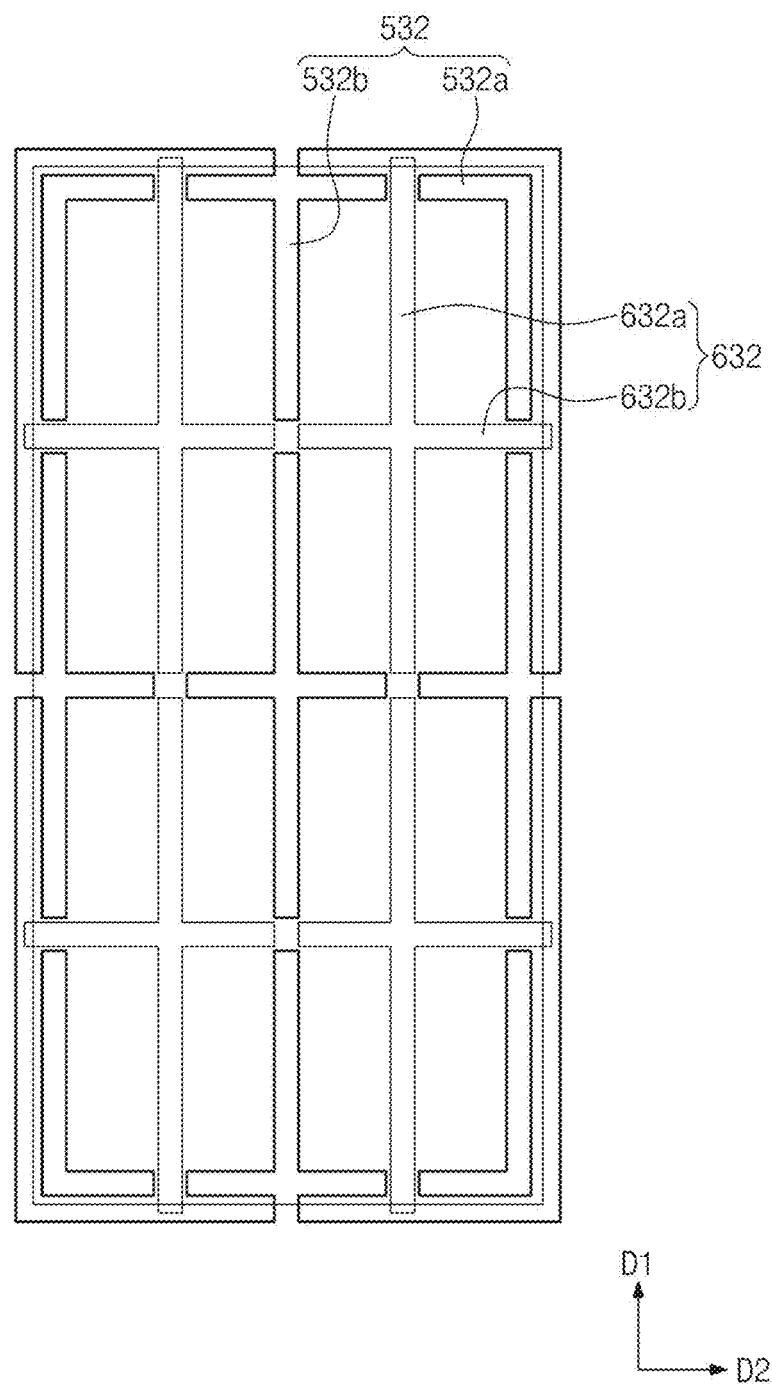

Referring to FIG. 16D, a first electrode 530 may include a first slit 532 including a first line 532*a* formed along the edge portion of the first electrode 530 and a second line 532*b* penetrating the center of the first electrode 530 and having a cross shape. The first slit 532 may include cut portions. The first electrode 530 may be divided into four areas by the first slit 532 of the first electrode 530. The second electrode 630 may include a second slit 632 penetrating the center of the four areas of the first electrode 530 and having a cross shape. According to this embodiment, the first and second slits 532 and 632 may be formed so as not to overlap with each other.

Figure 16E:
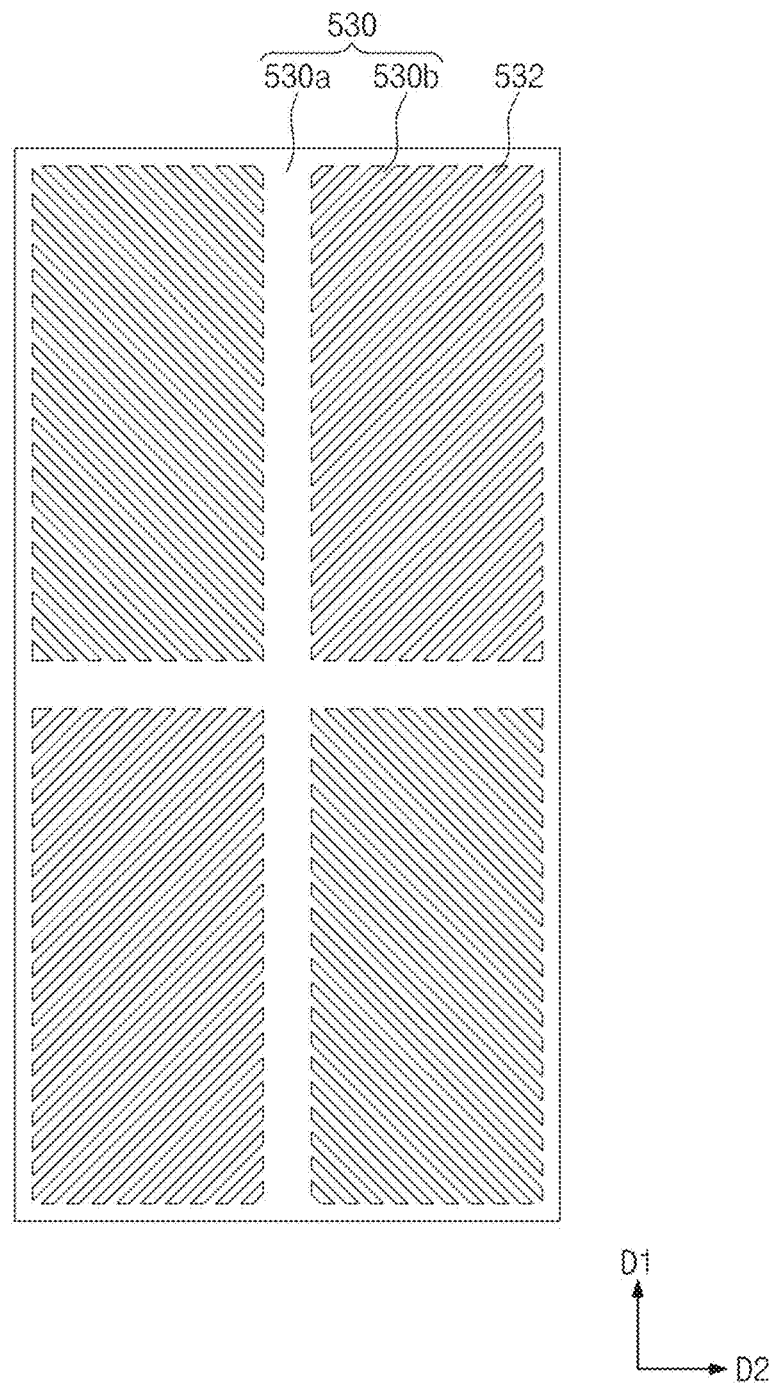

Referring to FIG. 16E, a first electrode 530 may include a stem part 530*a* having a cross shape and a plurality of branch parts 530*b* extruded and extended in a radial direction from the stem part 530*a*. The stem part 530*a* may be provided in diverse shapes and may have, for example, a cross shape. The branch parts 530*b* may be extended in four areas divided by the stem part 530*a* having the cross shape. Each branch part 530*b* is extended toward each vertex, and may be separated by the unit of micrometers (μm). The branch parts 530*b* in neighboring areas may have a mirror image to each other. The first electrode 530 may include a first slit 532 having a line shape and separating the branch parts 530*b*. The distance between the first slits 532 may be a few micrometers. The first slits 532 may not be connected to each other and have a separated shape from each other. Meanwhile, the second electrode 630 may be an electrode having no slit and no pattern in this embodiment.

Figure 16F:
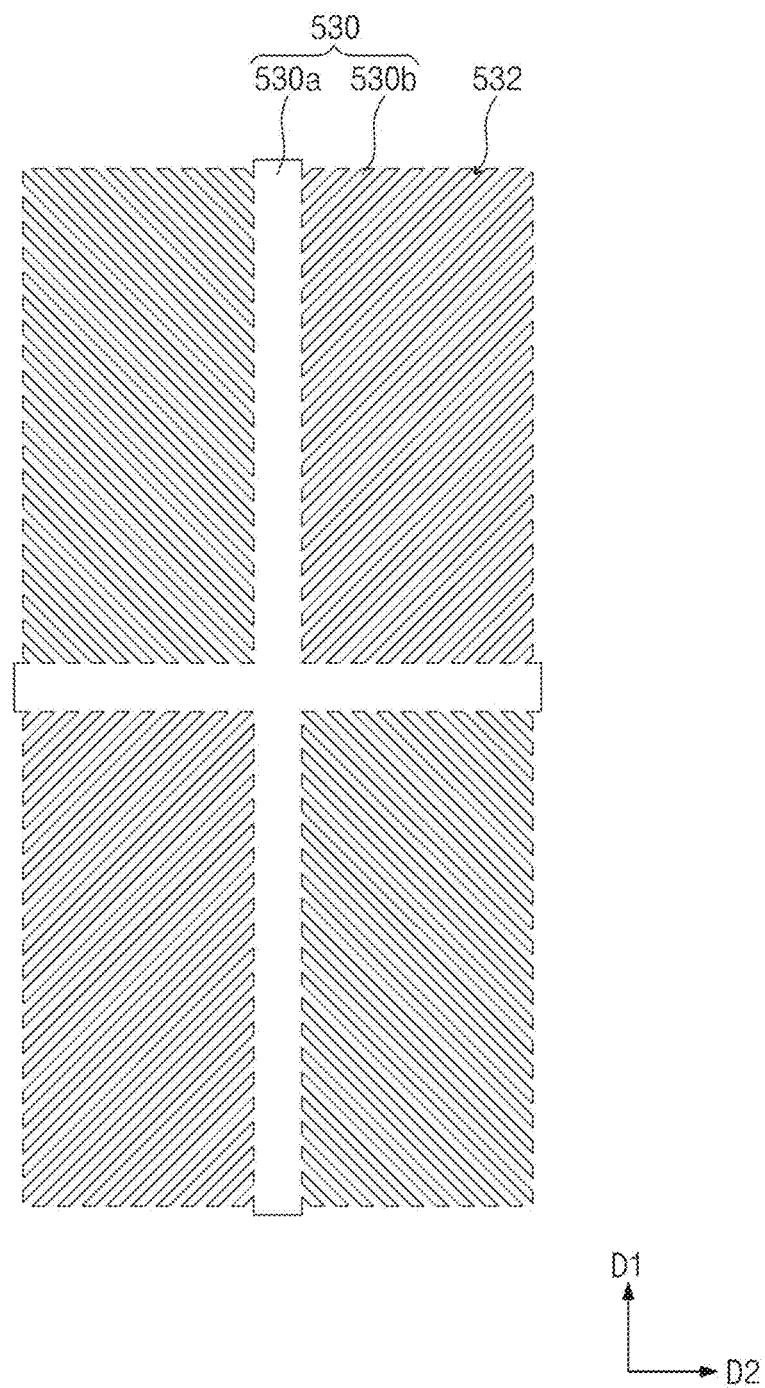

Referring to FIG. 16F, a first electrode 530 may include a stem part 530*a* and branch parts 530*b* similar to the first electrode 530 in FIG. 16E, however first slits 532 having a line shape and separating the branch parts 530*b* may be connected to each other. The second electrode 630 may be an electrode having no slit and no pattern in this embodiment.

Hereinafter, the present invention will be explained in more detail through examples and comparative examples. However, the examples are explained only for illustrating the present invention, and the present invention is not limited thereto and includes various revisions and modifications.

Liquid Crystal Display Device in LVA Mode

EXAMPLE 10

A liquid crystal display device including a first display plate including a first electrode having a first slit of a square ring shape, a second display plate including a second electrode having a second slit of a cross shape, and a liquid crystal layer filling up a space between the first and second display plates was manufactured. The liquid crystal display device was manufactured in a lattice structure vertical alignment (VA) mode having four domains.

The liquid crystal layer was manufactured by mixing about 90 wt % of MLC 6608 ($\Delta n=0.084$, $\Delta\in=-4.3$) of Merck Co. and about 10 wt % of KFLC 3 ($\Delta n=0.18$) of Kingston Chemical Co. at about 100° C. The thickness of the liquid crystal layer of the liquid crystal display device was about 4.0 μm.

EXAMPLE 11

A liquid crystal display device was manufactured by the same procedure described in Example 10 except for the thickness of the liquid crystal layer. The thickness of the liquid crystal layer of Example 11 was about 4.3 μm.

COMPARATIVE EXAMPLE 4

A liquid crystal display device including a first display plate including a first electrode having a first slit of a square ring shape, a second display plate including a second electrode having a second slit of a cross shape, and a liquid crystal layer filling up a space between the first and second display plates was manufactured. The liquid crystal display device was manufactured in a lattice structure vertical alignment (VA) mode having four domains.

The liquid crystal layer was manufactured by using about 100 wt % of MLC 6608 ($\Delta n=0.084$, $\Delta\in=-4.3$) of Merck Co. The thickness of the liquid crystal layer of the liquid crystal display device was about 4.0 μm.

COMPARATIVE EXAMPLE 5

A liquid crystal display device was manufactured by the same procedure described in Comparative Example 5 except for the thickness of the liquid crystal layer. The thickness of the liquid crystal layer of Example 5 was about 4.3 μm.

The component ratios and the thicknesses of the liquid crystal layers of Examples 10 and 11 and Comparative Examples 4 and 5 are illustrated in the following Table 3.

TABLE 3

|  | Liquid crystal layer | | Thickness |
| --- | --- | --- | --- |
|  | MLC 6608 [wt %] (negative nematic liquid crystal) | KFLC 3 [wt %] (ferroelectric liquid crystal) | of liquid crystal layer [μm] |
| Example 10 | 90 | 10 | 4.0 |
| Example 11 | 90 | 10 | 4.3 |
| Comparative Example 4 | 100 | 0 | 4.0 |
| Comparative Example 5 | 100 | 0 | 4.3 |

Evaluation of Transmittance

Figure 17A:
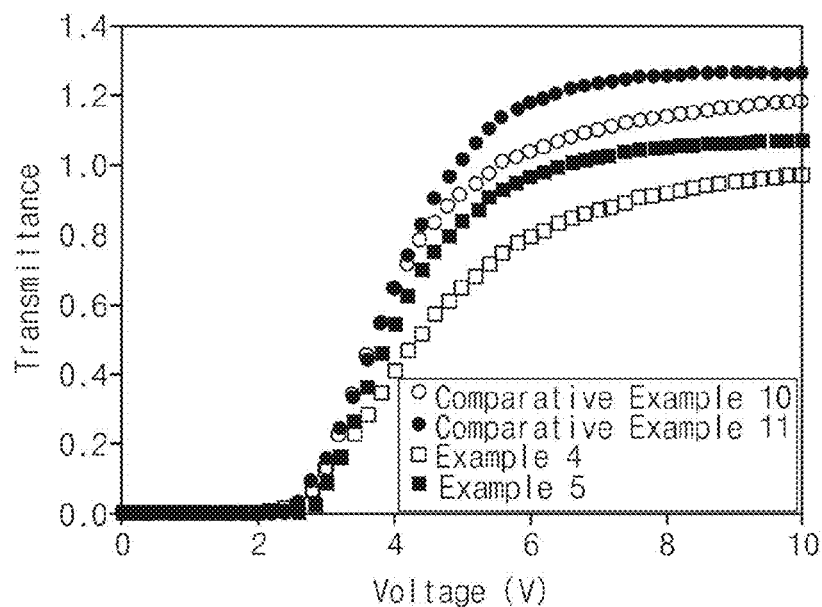
FIGS. 17A and 17B are graphs for comparing the transmittance of the liquid crystal display devices of Examples 1 and 2 and the liquid crystal display devices of Comparative Examples 1 and 2.
Figure 17B:
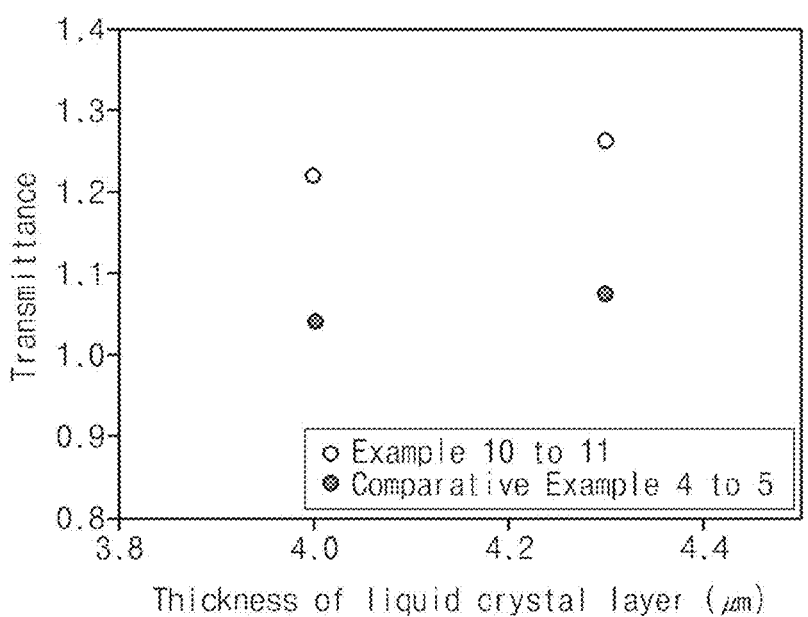

FIGS. 17A and 17B are graphs for comparing the transmittance of the liquid crystal display devices according to Examples 10 and 11 and Comparative Examples 4 and 5.

FIG. 17A is a graph illustrating the transmittance according to an applied voltage. In FIG. 17A, x-axis represents an applied voltage, and the unit thereof is [V], and y-axis represents transmittance. FIG. 17B is a graph illustrating the transmittance according to the thickness of a liquid crystal layer when applying a voltage of about 7 V. In FIG. 17B, x-axis represents the thickness of the liquid crystal layer, and the unit thereof is [μm], and y-axis represents transmittance.

Referring to FIG. 17A, the liquid crystal display devices of Examples 10 and 11 exhibit good transmittance in general when compared to that of Comparative Examples 4 and 5. In addition, referring to FIG. 17B, the transmittance of a liquid crystal display device having the thickness of the liquid crystal layer of about 4.3 μm is good when the same voltage of 7 V is applied. In addition, the transmittance of Examples 10 and 11 is better than that of Comparative Examples 4 and 5, respectively.

Through the above evaluation, the ferroelectric liquid crystal in the liquid crystal layer of Examples 10 and 11 is expected to induce the alignment of the liquid crystal molecules uniformly and stably. Thus, the transmittance of the liquid crystal display devices of Examples 10 and 11 is better than that of the liquid crystal display device of Comparative Examples 4 and 5.

Evaluation of Response Time

Figure 18:
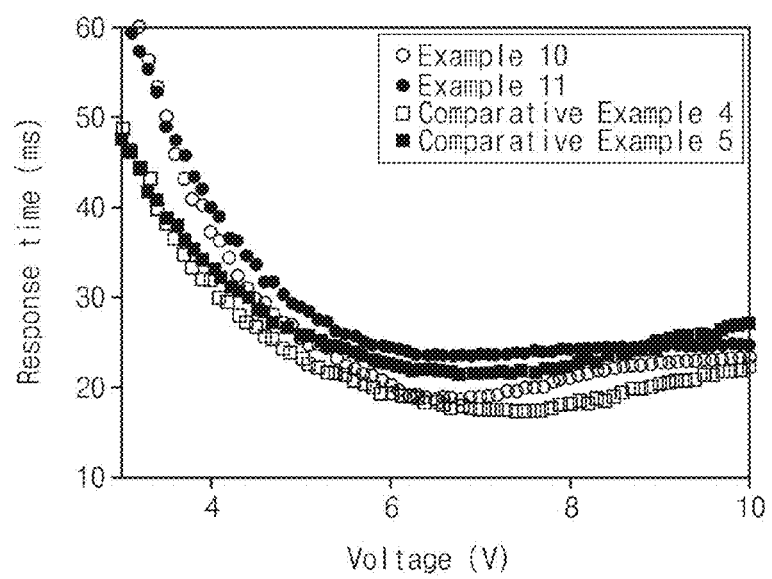
FIG. 18 is a graph for comparing the response time of the liquid crystal display devices of Examples 1 and 2 and the liquid crystal display devices of Comparative Examples 1 and 2.

FIG. 18 is a graph for comparing the response time of the liquid crystal display devices of Examples 10 and 11 and the liquid crystal display devices of Comparative Examples 4 and 5.

FIG. 18 is a graph illustrating the response time according to an applied voltage. In FIG. 18, x-axis represents an applied voltage, and the unit thereof is [V], and y-axis represents response time, and the unit thereof is [ms].

Referring to FIG. 18, the response time of Example 11 is smaller than that of Example 10 because the thickness of the liquid crystal layer of Example 11 is greater than the thickness of the liquid crystal layer of Example 10. When comparing Example 10 and Comparative Example 4, the difference of the response time at about 7 V is found less than or equal to about 5 ms. When comparing Example 11 and Comparative Example 5, the difference of the response time at about 7 V is found less than or equal to about 5 ms. Since the liquid crystal layers of Examples 10 and 11 include the ferroelectric liquid crystal, the viscosity of the liquid crystal layer may increase, and the response time thereof is slightly decreased than or similar to the response time of the liquid crystal display devices of Comparative Examples 4 and 5.

However, the response time according to the product (Δd·∈) of the thickness of the liquid crystal layer and the refractive index of the liquid crystal layer is not smaller for Examples 10 and 11 when compared to that of Comparative Examples 4 and 2. Thus, the liquid crystal display devices of Examples 10 and 11 have not slow response time and attain stable and uniform alignment of liquid crystal molecules due to the ferroelectric liquid crystal.

Evaluation of Textures

FIGS. 19A, 19B, 20A and 20B are textures of the liquid crystal display devices of Comparative Example 4 and Example 10.

In the liquid crystal display devices, a voltage of about 7 V was applied, and a cross polarization plate was rotated to obtain white images and black images in FIGS. 19A, 19B, 20A and 20B.

Figure 19A:
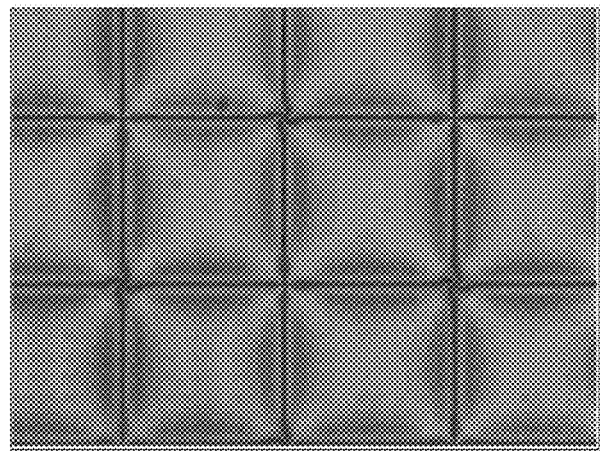
FIGS. 19A to 19B, 20A and 20B are the textures of the liquid crystal display devices of Comparative Example 1 and Example 1.
Figure 19A:
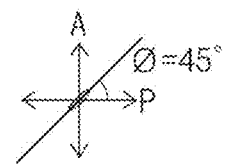
Figure 19B:
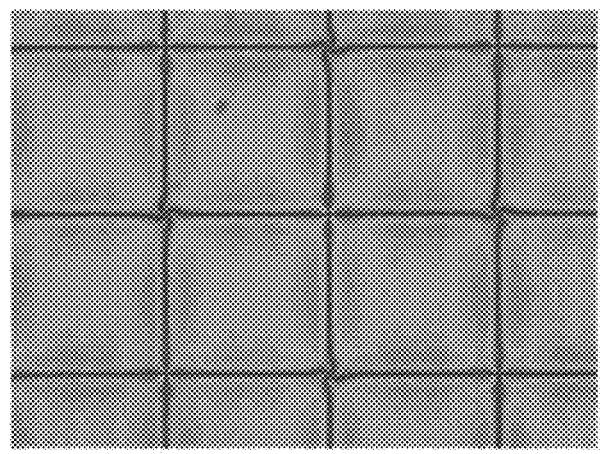
Figure 19B:
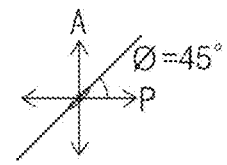

The textures of FIGS. 19A and 19B are white images under the cross polarization plate. In more detail, the white images are obtained when the angle between the cross polarization plate and the liquid crystal molecules of the liquid crystal layer is about 45°, and bright images are shown via the penetration of lights through the liquid crystal layer. This may be confirmed in the above Mathematical Formula 1.

In the above Mathematical Formula 1, T is transmittance, ϕ is an angle formed by a polarization plate and liquid crystal molecules, Δn is a birefringence value, d is the thickness of a liquid crystal layer, and λ is the wavelength of exposing lights. In Mathematical Formula 1, when ϕ is 45°, a $\sin^2$ value is the maximum value, and the transmittance is the highest.

FIGS. 19A and 19B are textures of Comparative Example 4 and Example 10. Referring to FIG. 19A, defects appearing black are shown at the edge portions of the slit or at the border of the slits. Referring to FIG. 19B, the defects appearing black are removed at the edge portions of the slit when compared to those of FIG. 19A.

Figure 20A:
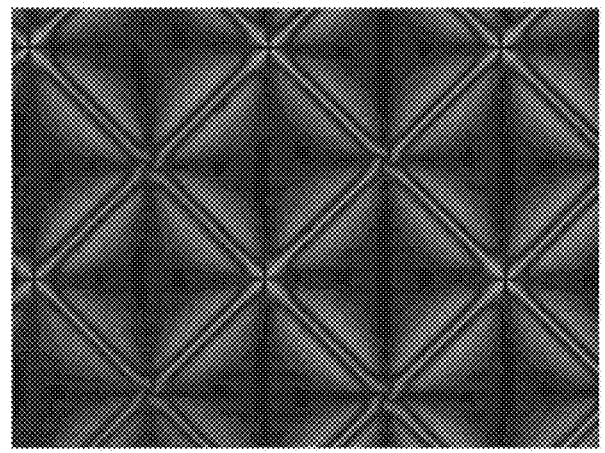
Figure 20A:
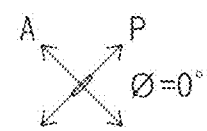
Figure 20B:
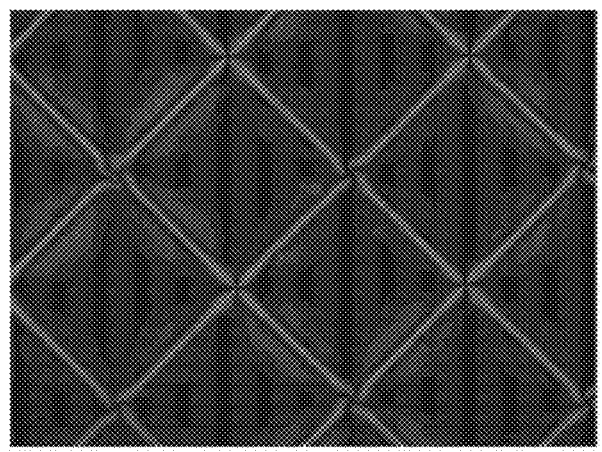
Figure 20B:
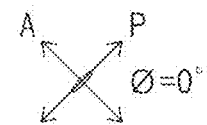

The textures in FIGS. 20A and 20B exhibit black images under the cross polarization plate. In more detail, the black images are obtained when the angle between the cross polarization plate and the liquid crystal molecules of the liquid crystal layer is about 0°, and black images are shown because a rotated upper polarization plate has perpendicular polarization with respect to polarized lights penetrated through the liquid crystal layer. In the above Mathematical Formula 1, when ϕ is 0°, a $\sin^2$ value is 0, and the transmittance becomes 0.

FIGS. 20A and 20B are textures of Comparative Example 4 and Example 10. Referring to FIG. 20A, light leakage phenomena are shown at the edge portions of the slit or at the border of the slits. Referring to FIG. 20B, the light leakage phenomena are mostly removed at the border of the slits as well as at the edge portions of the slit when compared to FIG. 20A.

When inspecting the textures, the alignment of the liquid crystal molecules in the liquid crystal layer including the ferroelectric material is uniform and stable when compared to that of a liquid crystal layer not including the ferroelectric material, thereby improving the luminance of a liquid crystal display device.

Figure 21A:
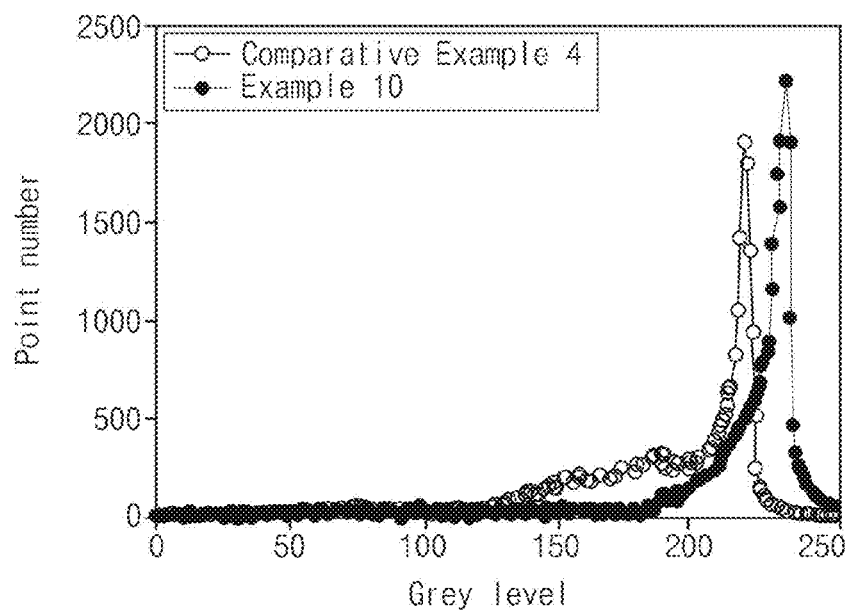
FIGS. 21A and 21B are graphs illustrating the grey level of the liquid crystal display devices of Comparative Example 1 and Example 1.
Figure 21B:
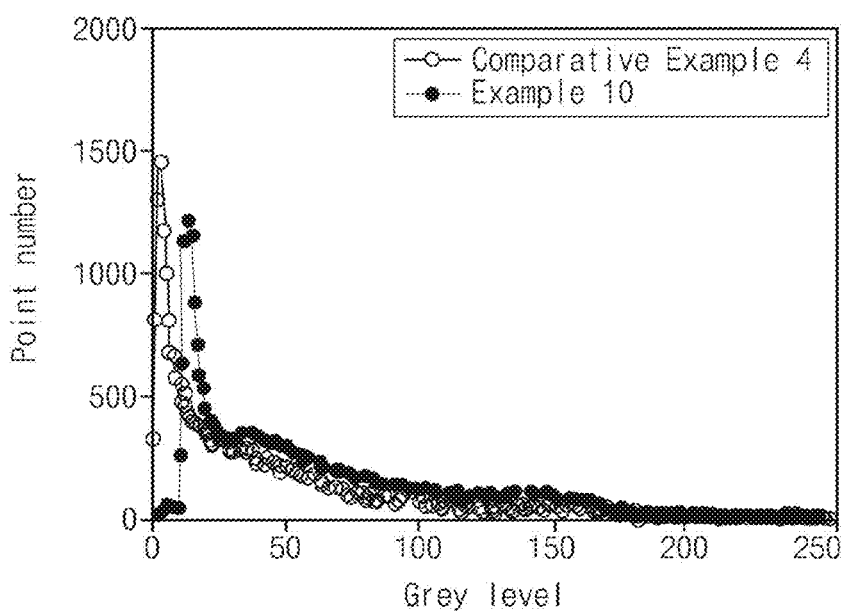

FIGS. 21A and 21B are graphs illustrating the grey level of the textures of Comparative Example 4 and Example 10. FIGS. 21A and 21B are evaluated by 256 ($2^8$) grey levels. As the grey level approaches to 0, grey closes to black, and the concentration of the grey is represented by the levels from 0 to 255.

FIG. 21A illustrates the grey level of the textures in FIGS. 19A and 19B, and the white images are found around the grey level of about 255. The white image of Comparative Example 4 in FIG. 19A is found a lot from about 200 to about 230 of the grey level, and the peak width thereof is found wide. The white image of Example 10 in FIG. 19B is found a lot from about 240 to about 250 of the grey level, and the peak width thereof is found narrower when compared to that of Comparative Example 4.

FIG. 21B represents the grey level of the textures in FIGS. 20A and 20B, and the black images are found around 0 of the grey level. The black image of Comparative Example 4 in FIG. 20A is found a lot from about 30 to about 50 of the grey level, and the peak width thereof is found wide. The black image of Example 10 in FIG. 20B is found a lot from about 0 to about 20 of the grey level, and the peak width thereof is found narrower when compared to that of Comparative Example 1.

When inspecting the graphs in FIGS. 21A and 21B, the alignment of the liquid crystal molecules in the liquid crystal layer including the ferroelectric material is uniform and stable when compared to that of a liquid crystal layer not including the ferroelectric material, thereby improving the luminance of a liquid crystal display device.

Figure 22A:
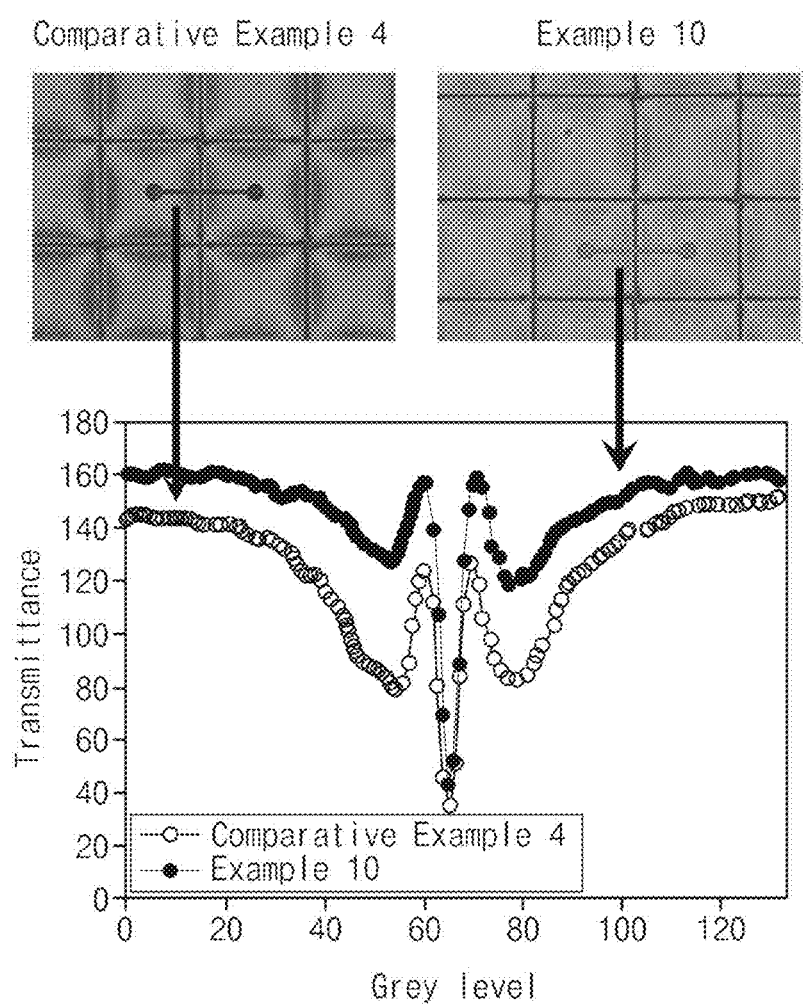
FIGS. 22A and 22B are graphs illustrating the transmittance according to the regular interval of the texture of the liquid crystal display devices of Comparative Example 1 and Example 1.
Figure 22B:
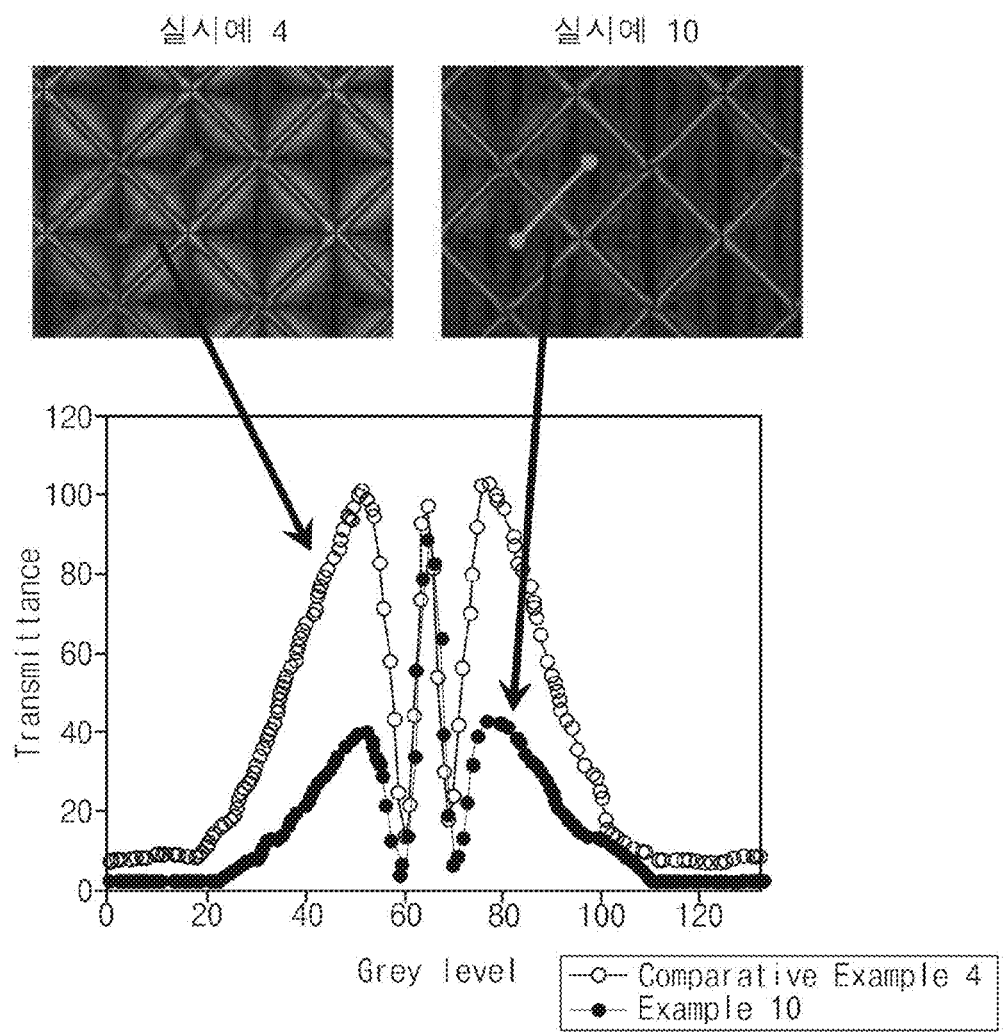

FIGS. 22A and 22B are graphs illustrating the transmittance of Comparative Example 4 and Example 10 according to the regular interval of the textures. FIGS. 22A and 22b are obtained by conducting experiments on transmittance with respect to the regular interval of the texture including an electrode part and a slit part according to Comparative Example 4 and Example 10.

FIG. 22A illustrates a graph of experiment with respect to the white textures of Comparative Example 4 and Example 10. Referring to FIG. 22A, the transmittance of Example 10 is greater in general than that of Comparative Example 4. At the border of the slits, the transmittance of Example 10 is better.

FIG. 22B illustrates a graph of experiment with respect to the black textures of Comparative Example 4 and Example 10. Referring to FIG. 22B, the transmittance of Example 10 is smaller in general than that of Comparative Example 4. Particularly, at the border of the slits, the transmittance of Example 10 is markedly smaller than that of Comparative Example 4 in consideration of light leakage.

When inspecting the graphs in FIGS. 22A and 22B, the alignment of the liquid crystal molecules in the liquid crystal layer including the ferroelectric material is uniform and stable when compared to that of a liquid crystal layer not including the ferroelectric material, thereby improving the luminance of a liquid crystal display device.

[[Liquid Crystal Display Device in FFS Mode]]

Figure 23:
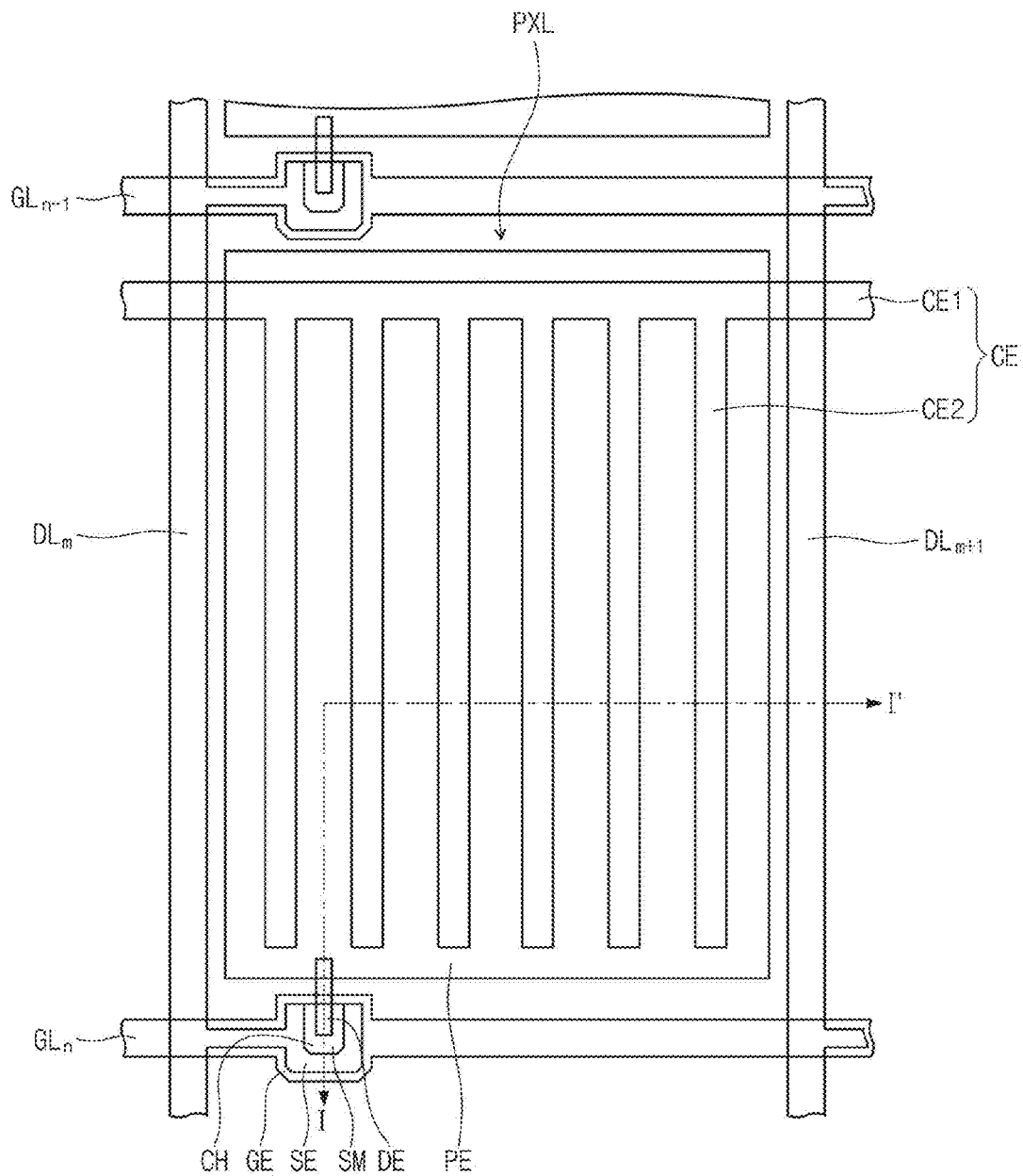
FIG. 23 is a plan view for explaining a liquid crystal display device according to an embodiment of the present invention.
Figure 24:
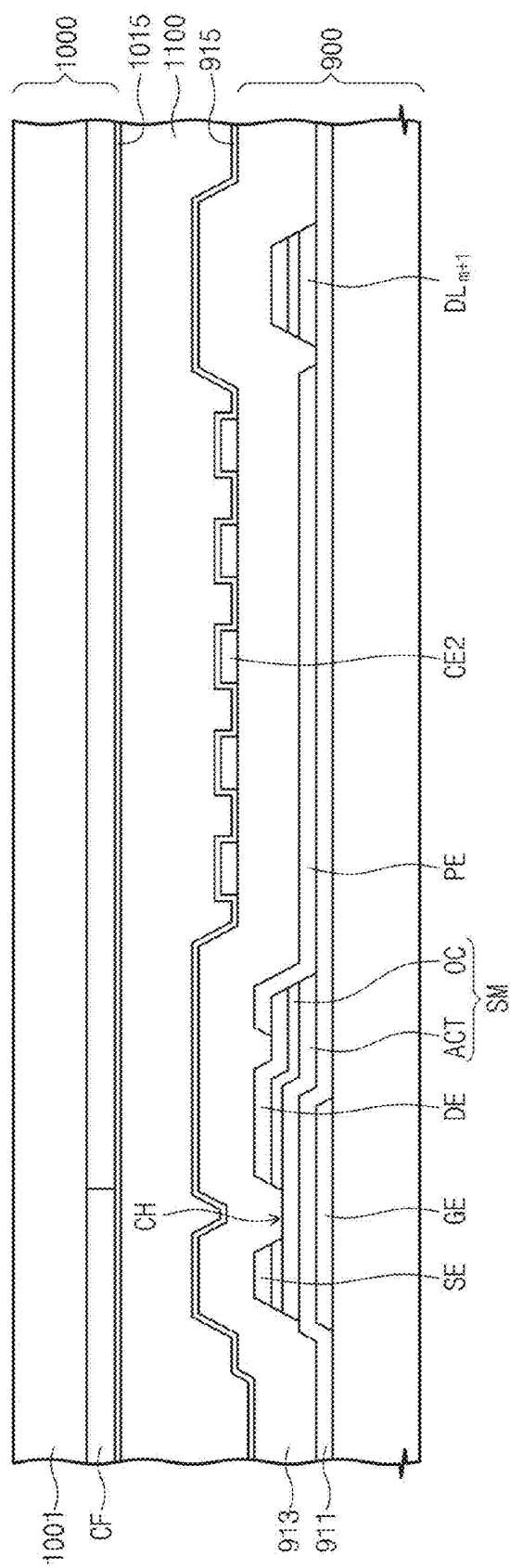
FIG. 24 is a cross-sectional view for explaining a liquid crystal display device according to an embodiment of the present invention.

FIGS. 23 and 24 are a plan view and a cross-sectional view for explaining a liquid crystal display device according to an embodiment of the present invention.

Referring to FIGS. 23 and 24, a liquid crystal display device 2 includes a first substrate 900, a second substrate 1000 opposing the first substrate 900 and a liquid crystal layer 1100 formed between the first substrate 900 and the second substrate 1000. Since the first substrate 900 corresponds to a substrate on which thin film transistors are formed, the first substrate 900 is called a thin film transistor substrate. Since the second substrate 1000 corresponds to a substrate on which color filters CF are formed, the second substrate 1000 is called a color filter substrate.

The first substrate 900 includes a first insulation substrate 901, a plurality of gate lines, a plurality of data lines and a plurality of pixels PXL. The first insulation substrate 901 has an approximately square shape and is formed using a transparent insulating material.

The gate lines are formed on the first insulation substrate 901 and are extended in a first direction. The gate lines include, for example, n+p numbers of gate lines GL1, . . . , GLn, GLn+1, . . . , GL(n+p)−1, GL(n+p).

The data lines are extended in a second direction that is crossing the first direction and are separated from the gate lines with an insulation layer therebetween. The data lines include, for example, m+q numbers of data lines DL1, . . . , DLm, DLm+1, . . . , DL(m+q)−1, DL(m+q). Each pixel is connected to one of the gate lines GL1, . . . , GLn, GLn+1, . . . , GL(n+p)−1, GL(n+p) and one of the data lines DL1, . . . , DLm, DLm+1, . . . , DL(m+q)−1, DL(m+q).

Since each pixel PXL has the same structure, an n-th gate line GLn, an m-th data line DLm and one pixel PXL are illustrated in FIG. 23 for convenience of explanation.

Each pixel PXL includes a thin film transistor, a pixel electrode PE connected to the thin film transistor, a passivation layer 913 covering the pixel electrode PE, and a common electrode CE separately provided from the pixel electrode PE. The thin film transistor includes a gate electrode GE, a gate insulation layer 911, a semiconductor pattern SM, a source electrode SE and a drain electrode DE.

The gate electrode GE is extruded from the n-th gate line GLn or provided in a partial area of the n-th gate line GLn.

The gate electrode GE may be formed using a metal. The gate electrode GE may be formed using nickel, chromium, molybdenum, aluminum, titanium, copper, tungsten and an alloy thereof. The gate electrode GE may be formed as a single layer or a multi layer using the metal. For example, the gate electrode GE may be a triple layer obtained by stacking molybdenum, aluminum and molybdenum one by one, or a double layer obtained by stacking titanium and copper one by one. Alternatively, the gate electrode GE may be a single layer formed by using an alloy of titanium and copper.

The gate insulation layer 911 is provided on the front side of the first insulation substrate 901 to cover the n-th gate line GLn and the n-th gate line GLn.

The semiconductor pattern SM is provided on the gate insulation layer 911. The semiconductor pattern SM is partially overlapped with the gate electrode GE. The semiconductor pattern SM includes an active pattern ACT provided on the gate insulation layer 911 and an ohmic contact layer OC formed on the active pattern ACT. The active pattern ACT may be formed as an amorphous silicon thin film, and the ohmic contact layer OC may be formed as an n+ amorphous silicon thin film. The ohmic contact layer OC is provided between a portion of the active pattern ACT and a source electrode SE described later and between another portion of the active pattern ACT and a drain electrode DE described later. The ohmic contact layer OC makes ohmic contact between the active pattern ACT and the source electrode SE and the drain electrode DE, respectively.

The source electrode SE is branched from the m-th data line DLm and provided. The source electrode SE is formed on the ohmic contact layer OC and is partially overlapped with the gate electrode GE.

The drain electrode DE is separated from the source electrode SE and provided with the semiconductor pattern SM therebetween. The drain electrode DE is formed on the ohmic contact layer OC and is partially overlapped with the gate electrode GE.

The source electrode SE and the drain electrode DE may be formed using nickel, chromium, molybdenum, aluminum, titanium, copper, tungsten and an alloy thereof. The source electrode SE and the drain electrode DE may be formed as a single layer or a multi layer using the metal. For example, the source electrode SE and the drain electrode DE may be a double layer obtained by stacking titanium and copper one by one. Alternatively, the source electrode SE and the drain electrode DE may be a single layer formed by using an alloy of titanium and copper.

The source electrode SE and the drain electrode DE are provided so as to be separated to a certain distance on the semiconductor pattern SM. Thus, the top surface of the active pattern ACT between the source electrode SE and the drain electrode DE is exposed, thereby forming a channel part CH forming a conductive channel between the source electrode SE and the drain electrode DE according to the application of the voltage of the gate electrode GE.

The pixel electrode PE is provided on the drain electrode DE and the gate insulation layer 911. The pixel electrode PE is provided directly on a portion of the drain electrode DE and the gate insulation layer 911 and makes a direct contact with a portion of the drain electrode DE and the gate insulation layer 911.

The pixel electrode PE has an approximately square shape when seen from plane and is not limited thereto. The pixel electrode PE may have diverse shapes according to the shape of a pixel. The pixel electrode PE is formed as a whole plate without pattern such as opening parts therein.

The common electrode CE may include a pattern having an opening part. According to an embodiment of the present invention, the common electrode CE may be extended in one direction and may have an equally-spaced stripe structure. Even though the common electrode CE having a stripe structure is explained as an illustration in this embodiment, the structure of the common electrode CE is not limited thereto in the present invention.

According to another embodiment of the present invention, the first substrate 900 may further include a first alignment layer 915 between the common electrode CE and the liquid crystal layer 1100. The first alignment layer 915 may pre-tilt the liquid crystal molecules in the liquid crystal layer 1100 in one direction. According to an embodiment, the first alignment layer 915 may include at least one selected from the group consisting of polyamic acid, polyimide, lecithin, nylon and PVA. According to another embodiment, the first alignment layer 915 may further include a reactive mesogen material.

According to a further another embodiment of the present invention, the second substrate 1000 may further include a second alignment layer 1015 between the color filter CF and the liquid crystal layer 1100. According to an embodiment, the second alignment layer 1015 may include at least one selected from the group consisting of polyamic acid, polyimide, lecithin, nylon and PVA. According to another embodiment, the second alignment layer 1015 may further include a reactive mesogen material.

The liquid crystal layer 1100 may fill up a space between the first and second substrates 900 and 1000. According to an embodiment, the liquid crystal layer 1100 may include a negative nematic liquid crystal, a positive nematic liquid crystal and a ferroelectric liquid crystal. According to another embodiment, the liquid crystal layer 1100 may include a non-ferroelectric liquid crystal and a ferroelectric liquid crystal. The explanation on the liquid crystal layer 1100 is substantially the same as that explained in the liquid crystal layer in the PVA mode, and detailed description thereof will be omitted.

As described above, since the liquid crystal layer 1100 of the liquid crystal display device in a field fringe switching (FFS) mode includes the ferroelectric liquid crystal together with the nematic liquid crystal, the alignment of the liquid crystal layer may become uniform and the stability of the alignment thereof may be improved. Thus, the luminance of the liquid crystal display device including the liquid crystal layer 1100 may be improved. In addition, since the first and second alignment layers 915 and 1015 further include the reactive mesogen material, the alignment rate and the alignment angle of the liquid crystal molecules in the liquid crystal layer 1100 may be increased, thereby improving optical properties.

Hereinafter, the present invention will be explained in detail through examples and comparative examples. However, the following examples are described only for illustrating the present invention. Thus, the present invention is not limited thereto and may be modified and changed diversely.

Liquid Crystal Display Device in FFS Mode

EXAMPLE 12

A liquid crystal display device of FIGS. 23 and 24 including a first substrate including a common electrode having a stripe pattern and a pixel electrode of a whole plate, a second display plate and a liquid crystal layer filling up a space between the first and second display plates was manufactured. The liquid crystal display device was manufactured in a FFS mode.

The liquid crystal layer was manufactured by mixing about 90 wt % of MLC 6608 ($\Delta n=0.084$, $\Delta \in =-4.3$) of Merck Co. and about 10 wt % of KFLC 3 ($\Delta n=0.18$) of Kingston Chemical Co. at about 100° C. The thickness of the liquid crystal layer of the liquid crystal display device was about 3.3 μm.

EXAMPLES 13 to 16

Liquid crystal display devices of Examples 13 to 16 were manufactured by the same procedure described in Example 12 except for the thickness of the liquid crystal layer. The thickness of the liquid crystal layers of Examples 13 to 16 are illustrated in the following Table 1.

COMPARATIVE EXAMPLE 6

A liquid crystal display device of FIGS. 23 and 24 including a first substrate including a common electrode having a stripe pattern and a pixel electrode of a whole plate, a second display plate and a liquid crystal layer filling up a space between the first and second display plates was manufactured. The liquid crystal display device was manufactured in a FFS mode.

The liquid crystal layer was manufactured by using about 100 wt % of MLC 6608 ($\Delta n=0.084$, $\Delta \in =-4.3$) of Merck Co. The thickness of the liquid crystal layer of the liquid crystal display device was about 3.3 μm.

COMPARATIVE EXAMPLES 7 to 10

Liquid crystal display devices of Comparative Examples 7 to 10 were manufactured by the same procedure described in Comparative Example 6 except for the thickness of the liquid crystal layer. The thickness of the liquid crystal layers of Comparative Examples 7 to 10 are illustrated in the following Table 4.

TABLE 4

| | Liquid crystal layer | | Thickness of liquid crystal layer [μm] |
| --- | --- | --- | --- |
| | MLC 6608 [wt %] (negative nematic liquid crystal) | KFLC 3 [wt %] (ferroelectric liquid crystal) | |
| Example 12 | 90 | 10 | 3.3 |
| Example 13 | 90 | 10 | 3.5 |
| Example 14 | 90 | 10 | 3.8 |
| Example 15 | 90 | 10 | 4.0 |
| Example 16 | 90 | 10 | 4.3 |
| Comparative Example 6 | 100 | 0 | 3.3 |
| Comparative Example 7 | 100 | 0 | 3.5 |
| Comparative Example 8 | 100 | 0 | 3.8 |
| Comparative Example 9 | 100 | 0 | 4.0 |
| Comparative Example 10 | 100 | 0 | 4.3 |

Evaluation of Transmittance

Figure 25A:
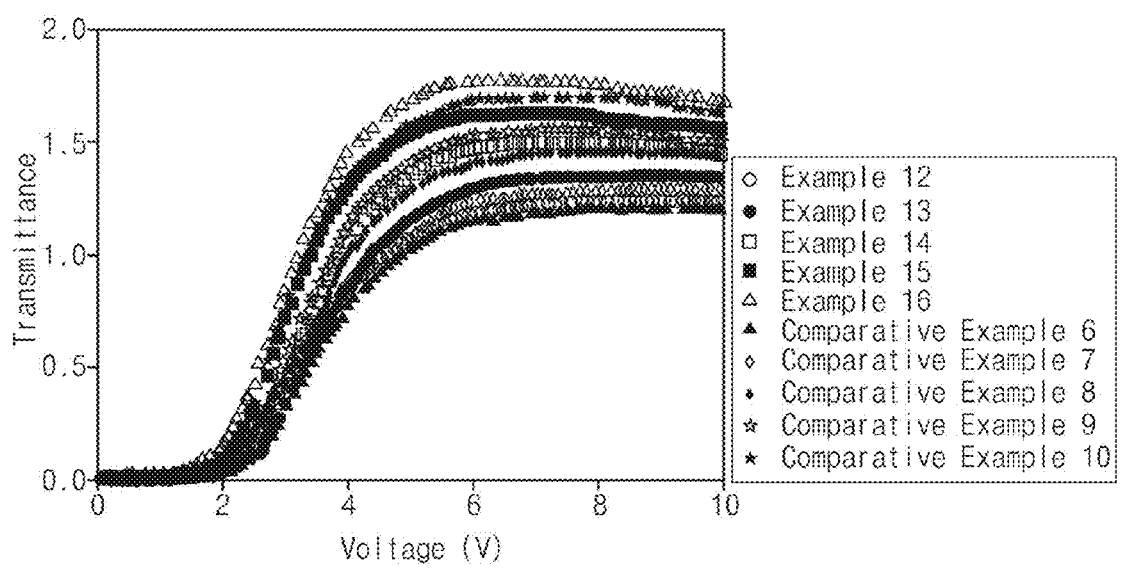
FIGS. 25A and 25B are graphs for comparing the transmittance of the liquid crystal display devices of Examples 12 to 16 and the liquid crystal display devices of Comparative Examples 6 to 10.
Figure 25B:
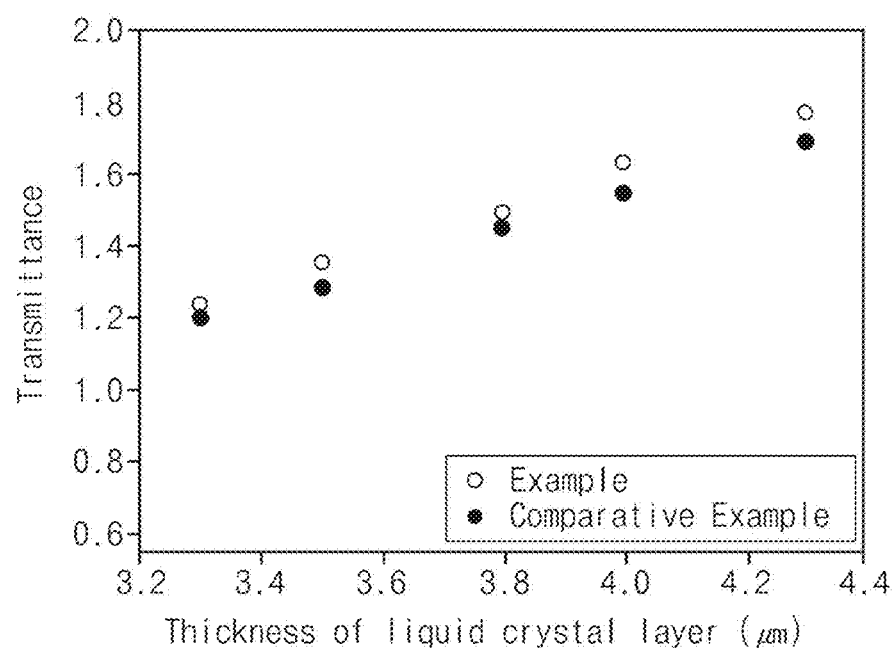

FIGS. 25A and 25B are graphs for comparing the transmittance of the liquid crystal display devices according to Examples 12 to 16 and the liquid crystal display devices according to Comparative Examples 6 to 10. FIGS. 25A and 25B are graphs illustrating the transmittance according to an applied voltage. In FIGS. 25A and 25B, x-axes represent an applied voltage, and the unit thereof is [V], and y-axes represent transmittance.

Referring to FIGS. 25A and 25B, the transmittance of the liquid crystal display devices according to Examples 12 to 16 is good in general when compared to that of the liquid crystal display devices according to Comparative Examples 6 to 10. The transmittance of the liquid crystal display devices according to the examples is excellent in general when compared to that of the liquid crystal display device according to the comparative examples with the same thickness of the liquid crystal layer.

Through the above evaluation, the ferroelectric liquid crystal in the liquid crystal layer of Examples 12 to 16 is expected to induce the alignment of the liquid crystal molecules uniformly and stably. Thus, the transmittance of the liquid crystal display devices of Examples 12 to 16 is better than that of the liquid crystal display device of Comparative Examples 6 to 10.

Evaluation of Response Time

Figure 26A:
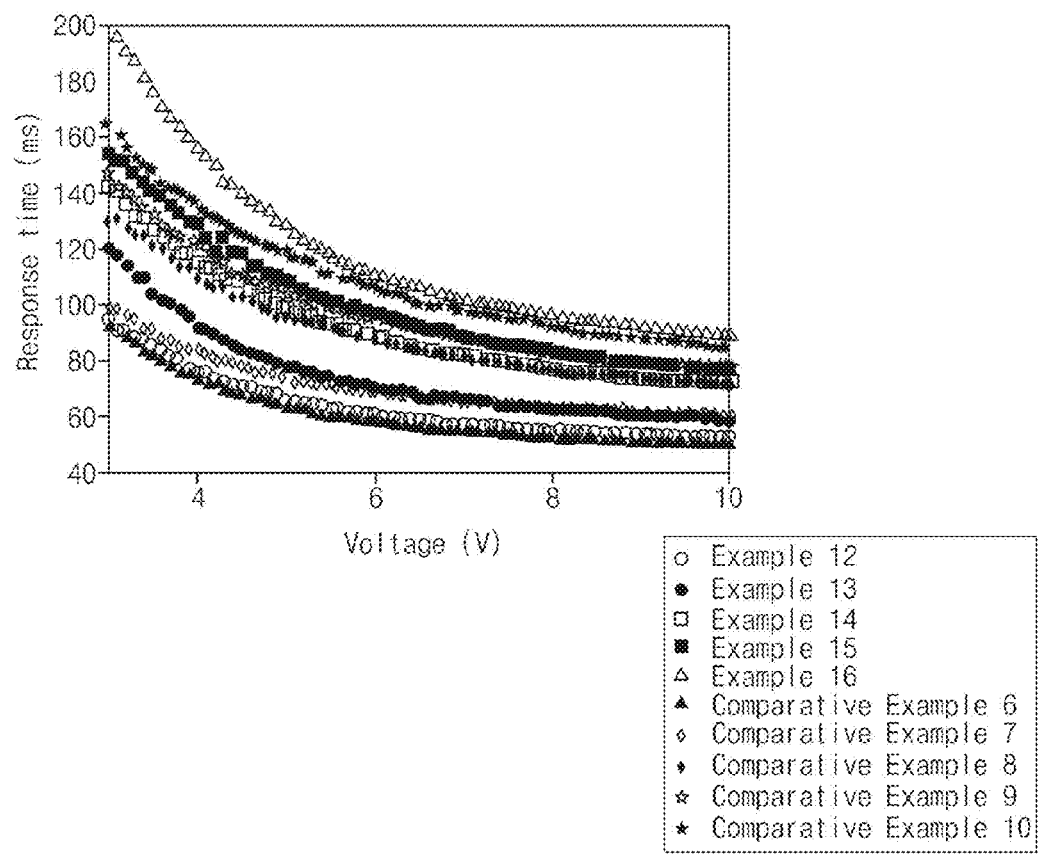
FIGS. 26A and 26B are graphs for comparing the response time of the liquid crystal display devices of Examples 12 to 16 and the liquid crystal display devices of Comparative Examples 6 to 10.
Figure 26B:
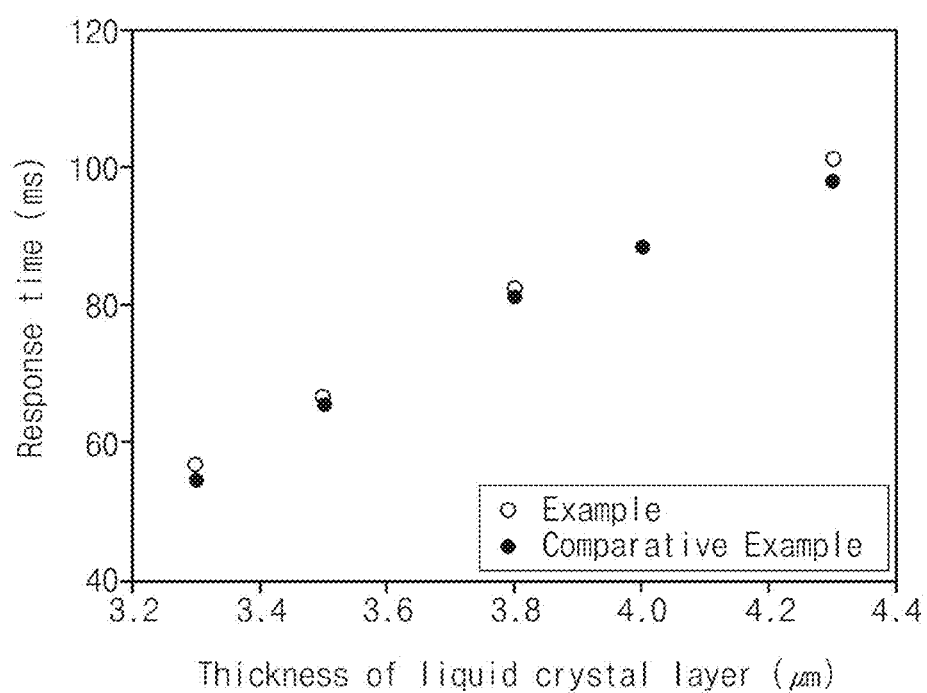

FIGS. 26A and 26B are graphs for comparing the response time of the liquid crystal display devices of Examples 12 and 16 and the liquid crystal display devices of Comparative Examples 6 to 10.

FIGS. 26A and 26B are graphs illustrating the response time according to an applied voltage. In FIGS. 26A and 26B, x-axes represent an applied voltage, and the unit thereof is [V], and y-axes represent response time, and the unit thereof is [ms].

Referring to FIGS. 26A and 26B, the response time of the liquid crystal display devices of Examples 12 to 16 is not much smaller than that of the liquid crystal display devices of Comparative Examples 6 to 10. Particularly, the difference of the response time is hardly generated when the applied voltage is high. Since the liquid crystal layers of Examples 12 to 16 include the ferroelectric liquid crystal, the viscosity of the liquid crystal layer may increase, and the response time thereof is slightly decreased than or similar to the response time of the liquid crystal display devices of Comparative Examples 6 to 10. However, the difference of the response time between the comparative examples and the examples is not much great. Thus, the liquid crystal layers of Examples 12 to 16 may attain stable and uniform alignment and maintain common response time through including the ferroelectric liquid crystal.

Evaluation of Textures

FIGS. 27A to 27K are changing textures according to an applied voltage in the liquid crystal display device of Example 16. FIGS. 28A to 28K are changing textures according to an applied voltage in the liquid crystal display device of Comparative Example 10.

FIGS. 27A to 5k and FIGS. 28A to 28K are changing textures from black images to white images according to the applied voltage in liquid crystal display devices. The textures of FIGS. 27A to 5K include less defects such as stains than the textures of FIGS. 28A to 28K.

Figure 27A:
FIGS. 27A to 27K are changing textures according to an applied voltage to the liquid crystal display device of Example 16.
Figure 27B:
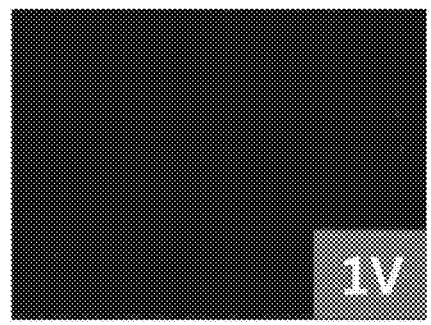
Figure 27C:
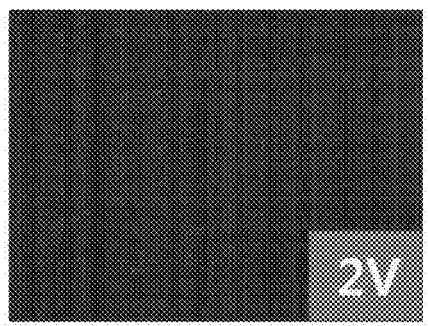
Figure 27D:
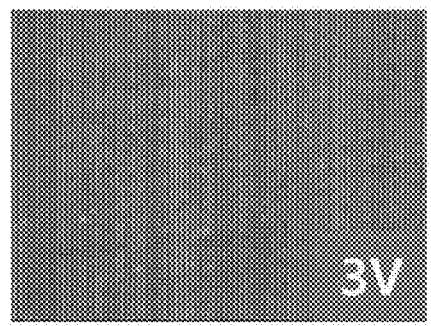
Figure 27E:
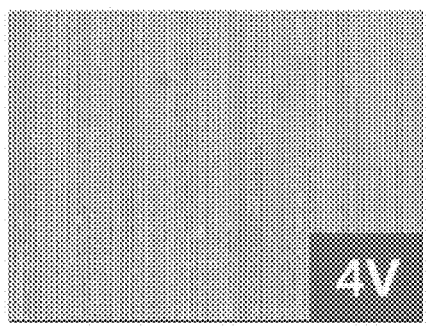
Figure 27F:
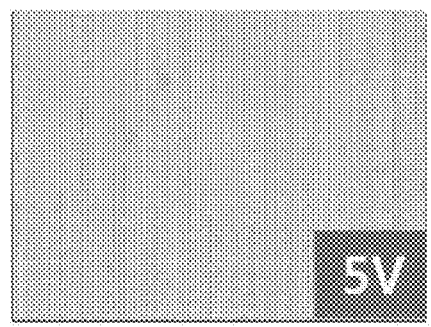
Figure 27G:
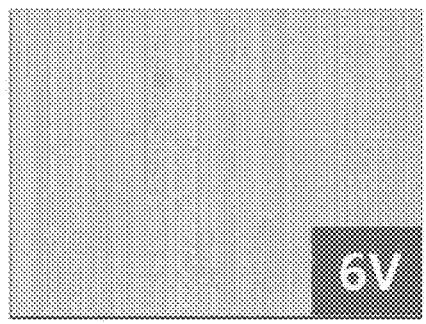
Figure 27H:
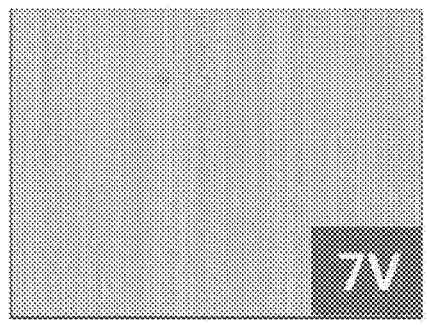
Figure 27I:
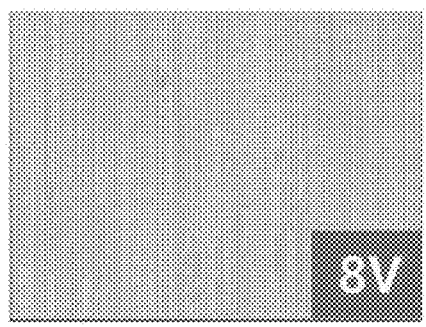
Figure 27J:
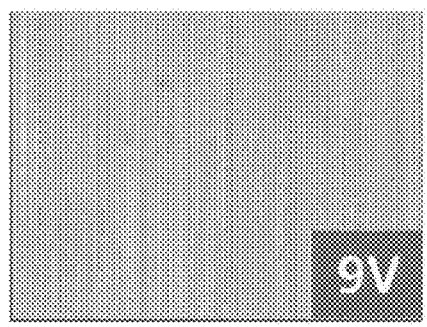
Figure 27K:
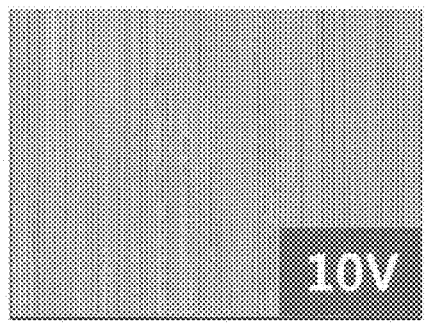
Figure 28A:
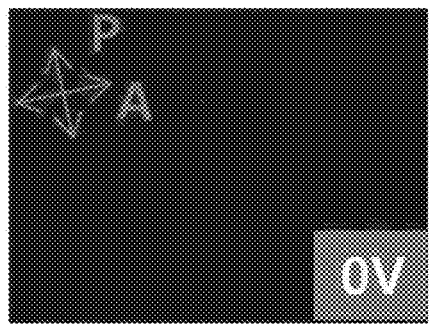
FIGS. 28A to 28K are changing textures according to an applied voltage to the liquid crystal display device of Comparative Example 10.
Figure 28B:
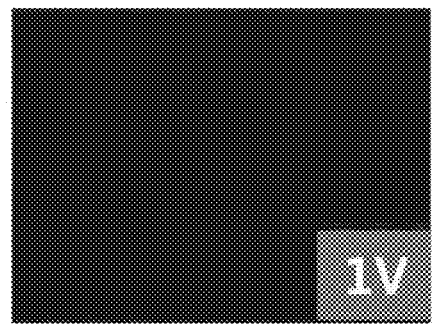
Figure 28C:
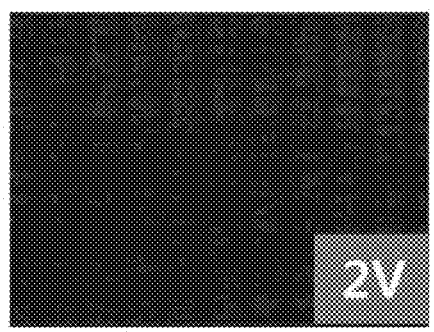
Figure 28D:
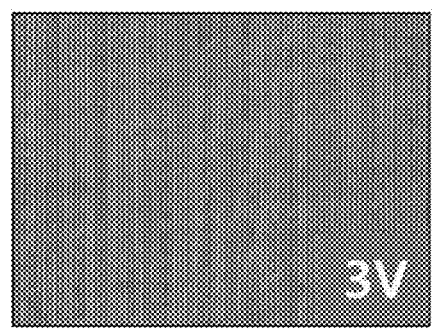
Figure 28E:
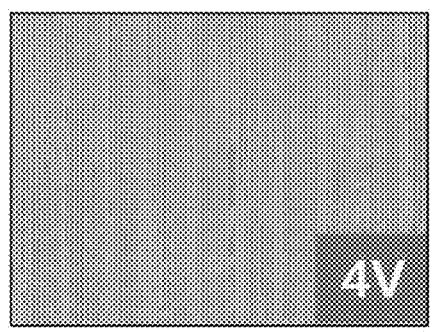
Figure 28F:
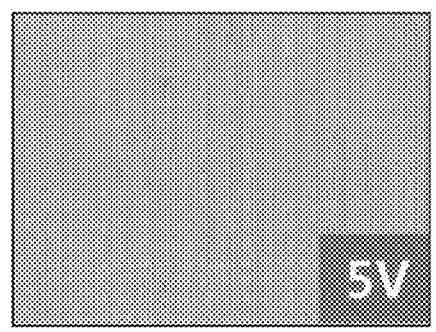
Figure 28G:
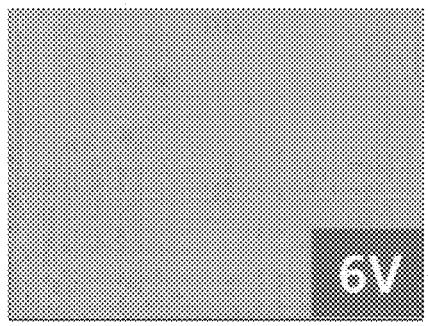
Figure 28H:
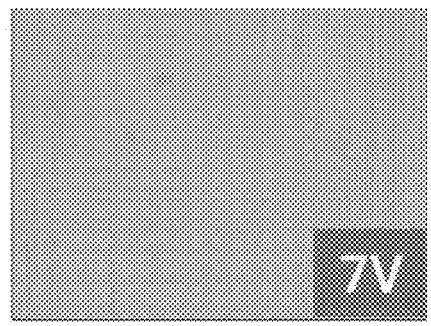
Figure 28I:
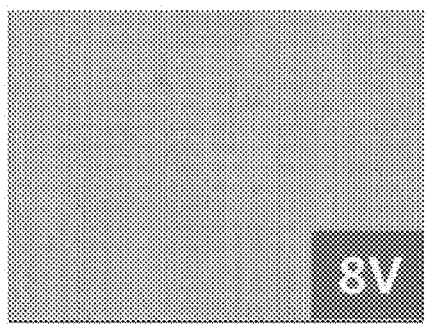
Figure 28J:
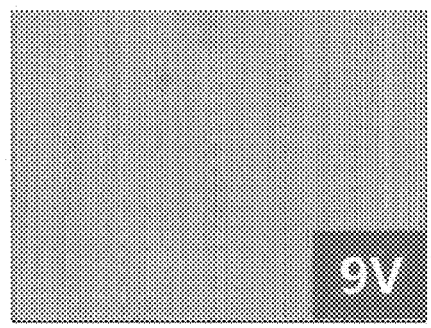
Figure 28K:
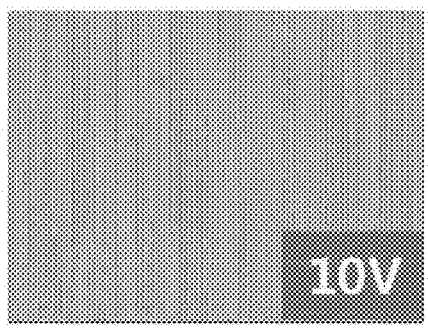

In detail, FIGS. 27D and 28D are textures when applying a voltage of 3 V to the liquid crystal display device of Example 16 and the liquid crystal display device of Comparative Example 10, respectively. When examining the texture of the liquid crystal display device in FIG. 28D, a white hatched pattern is shown, however this pattern is not shown in the texture of the liquid crystal display device in FIG. 27D. The above-described defects may be shown in FIG. 28E.

When inspecting the textures, the alignment of the liquid crystal molecules in the liquid crystal layer including the ferroelectric material is uniform and stable when compared to that of a liquid crystal layer not including the ferroelectric material, thereby improving the luminance of a liquid crystal display device.

[[Liquid Crystal Display Device in IPS Mode]]

Figure 29:
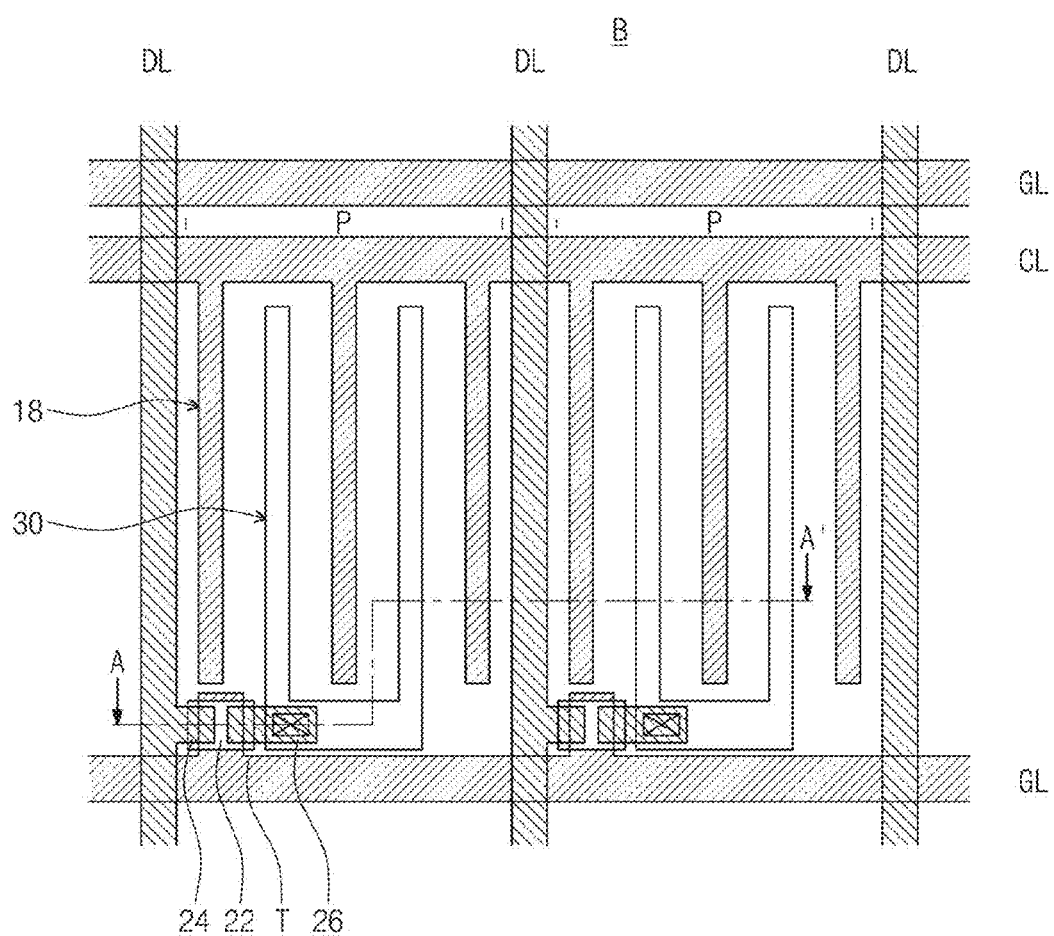
FIG. 29 is a plan view for explaining a liquid crystal display device according to an embodiment of the present invention.
Figure 30:
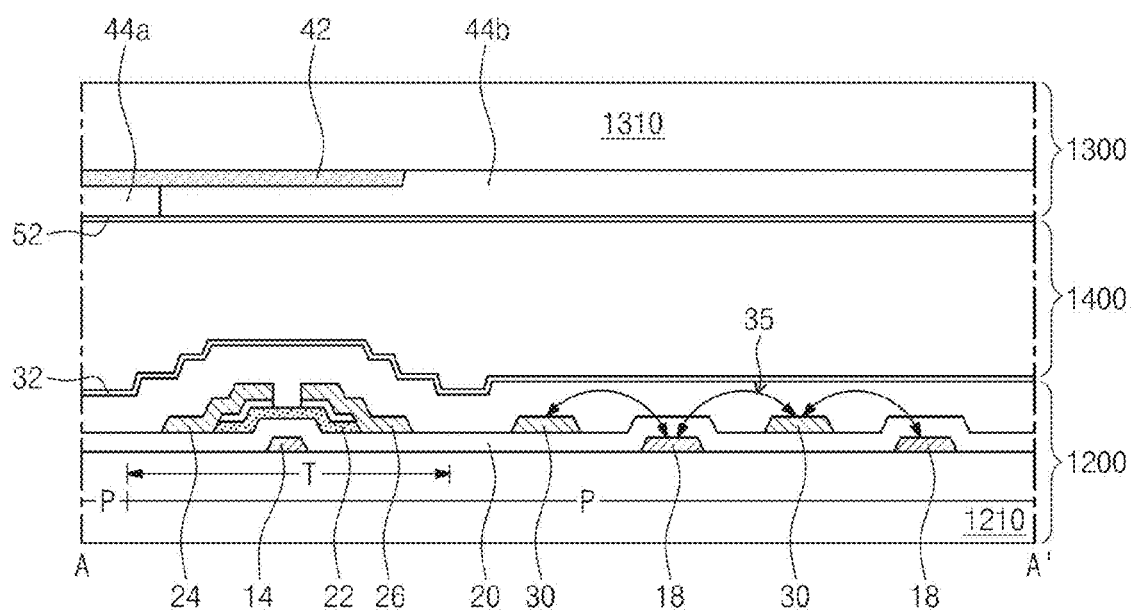
FIG. 30 is a cross-sectional view for explaining a liquid crystal display device according to an embodiment of the present invention

FIGS. 29 and 30 are a plan view and a cross-sectional view for explaining a liquid crystal display device according to an embodiment of the present invention.

Referring to FIGS. 29 and 30, a liquid crystal display device B includes an upper display plate 1300, an opposing lower display plate 1200, and a liquid crystal layer 1400 disposed between the upper display plate 1300 and the lower display plate 1200. The liquid crystal display device B may be in an in plane switching (IPS) mode.

The lower display plate 1200 may include a thin film transistor T, a common electrode 18 and a pixel electrode 30 in each of a plurality of pixel areas P defined on a transparent and insulating first substrate 1210. The thin film transistor T may include a gate electrode 14, a semiconductor layer 22 formed on the gate electrode 14 with an insulation layer 20 therebetween, and source and drain electrodes 24 and 26 separately formed from each other on the semiconductor layer 22.

The common electrode 18 and the pixel electrode 30 may be separated in parallel to each other on the same first substrate 1210. The common electrode 18 may be formed as the same layer using the same material as the gate electrode 14, and the pixel electrode 30 may be formed as the same layer using the same material as the source and drain electrodes 24 and 26.

A gate line GL extended along a first side direction of a pixel area P and a data line DL extended in a second side direction that is perpendicular to the first side direction may be included, and a common line CL for applying a voltage to the common electrode 18 may be provided. The common line CL may be extended along a third side of the pixel area P separated from the gate line GL in parallel. In the pixel area, a common electrode 18 having a first pattern and a pixel electrode 30 having a second pattern may be provided. The first pattern may have a structure not overlapping with the second pattern. For example, the common electrode 18 may have a first pattern extended in a perpendicular direction to the common line CL and spaced in parallel to each other. The pixel electrode 30 may have a second pattern separated between the common electrodes 18 in parallel to the common electrode 18. In this case, the first pattern and the second pattern may not be overlapped with each other. In this embodiment, each of the first and second patterns is explained to have a line shape, however the structure of the first and second patterns is not limited thereto in the present invention.

The upper display plate 1300 includes a black matrix 42 formed at a corresponding part to the gate line GL, the data line DL and the thin film transistor T and color filters 44a and 44b formed in correspondence to the pixel area P on the transparent and insulating second substrate 1310.

According to another embodiment of the present invention, the lower display plate 1200 may further include a first alignment layer 32 between the common electrode 30 and the liquid crystal layer. The first alignment layer 32 may pre-tilt liquid crystal molecules in the liquid crystal layer 1400 in one direction. According to an embodiment, the first alignment layer 32 may include at least one selected from the group consisting of polyamic acid, polyimide, lecithin, nylon and PVA. According to another embodiment, the first alignment layer 32 may further include a reactive mesogen material.

According to a further another embodiment of the present invention, the upper display plate 1300 may further include a second alignment layer 52 between the color filters 44a and 44b and the liquid crystal layer 1400. According to an embodiment, the second alignment layer 52 may include at least one selected from the group consisting of polyamic acid, polyimide, lecithin, nylon and PVA. According to another embodiment, the second alignment layer 52 may further include a reactive mesogen material.

The liquid crystal layer 1400 may fill up a space between the first and second substrates 100 and 200. According to an embodiment, the liquid crystal layer 1400 may include a negative nematic liquid crystal, a positive nematic liquid crystal and a ferroelectric liquid crystal. According to another embodiment, the liquid crystal layer 1400 may include a non-ferroelectric liquid crystal and a ferroelectric liquid crystal. The explanation on the liquid crystal layer 1400 is substantially the same as the description of the liquid crystal layer in the above PVA mode, and detailed description thereof will be omitted.

As described above, since the liquid crystal layer 1400 of the liquid crystal display device in the IPS mode includes a ferroelectric liquid crystal together with the nematic liquid crystal, uniform alignment of the liquid crystal layer may be attained, and the stability of the alignment may be improved. Thus, the luminance of the liquid crystal display device including the liquid crystal layer 1400 may be improved. In addition, since at least one of the first and second alignment layers 32 and 52 further include the reactive mesogen material, the alignment rate and the alignment angle of the liquid crystal molecules in the liquid crystal layer 1400 may be increased, thereby improving optical properties.

Hereinafter, the present invention will be explained in detail through examples and comparative examples. However, the following examples are described only for illustrating the present invention. Thus, the present invention is not limited thereto and may be modified and changed diversely.

Liquid Crystal Display Device in IPS Mode

EXAMPLE 17

A liquid crystal display device of FIGS. 29 and 30 including a first substrate including a common electrode having a line pattern and a pixel electrode having a line pattern, a second display plate and a liquid crystal layer filling up a space between the first and second display plates was manufactured. The liquid crystal display device was manufactured in an IPS mode.

The liquid crystal layer was manufactured by mixing about 90 wt % of MLC 6608 ($\Delta n=0.084$, $\Delta\in=-4.3$) of Merck Co. and about 10 wt % of KFLC 3 ($\Delta n=0.18$) of Kingston Chemical Co. at about 100° C. The thickness of the liquid crystal layer of the liquid crystal display device was about 3.3 μm.

EXAMPLES 18 to 22

Liquid crystal display devices of Examples 18 to 22 were manufactured by the same procedure described in Example 17 except for the thickness of the liquid crystal layer. The thickness of the liquid crystal layers of Examples 18 to 22 will be illustrated in the following Table 1.

COMPARATIVE EXAMPLE 11

A liquid crystal display device of FIGS. 29 and 30 including a first substrate including a common electrode having a line pattern and a pixel electrode having a line pattern, a second display plate and a liquid crystal layer filling up a space between the first and second display plates was manufactured. The liquid crystal display device was manufactured in an IPS mode.

The liquid crystal layer was manufactured by using about 100 wt % of MLC 6608 ($\Delta n=0.084$, $\Delta\in=-4.3$) of Merck Co. The thickness of the liquid crystal layer of the liquid crystal display device was about 3.3 μm.

COMPARATIVE EXAMPLES 12 to 16

Liquid crystal display devices of Comparative Examples 12 to 16 were manufactured by the same procedure described in Comparative Example 11 except for the thickness of the liquid crystal layer. The thickness of the liquid crystal layers of Comparative Examples 12 to 16 will be illustrated in the following Table 5.

TABLE 5

| | Liquid crystal layer | | Thickness |
|---|---|---|---|
| | MLC 6608 [wt %] (negative nematic liquid crystal) | KFLC 3 [wt %] (ferroelectric liquid crystal) | of liquid crystal layer [μm] |
| Example 17 | 90 | 10 | 3.3 |
| Example 18 | 90 | 10 | 3.5 |
| Example 19 | 90 | 10 | 3.8 |
| Example 20 | 90 | 10 | 4.0 |
| Example 21 | 90 | 10 | 4.3 |
| Example 22 | 90 | 10 | 4.5 |
| Comparative Example 11 | 100 | 0 | 3.3 |
| Comparative Example 12 | 100 | 0 | 3.5 |

TABLE 5-continued

| | Liquid crystal layer | | Thickness of liquid crystal layer [μm] |
|---|---|---|---|
| | MLC 6608 [wt %] (negative nematic liquid crystal) | KFLC 3 [wt %] (ferroelectric liquid crystal) | |
| Comparative Example 13 | 100 | 0 | 3.8 |
| Comparative Example 14 | 100 | 0 | 4.0 |
| Comparative Example 15 | 100 | 0 | 4.3 |
| Comparative Example 16 | 100 | 0 | 4.5 |

Evaluation of Transmittance

Figure 31A:
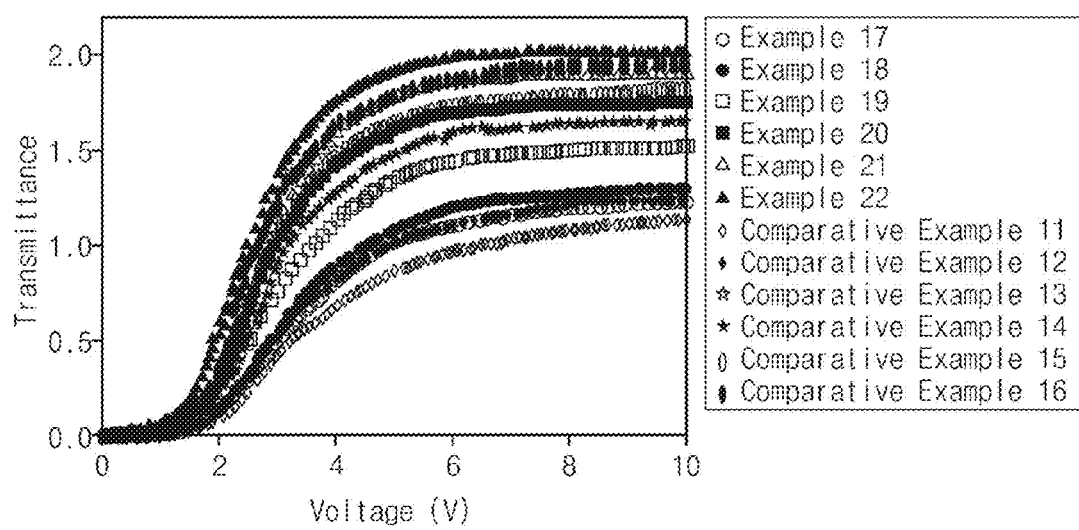
FIGS. 31A and 31B are graphs for comparing the transmittance of the liquid crystal display devices of Examples 17 to 22 and the liquid crystal display devices of Comparative Examples 11 to 16.
Figure 31B:
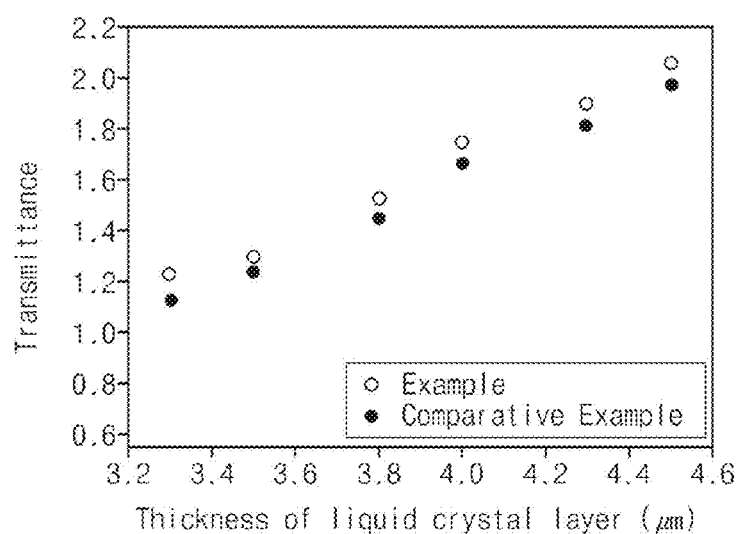

FIGS. 31A and 31B are graphs for comparing the transmittance of the liquid crystal display devices according to Examples 17 to 22 and the liquid crystal display devices according to Comparative Examples 11 to 16. FIGS. 31A and 31B are graphs illustrating the transmittance according to an applied voltage. In FIGS. 31A and 31B, x-axes represent an applied voltage, and the unit thereof is [V], and y-axes represent transmittance.

Referring to FIGS. 31A and 31B, the transmittance of the liquid crystal display devices according to Examples 17 to 22 is good in general when compared to that of the liquid crystal display devices according to Comparative Examples 11 to 16. The transmittance of the liquid crystal display devices according to the examples is excellent in general when compared to that of the liquid crystal display device according to the comparative examples with the same thickness of the liquid crystal layer.

Through the above evaluation, the ferroelectric liquid crystal in the liquid crystal layer of Examples 17 to 22 is expected to induce the alignment of the liquid crystal molecules uniformly and stably. Thus, the transmittance of the liquid crystal display devices of Examples 17 to 22 is better than that of the liquid crystal display device of Comparative Examples 11 to 16.

Evaluation of Response Time

Figure 32A:
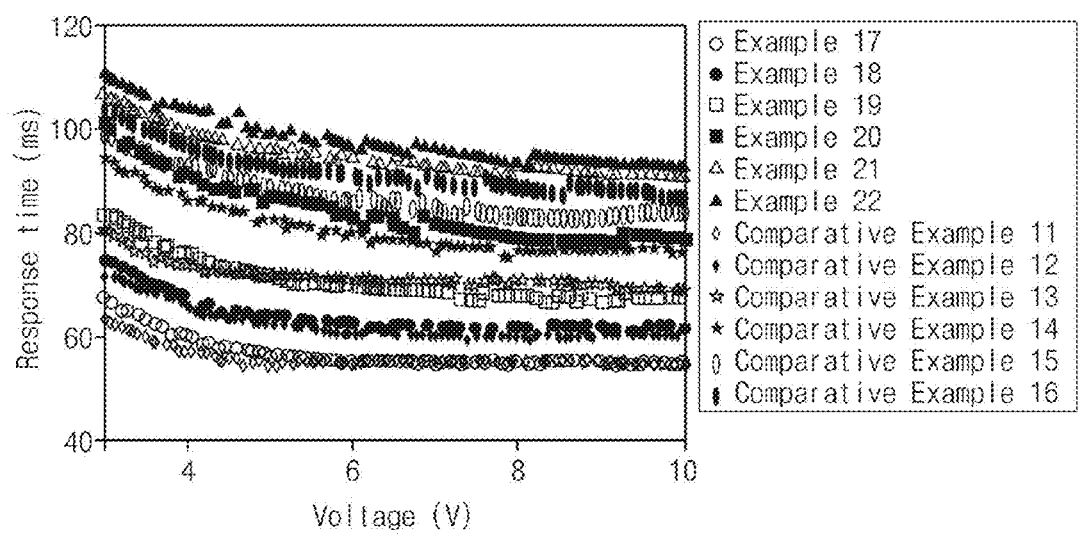
FIGS. 32A and 32B are graphs for comparing the response time of the liquid crystal display devices of Examples 17 to 22 and the liquid crystal display devices of Comparative Examples 11 to 16.
Figure 32B:
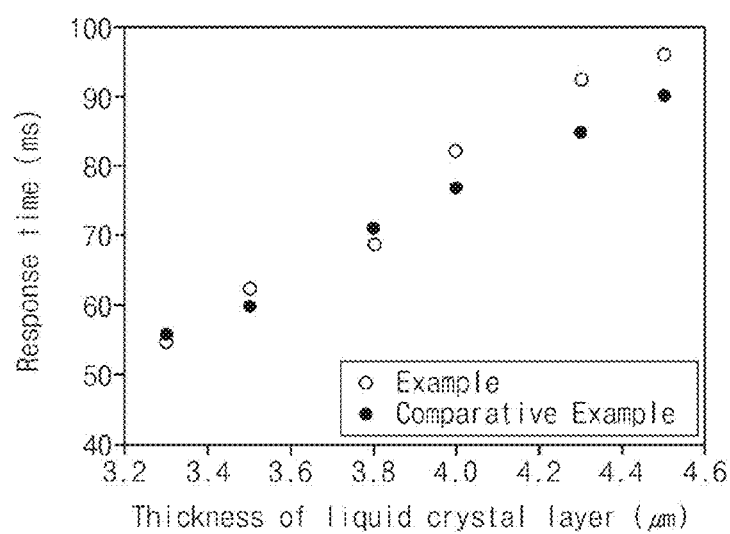
Figure 33A:
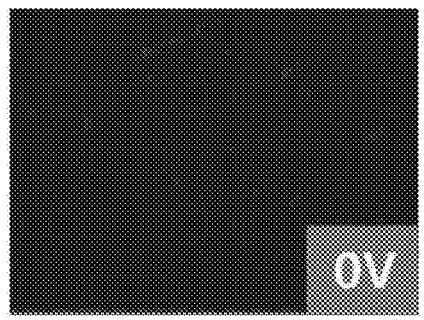
FIGS. 33A to 33K are changing textures according to an applied voltage to the liquid crystal display device of Example 21.
Figure 33B:
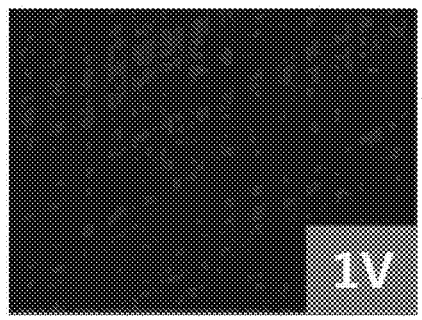
Figure 33C:
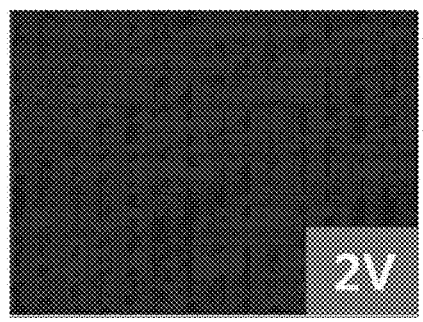
Figure 33D:
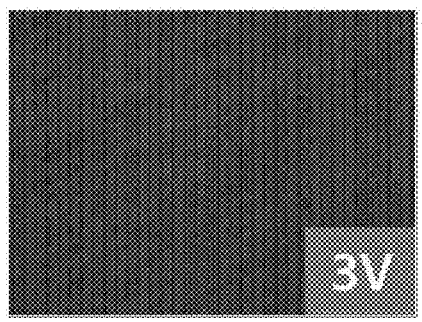
Figure 33E:
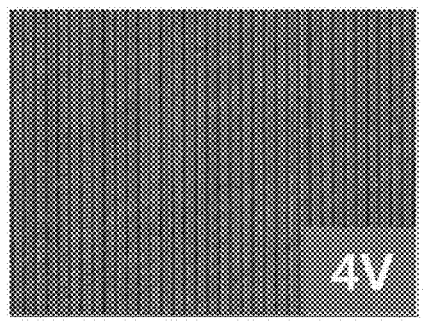
Figure 33F:
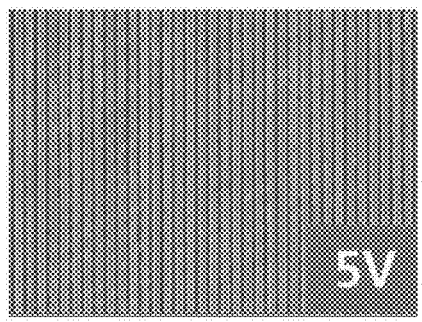
Figure 33G:
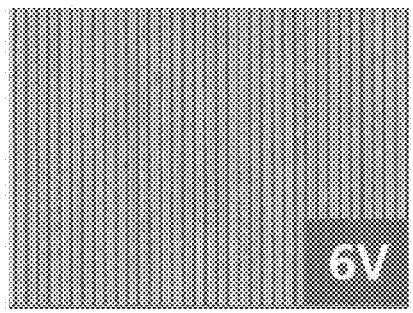
Figure 33H:
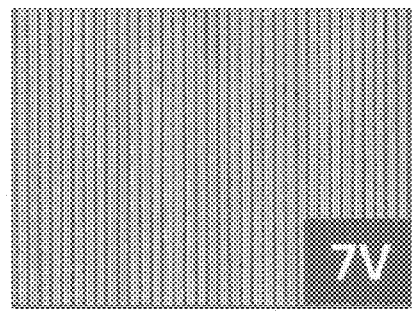
Figure 33I:
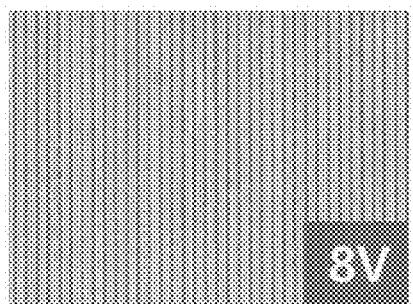
Figure 33J:
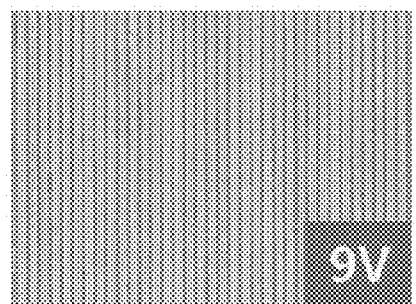
Figure 33K:
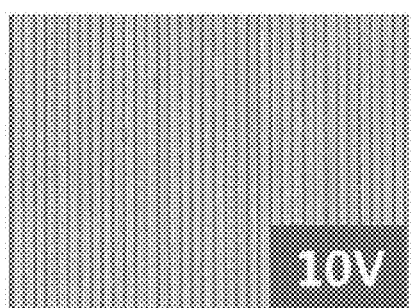
Figure 34A:
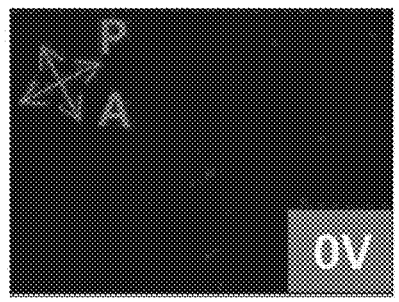
FIGS. 34A to 34K are changing textures according to an applied voltage to the liquid crystal display device of Comparative Example 15.
Figure 34B:
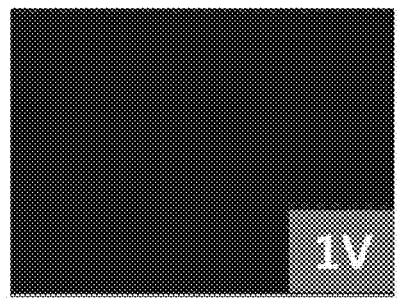
Figure 34C:
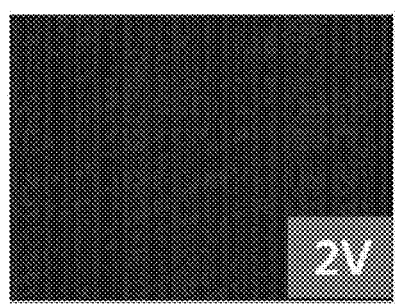
Figure 34D:
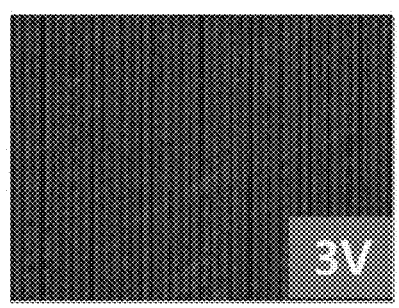
Figure 34E:
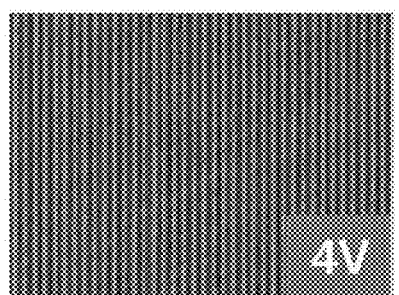
Figure 34F:
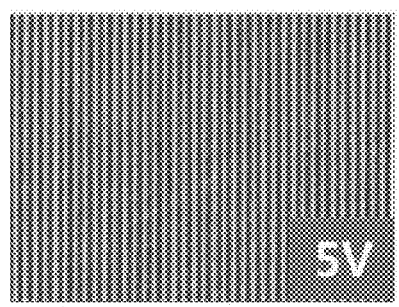
Figure 34G:
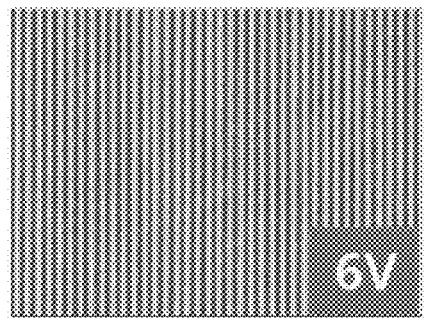
Figure 34H:
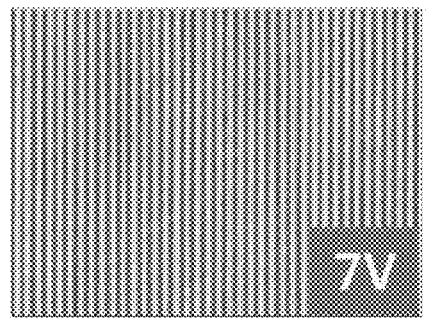
Figure 34I:
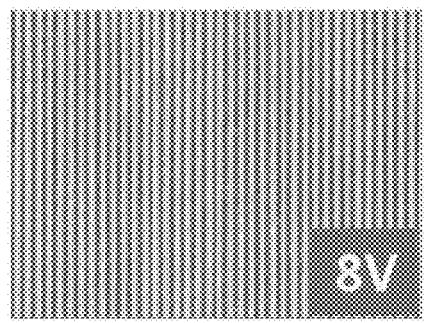
Figure 34J:
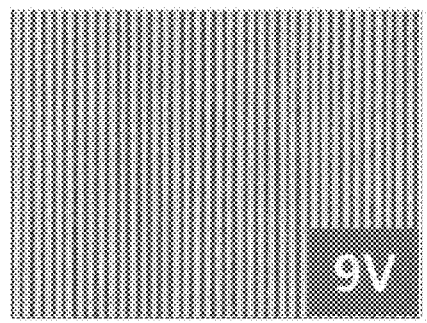
Figure 34K:
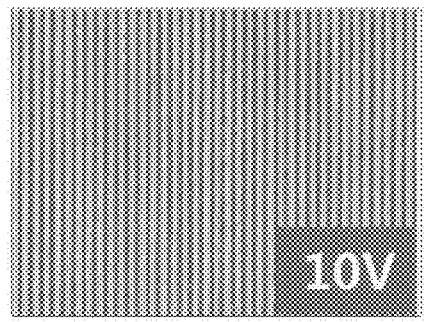

FIGS. 32A and 32B are graphs for comparing the response time of the liquid crystal display devices of Examples 17 to 22 and the liquid crystal display devices of Comparative Examples 11 to 16.

FIGS. 32A and 32B are graphs illustrating the response time according to an applied voltage. In FIGS. 32A and 32B, x-axes represent an applied voltage, and the unit thereof is [V], and y-axes represent response time, and the unit thereof is [ms].

Referring to FIGS. 32A and 32B, the response time of the liquid crystal display devices Examples 17 to 22 is somewhat smaller than that of the liquid crystal display devices Comparative Examples 11 to 16. However, the difference of the response time is little when the thickness of the liquid crystal layer decreases.

Since the liquid crystal layers of Examples 17 to 22 include the ferroelectric liquid crystal, the viscosity of the liquid crystal layer may increase, and the response time thereof is slightly decreased than or similar to the response time of the liquid crystal display devices of Comparative Examples 11 to 16. However, the difference of the response time between the comparative examples and the examples is not much great. Thus, the liquid crystal layer of Examples 17 to 22 may attain stable and uniform alignment and maintain common response time through including the ferroelectric liquid crystal.

Evaluation of Textures

FIGS. 33A to 33K are changing textures according to an applied voltage in the liquid crystal display device of Example 21. FIGS. 34A to 34K are changing textures according to an applied voltage in the liquid crystal display device of Comparative Example 15.

FIGS. 33A to 5k and FIGS. 34A to 34K are changing textures from black images to white images according to the applied voltage in liquid crystal display devices. The textures of FIGS. 33A to 5K includes less defects between patterns than the textures of FIGS. 34A to 34K.

In detail, defects of appearing black at the border of the first pattern and the second pattern are generated more in the comparative examples than those in the examples as the applied voltage is increased.

When inspecting the textures, the alignment of the liquid crystal molecules in the liquid crystal layer including the ferroelectric material is uniform and stable when compared to that of a liquid crystal layer not including the ferroelectric material, thereby improving the luminance of a liquid crystal display device.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A liquid crystal display device, comprising:
a first substrate;
a second substrate separated from and opposing the first substrate;
a liquid crystal layer between the first and second substrates;
a first electrode between the first substrate and the liquid crystal layer and comprising a first slit; and
a second electrode between the liquid crystal layer and the second substrate and comprising a second slit,
wherein the liquid crystal layer comprises a negative nematic liquid crystal, a positive nematic liquid crystal and a ferroelectric liquid crystal,
wherein the liquid crystal layer includes a mixture of the positive nematic liquid crystal, the negative nematic liquid crystal, and the ferroelectric liquid crystal, the mixture being disposed throughout the entire liquid crystal layer.

2. The liquid crystal display device of claim 1, wherein the first electrode and the second electrode are disposed so that the first slit and the second slit are not overlapped when seen from a plan view.

3. The liquid crystal display device of claim 1, wherein the liquid crystal display device is in a patterned vertical alignment (PVA) mode.

4. The liquid crystal display device of claim 1, further comprising a first alignment layer between the first electrode and the liquid crystal layer; and a second alignment layer between the second electrode and the liquid crystal layer.

5. The liquid crystal display device of claim 4, wherein at least one of the first alignment layer and the second alignment layer comprises a reactive mesogen material.

6. The liquid crystal display device of claim 1, wherein the liquid crystal layer comprises from about 70 wt % to about 99.9 wt % of the negative nematic liquid crystal; and from about 0.1 wt % to about 30 wt % of the positive nematic liquid crystal and the ferroelectric liquid crystal.

7. The liquid crystal display device of claim 6, wherein from about 10 wt % to about 99 wt % of the ferroelectric liquid crystal is comprised in the positive nematic liquid crystal and the ferroelectric liquid crystal.

8. The liquid crystal display device of claim 6, wherein the liquid crystal layer further comprises a reactive mesogen material.

9. The liquid crystal display device of claim 8, wherein the liquid crystal layer comprises from about 0.1 wt % to about 30 wt % of the positive nematic liquid crystal and the ferroelectric liquid crystal; from about 0.01 wt % to about 3wt % of the reactive mesogen material; and a remainder of the negative nematic liquid crystal.

10. A liquid crystal display device, comprising:
a first electrode and a second electrode separated from and opposing to each other; and
a liquid crystal layer filling up a space between the first and second electrodes and comprising a plurality of liquid crystal molecules having a first alignment direction perpendicular to the surface of the first or second electrode when no potential difference is present between the first and second electrodes,
wherein the liquid crystal layer comprises a negative nematic liquid crystal, a positive nematic liquid crystal and a ferroelectric liquid crystal,
the plurality of liquid crystal molecules performs changing operation to have a second alignment direction substantially in parallel to an extended direction of the first or second electrode when potential difference is generated between the first and second electrodes,
the changing operation of the liquid crystal molecules comprises a first alignment step and a second alignment step in order,
the liquid crystal molecules change to have a third alignment direction different from the first or second alignment direction in the first alignment step, and
the liquid crystal molecules of the third alignment direction change to have the second alignment direction in the second alignment step,
wherein the liquid crystal layer includes a mixture of the positive nematic liquid crystal, the negative nematic liquid crystal, and the ferroelectric liquid crystal, the mixture being disposed throughout the entire liquid crystal layer.

11. The liquid crystal display device of claim 10, further comprising an alignment layer disposed at least a portion between the liquid crystal layer and the first electrode and between the liquid crystal layer and the second electrode,
wherein at least one of the liquid crystal layer and the alignment layer comprises a reactive mesogen material, and
the plurality of liquid crystal molecules of the first alignment direction change to have the second alignment direction when potential difference is generated between the first and second electrodes due to the reactive mesogen.

12. The liquid crystal display device of claim 11, wherein the alignment layer comprises at least one of a first alignment layer between the first electrode and the liquid crystal layer; and a second alignment layer between the second electrode and the liquid crystal layer.

13. The liquid crystal display device of claim 11, wherein the alignment layer comprises a base material and a reactive mesogen material,
wherein the base material comprises at least one selected from the group consisting of polyamic acid, polyimide, lecithin, nylon and polyvinyl alcohol (PVA).

14. The liquid crystal display device of claim 10, wherein the liquid crystal layer comprises from about 70 wt % to about 99.9 wt % of the negative nematic liquid crystal; and from about 0.1 wt % to about 30 wt % of the positive nematic liquid crystal and the ferroelectric liquid crystal.

15. The liquid crystal display device of claim 14, wherein from about 10 wt % to about 99 wt % of the ferroelectric liquid crystal is comprised in the positive nematic liquid crystal and the ferroelectric liquid crystal.

16. The liquid crystal display device of claim 15, wherein the liquid crystal layer comprises a reactive mesogen material, and
the liquid crystal layer comprises from about 0.1 wt % to about 30 wt % of the positive nematic liquid crystal and the ferroelectric liquid crystal; from about 0.01 wt % to about 3 wt % of the reactive mesogen material; and a remainder of the negative nematic liquid crystal.

17. The liquid crystal display device of claim 10, wherein at least one of the first electrode and the second electrode has a slit.

18. The liquid crystal display device of claim 17, wherein the first electrode comprises a first slit having a square ring shape and extended along an edge portion of the first electrode, and
the second electrode comprises a second slit having a cross shape and penetrating a center of the second electrode.

19. The liquid crystal display device of claim 18, wherein when potential different is generated between the first and second electrodes,
liquid crystal molecules positioned at the first and second slits have a second alignment direction that is a perpendicular direction to the first and second slits, and
liquid crystal molecules separated apart from the first and second slits have a second alignment direction that has an angle of about 45° or about 135° with respect to the first and second slits.

20. The liquid crystal display device of claim 18, wherein the first slit of the first electrode has a cut portion at the middle thereof.

21. The liquid crystal display device of claim 17, wherein the first electrode comprises:
a stem part penetrating the center of the first electrode and having a cross shape; and
branch parts extended in a radial direction from the stem part and separated apart from each other by a plurality of slits.

22. The liquid crystal display device of claim 21, wherein when potential different is generated between the first and second electrodes,
the liquid crystal molecules have a second alignment direction substantially in parallel to an extended direction of the slits of the branch parts.

23. A liquid crystal display device, comprising:
a first substrate;
a second substrate separated from and opposing the first substrate;
a liquid crystal layer between the first and second substrates;
a common electrode between the first substrate and the liquid crystal layer and having a plate shape; and
a pixel electrode between the common electrode and the liquid crystal layer and having a pattern for defining an opening part, wherein the liquid crystal layer comprises a negative nematic liquid crystal, a positive nematic liquid crystal and a ferroelectric liquid crystal, and wherein the liquid crystal layer includes a mixture of the positive nematic liquid crystal, the negative nematic liquid crystal, and the ferroelectric liquid crystal, the mixture being disposed throughout the entire liquid crystal layer.

24. The liquid crystal display device of claim 23, wherein the liquid crystal display device is in a field fringe switching (FFS) mode.

25. The liquid crystal display device of claim 23, further comprising an alignment layer adjacent to the liquid crystal layer.

26. The liquid crystal display device of claim 25, wherein the alignment layer further comprises a reactive mesogen material.

27. The liquid crystal display device of claim 23, wherein the liquid crystal layer comprises from about 70 wt % to about 99.9 wt % of the negative nematic liquid crystal; and from about 0.1 wt % to about 30 wt % of the positive nematic liquid crystal and the ferroelectric liquid crystal.

28. The liquid crystal display device of claim 27, wherein from about 10 wt % to about 99 wt % of the ferroelectric liquid crystal is comprised in the positive nematic liquid crystal and the ferroelectric liquid crystal.

29. The liquid crystal display device of claim 27, wherein the liquid crystal layer further comprises a reactive mesogen material.

30. The liquid crystal display device of claim 29, wherein the liquid crystal layer comprises from about 0.1 wt % to about 30 wt % of the positive nematic liquid crystal and the ferroelectric liquid crystal; from about 0.01 wt % to about 3 wt % of the reactive mesogen material; and a remainder of the negative nematic liquid crystal.

31. A liquid crystal display device, comprising:
a first substrate;
a second substrate separated from and opposing the first substrate;
a liquid crystal layer between the first and second substrates;
a common electrode between the first substrate and the liquid crystal layer and having a first pattern; and
a pixel electrode between the first substrate and the liquid crystal layer and having a second pattern not overlapping with the first pattern,
wherein the liquid crystal layer comprises a negative nematic liquid crystal, a positive nematic liquid crystal and a ferroelectric liquid crystal, and
wherein the liquid crystal layer includes a mixture of the positive nematic liquid crystal, the negative nematic liquid crystal, and the ferroelectric liquid crystal, the mixture being disposed throughout the entire liquid crystal layer.

32. The liquid crystal display device of claim 31, wherein the liquid crystal display device is in an in plane switching (IPS) mode.

33. The liquid crystal display device of claim 31, further comprising an alignment layer adjacent to the liquid crystal layer.

34. The liquid crystal display device of claim 33, wherein the alignment layer further comprises a reactive mesogen material.

35. The liquid crystal display device of claim 31, wherein the liquid crystal layer comprises from about 70 wt % to about 99.9 wt % of the negative nematic liquid crystal; and from about 0.1 wt % to about 30 wt % of the positive nematic liquid crystal and the ferroelectric liquid crystal.

36. The liquid crystal display device of claim 35, wherein from about 10 wt % to about 99 wt % of the ferroelectric liquid crystal is comprised in the positive nematic liquid crystal and the ferroelectric liquid crystal.

37. The liquid crystal display device of claim 35, wherein the liquid crystal layer further comprises a reactive mesogen material.

38. The liquid crystal display device of claim 37, wherein the liquid crystal layer comprises from about 0.1 wt % to about 30 wt % of the positive nematic liquid crystal and the ferroelectric liquid crystal; from about 0.01 wt % to about 3 wt % of the reactive mesogen material; and a remainder of the negative nematic liquid crystal.

39. A liquid crystal display device, comprising:
a first substrate;
a second substrate separated from and opposing the first substrate;
a liquid crystal layer between the first and second substrates;
a first electrode between the first substrate and the liquid crystal layer and comprising a first slit; and
a second electrode between the liquid crystal layer and the second substrate and comprising a second slit,
wherein the liquid crystal layer comprises a non-ferroelectric liquid crystal and a ferroelectric liquid crystal, and
wherein the liquid crystal layer comprises a mixture of a positive nematic liquid crystal, a negative nematic liquid crystal, and the ferroelectric liquid crystal, the mixture being disposed throughout the entire liquid crystal layer.

40. The liquid crystal display device of claim 39, wherein the liquid crystal layer comprises from about 0.1 wt % to about 30 wt % of the ferroelectric liquid crystal.

41. The liquid crystal display device of claim 39, wherein the non-ferroelectric liquid crystal comprises the negative nematic liquid crystal.

42. The liquid crystal display device of claim 41, wherein the liquid crystal layer comprises from about 70 wt % to about 99.9 wt % of the negative nematic liquid crystal; and from about 0.1 wt % to about 30 wt % of the ferroelectric liquid crystal.

43. The liquid crystal display device of claim 42, wherein the liquid crystal layer further comprises a reactive mesogen material.

44. The liquid crystal display device of claim 43, wherein the liquid crystal layer comprises from about 0.1 wt % to about 30 wt % of the ferroelectric liquid crystal; from about 0.01 wt % to about 3 wt % of the reactive mesogen material; and a remainder of the negative nematic liquid crystal.

45. A liquid crystal display device comprising:
a first electrode and a second electrode separated from and opposing to each other; and
a liquid crystal layer filling up a space between the first and second electrodes and comprising a plurality of liquid crystal molecules having a first alignment direction perpendicular to the surface of the first or second electrode when no potential difference is present between the first and second electrodes,
wherein the liquid crystal layer comprises a non-ferroelectric liquid crystal and a ferroelectric liquid crystal, the liquid crystal molecules in the liquid crystal layer filling up a space between the first and second electrodes perform changing operation to have a second alignment direction substantially in parallel to an extended direction of the first or second electrode when potential difference is generated between the first and second electrodes, the changing operation of the liquid crystal molecules comprises a first alignment step and a second alignment step in order, the liquid crystal molecules change to have a third alignment direction different from the first or second alignment direction in the first alignment step, and the liquid crystal molecules of the third alignment direction change to have the second alignment direction in the second alignment step, wherein the liquid crystal layer comprises a mixture of a positive nematic liquid crystal, a negative nematic liquid crystal, and the ferroelectric liquid crystal, the mixture being disposed throughout the entire liquid crystal layer.

46. The liquid crystal display device of claim 45, further comprising an alignment layer between at least one portion between the liquid crystal layer and the first electrode and between the liquid crystal layer and the second electrode, wherein at least one of the liquid crystal layer and the alignment layer comprises a reactive mesogen material, and the alignment direction of the plurality of the liquid crystal molecules of the first alignment direction change to have the second alignment direction when potential difference is generated between the first and second electrodes.

47. The liquid crystal display device of claim 45, wherein the liquid crystal layer comprises from about 0.1 wt % to about 30 wt % of the ferroelectric liquid crystal.

48. The liquid crystal display device of claim 45, wherein the non-ferroelectric liquid crystal comprises the negative nematic liquid crystal.

49. The liquid crystal display device of claim 48, wherein the liquid crystal layer comprises from about 70 wt % to about 99.9 wt % of the negative nematic liquid crystal; and from about 0.1 wt % to about 30 wt % of the ferroelectric liquid crystal.

50. The liquid crystal display device of claim 49, wherein the liquid crystal layer comprises a reactive mesogen material, and the liquid crystal layer comprises from about 0.1 wt % to about 30 wt % of the ferroelectric liquid crystal; from about 0.01 to about 3 wt % of the reactive mesogen material; and a remainder of the negative nematic liquid crystal.

51. A method for driving a liquid crystal display device, comprising:

aligning liquid crystal molecules of a liquid crystal layer filled between first and second electrodes in a first alignment direction that is perpendicular to the surface of the first or second electrode;

generating potential difference between the first and second electrodes;

stabilizing the liquid crystal molecules by a ferroelectric liquid crystal in the liquid crystal layer; and changing alignment direction of the liquid crystal molecules in a second alignment direction that is substantially in parallel to an extended direction of the first and second electrodes, wherein the changing of the alignment direction of the liquid crystal molecules comprises a first alignment step and a second alignment step, the liquid crystal molecules change to have a third alignment direction different from the first or second alignment direction in the first alignment step, and the liquid crystal molecules in the third alignment direction change to have the second alignment direction in the second alignment step, wherein the liquid crystal layer comprises a mixture of a positive nematic liquid crystal, a negative nematic liquid crystal, and the ferroelectric liquid crystal, the mixture being disposed throughout the entire liquid crystal layer.

52. The method for driving a liquid crystal display device of claim 51, wherein the liquid crystal layer comprises a reactive mesogen material, and the liquid crystal molecules change the alignment direction from the first alignment direction to the second alignment direction when potential difference is generated between the first and second electrodes.

53. The method for driving a liquid crystal display device of claim 51, wherein the liquid crystal molecules change the alignment direction from the first alignment direction to the second alignment direction when a potential difference is generated between the first and second electrodes, and wherein a reactive mesogen material of an alignment layer is disposed between the liquid crystal layer and the first electrode, or between the liquid crystal layer and the second electrode.

54. A liquid crystal display device, comprising:

a first substrate;

a second substrate separated from and opposing the first substrate;

a liquid crystal layer between the first and second substrates;

a common electrode between the first substrate and the liquid crystal layer and having a plate shape; and a pixel electrode between the common electrode and the liquid crystal layer and having a pattern for defining an opening part, wherein the liquid crystal layer comprises a non-ferroelectric liquid crystal and a ferroelectric liquid crystal, and wherein the liquid crystal layer comprises a mixture of a positive nematic liquid crystal, a negative nematic liquid crystal, and the ferroelectric liquid crystal, the mixture being disposed throughout the entire liquid crystal layer.

55. The liquid crystal display device of claim 54, wherein the liquid crystal layer comprises from about 0.1 wt % to about 30 wt % of the ferroelectric liquid crystal.

56. The liquid crystal display device of claim 54, wherein the non-ferroelectric liquid crystal comprises the negative nematic liquid crystal.

57. The liquid crystal display device of claim 56, wherein the liquid crystal layer comprises from about 70 wt % to about 99.9 wt % of the negative nematic liquid crystal; and from about 0.1 wt % to about 30 wt % of the ferroelectric liquid crystal.

58. The liquid crystal display device of claim 57, wherein the liquid crystal layer further comprises a reactive mesogen material.

59. The liquid crystal display device of claim 58, wherein the liquid crystal layer comprises from about 0.1 wt % to about 30 wt % of the ferroelectric liquid crystal; from about 0.01 wt % to about 3 wt % of the reactive mesogen material; and a remainder of the negative nematic liquid crystal.

* * * * *